US012809097B2

(12) United States Patent
Cote et al.

(10) Patent No.: US 12,809,097 B2
(45) Date of Patent: Nov. 24, 2026

(54) MULTIPORT ASSEMBLIES INCLUDING MOUNTING FEATURES OR DUST PLUGS

(71) Applicant: CORNING RESEARCH & DEVELOPMENT CORPORATION, Corning, NY (US)

(72) Inventors: Monique Lise Cote, Mont-Saint-Hilaire (CA); Edward Wilson Licitra, Decatur, GA (US); Cameron Meyer, Seattle, WA (US); Matthew Wallace Peterson, San Francisco, CA (US); Radawan Ripumaree, Hickory, NC (US); Joel Christopher Rosson, Hickory, NC (US); Jonathan Patrick Summers, Atlanta, GA (US); Lee Alexander Webb, Huntersville, NC (US); Dayne Wilcox, El Cerrito, CA (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 314 days.

(21) Appl. No.: 18/763,234

(22) Filed: Jul. 3, 2024

(65) Prior Publication Data

US 2024/0353641 A1 Oct. 24, 2024

Related U.S. Application Data

(63) Continuation of application No. 17/357,271, filed on Jun. 24, 2021, now Pat. No. 12,044,894, which is a (Continued)

(51) Int. Cl.
*G02B 6/38* (2006.01)
*G02B 6/44* (2006.01)

(52) U.S. Cl.
CPC ......... *G02B 6/3849* (2013.01); *G02B 6/3825* (2013.01); *G02B 6/3831* (2013.01); *G02B 6/44465* (2023.05); *G02B 6/44528* (2023.05)

(58) Field of Classification Search
None
See application file for complete search history.

(56) References Cited

U.S. PATENT DOCUMENTS 3,074,107 A 1/1963 Kiyoshi et al.
3,532,783 A 10/1970 Pusey et al.
(Continued)

FOREIGN PATENT DOCUMENTS

AU 2006232206 A1 10/2006
CN 1060911 A 5/1992
(Continued)

OTHER PUBLICATIONS

Brown, "What is Transmission Welding?" Laser Plasti Welding website, 6 pgs, Retrieved on Dec. 17, 2018 from: http://www.laserplasticwelding.com/what-is-transmission-welding.
(Continued)

*Primary Examiner* — Jerry Rahll
(74) *Attorney, Agent, or Firm* — Michael E. Carroll, Jr.

(57) ABSTRACT

Multiport assemblies comprising one or more optical ports for receiving an external optical fiber connector for making an optical connection along with useful mounting features for securing the multiport assembly are disclosed. The multiport assembly comprises a mounting member having an aperture and a standoff that is coupled to a shell. The standoff extends outward from a lower surface of the shell to allow easy mounting to irregular surfaces. In another embodiment, the multiport assembly may comprise a second mounting member with an aperture and standoff that is received in a rear shell aperture to inhibit damage to the
(Continued)

multiport assembly if a fastener is over-tightened during mounting. In further embodiments, the multiport assembly may comprise a dust plug having a locking feature and a keying port that is received in an optical port for inhibiting dirt, dust or debris from entering when the optical port is not in use.

38 Claims, 25 Drawing Sheets

Related U.S. Application Data continuation of application No. PCT/US2019/067781, filed on Dec. 20, 2019.

(60) Provisional application No. 62/785,871, filed on Dec. 28, 2018.

(56) References Cited

U.S. PATENT DOCUMENTS

| | | | |
|---|---|---|---|
| 3,792,284 | A | 2/1974 | Kaelin |
| 3,912,362 | A | 10/1975 | Hudson |
| 4,003,297 | A | 1/1977 | Mott |
| 4,077,567 | A | 3/1978 | Ginn et al. |
| 4,148,557 | A | 4/1979 | Garvey |
| 4,167,303 | A | 9/1979 | Bowen et al. |
| 4,168,109 | A | 9/1979 | Dumire |
| 4,188,088 | A | 2/1980 | Andersen et al. |
| 4,336,977 | A | 6/1982 | Monaghan et al. |
| 4,354,731 | A | 10/1982 | Mouissie |
| 4,373,777 | A | 2/1983 | Borsuk et al. |
| 4,413,880 | A | 11/1983 | Forrest et al. |
| 4,423,922 | A | 1/1984 | Porter |
| 4,440,471 | A | 4/1984 | Knowles |
| 4,461,537 | A | 7/1984 | Raymer et al. |
| 4,515,434 | A | 5/1985 | Margolin et al. |
| 4,547,937 | A | 10/1985 | Collins |
| 4,560,232 | A | 12/1985 | O'Hara |
| 4,615,581 | A | 10/1986 | Morimoto |
| 4,634,214 | A | 1/1987 | Cannon et al. |
| 4,634,858 | A | 1/1987 | Gerdt et al. |
| 4,684,205 | A | 8/1987 | Margolin et al. |
| 4,688,200 | A | 8/1987 | Poorman et al. |
| 4,690,563 | A | 9/1987 | Barton et al. |
| 4,699,458 | A | 10/1987 | Ohtsuki et al. |
| 4,705,352 | A | 11/1987 | Margolin et al. |
| 4,711,752 | A | 12/1987 | Deacon et al. |
| 4,715,675 | A | 12/1987 | Kevern et al. |
| 4,723,827 | A | 2/1988 | Shaw et al. |
| 4,741,590 | A | 5/1988 | Caron |
| 4,763,983 | A | 8/1988 | Keith |
| 4,783,137 | A | 11/1988 | Kosman et al. |
| 4,842,363 | A | 6/1989 | Margolin et al. |
| 4,844,570 | A | 7/1989 | Tanabe |
| 4,854,664 | A | 8/1989 | Mccartney |
| 4,856,867 | A | 8/1989 | Gaylin |
| 4,877,303 | A | 10/1989 | Caldwell et al. |
| 4,902,238 | A | 2/1990 | Iacobucci |
| 4,913,514 | A | 4/1990 | Then |
| 4,921,413 | A | 5/1990 | Blew |
| 4,944,568 | A | 7/1990 | Danbach et al. |
| 4,960,318 | A | 10/1990 | Nilsson et al. |
| 4,961,623 | A | 10/1990 | Midkiff et al. |
| 4,964,688 | A | 10/1990 | Caldwell et al. |
| 4,979,792 | A | 12/1990 | Weber et al. |
| 4,994,134 | A | 2/1991 | Knecht et al. |
| 4,995,836 | A | 2/1991 | Toramoto |
| 5,007,860 | A | 4/1991 | Robinson et al. |
| 5,016,968 | A | 5/1991 | Hammond et al. |
| 5,028,114 | A | 7/1991 | Krausse et al. |
| 5,058,984 | A | 10/1991 | Bulman et al. |
| 5,067,783 | A | 11/1991 | Lampert |
| 5,073,042 | A | 12/1991 | Mulholland et al. |
| 5,076,656 | A | 12/1991 | Briggs et al. |
| 5,085,492 | A | 2/1992 | Kelsoe et al. |
| 5,088,804 | A | 2/1992 | Grinderslev |
| 5,091,990 | A | 2/1992 | Leung et al. |
| 5,095,176 | A | 3/1992 | Harbrecht et al. |
| 5,129,023 | A | 7/1992 | Anderson et al. |
| 5,131,735 | A | 7/1992 | Berkey et al. |
| 5,134,677 | A | 7/1992 | Leung et al. |
| 5,136,683 | A | 8/1992 | Aoki et al. |
| 5,142,602 | A | 8/1992 | Cabato et al. |
| 5,146,519 | A | 9/1992 | Miller et al. |
| 5,155,900 | A | 10/1992 | Grois et al. |
| 5,162,397 | A | 11/1992 | Descamps et al. |
| 5,180,890 | A | 1/1993 | Pendergrass et al. |
| 5,189,718 | A | 2/1993 | Barrett et al. |
| 5,210,810 | A | 5/1993 | Darden et al. |
| 5,212,752 | A | 5/1993 | Stephenson et al. |
| 5,214,732 | A | 5/1993 | Beard et al. |
| 5,224,187 | A | 6/1993 | Davisdon |
| 5,226,832 | A | 7/1993 | Dejardin et al. |
| 5,231,685 | A | 7/1993 | Hanzawa et al. |
| 5,245,683 | A | 9/1993 | Belenkiy et al. |
| 5,263,105 | A | 11/1993 | Johnson et al. |
| 5,263,239 | A | 11/1993 | Ziemek |
| 5,276,750 | A | 1/1994 | Manning |
| 5,313,540 | A | 5/1994 | Ueda et al. |
| 5,315,679 | A | 5/1994 | Baldwin et al. |
| 5,317,663 | A | 5/1994 | Beard et al. |
| 5,321,917 | A | 6/1994 | Franklin et al. |
| 5,329,603 | A | 7/1994 | Watanabe et al. |
| 5,367,594 | A | 11/1994 | Essert et al. |
| 5,371,823 | A | 12/1994 | Barrett et al. |
| 5,375,183 | A | 12/1994 | Edwards et al. |
| 5,381,494 | A | 1/1995 | O'Donnell et al. |
| 5,390,269 | A | 2/1995 | Palecek et al. |
| 5,390,272 | A | 2/1995 | Repta et al. |
| 5,394,494 | A | 2/1995 | Jennings et al. |
| 5,394,497 | A | 2/1995 | Erdman et al. |
| 5,408,570 | A | 4/1995 | Cook et al. |
| 5,416,874 | A | 5/1995 | Giebel et al. |
| 5,425,121 | A | 6/1995 | Cooke et al. |
| 5,452,388 | A | 9/1995 | Rittle et al. |
| 5,519,799 | A | 5/1996 | Murakami et al. |
| 5,553,186 | A | 9/1996 | Allen |
| 5,557,696 | A | 9/1996 | Stein |
| 5,569,050 | A | 10/1996 | Lloyd |
| 5,588,077 | A | 12/1996 | Woodside |
| 5,600,747 | A | 2/1997 | Yamakawa et al. |
| 5,603,631 | A | 2/1997 | Kawahara et al. |
| 5,608,828 | A | 3/1997 | Coutts et al. |
| 5,631,993 | A | 5/1997 | Cloud et al. |
| 5,647,045 | A | 7/1997 | Robinson et al. |
| 5,673,346 | A | 9/1997 | Iwano et al. |
| 5,682,451 | A | 10/1997 | Lee et al. |
| 5,694,507 | A | 12/1997 | Walles |
| 5,748,821 | A | 5/1998 | Schempp et al. |
| 5,761,359 | A | 6/1998 | Chudoba et al. |
| 5,778,122 | A | 7/1998 | Giebel et al. |
| 5,781,681 | A | 7/1998 | Manning |
| 5,781,686 | A | 7/1998 | Robinson et al. |
| 5,782,892 | A | 7/1998 | Castle et al. |
| 5,789,701 | A | 8/1998 | Wettengel et al. |
| 5,790,740 | A | 8/1998 | Cloud et al. |
| 5,791,918 | A | 8/1998 | Pierce |
| 5,796,895 | A | 8/1998 | Jennings et al. |
| RE35,935 | E | 10/1998 | Cabato et al. |
| 5,818,993 | A | 10/1998 | Chudoba et al. |
| 5,857,050 | A | 1/1999 | Jiang et al. |
| 5,862,290 | A | 1/1999 | Burek et al. |
| 5,867,621 | A | 2/1999 | Luther et al. |
| 5,876,071 | A | 3/1999 | Aldridge |
| 5,883,999 | A | 3/1999 | Cloud et al. |
| 5,884,000 | A | 3/1999 | Cloud et al. |
| 5,884,001 | A | 3/1999 | Cloud et al. |
| 5,884,002 | A | 3/1999 | Cloud et al. |
| 5,884,003 | A | 3/1999 | Cloud et al. |
| 5,887,099 | A | 3/1999 | Csipkes et al. |
| 5,913,001 | A | 6/1999 | Nakajima et al. |
| 5,920,669 | A | 7/1999 | Knecht et al. |

(56) References Cited

U.S. PATENT DOCUMENTS

| | | | |
|---|---|---|---|
| 5,923,804 | A | 7/1999 | Rosson |
| 5,925,191 | A | 7/1999 | Stein et al. |
| 5,926,596 | A | 7/1999 | Edwards et al. |
| 5,960,141 | A | 9/1999 | Sasaki et al. |
| 5,961,344 | A | 10/1999 | Rosales et al. |
| 5,971,626 | A | 10/1999 | Knodell et al. |
| 5,993,070 | A | 11/1999 | Tamekuni et al. |
| RE36,592 | E | 2/2000 | Giebel et al. |
| 6,030,129 | A | 2/2000 | Rosson |
| 6,035,084 | A | 3/2000 | Haake et al. |
| 6,045,270 | A | 4/2000 | Weiss et al. |
| 6,079,881 | A | 6/2000 | Roth |
| 6,094,517 | A | 7/2000 | Yuuki |
| 6,108,482 | A | 8/2000 | Roth |
| 6,112,006 | A | 8/2000 | Foss |
| 6,149,313 | A | 11/2000 | Giebel et al. |
| 6,151,432 | A | 11/2000 | Nakajima et al. |
| RE37,028 | E | 1/2001 | Cooke et al. |
| 6,173,097 | B1 | 1/2001 | Throckmorton et al. |
| 6,179,482 | B1 | 1/2001 | Takizawa et al. |
| 6,188,822 | B1 | 2/2001 | Mcalpine et al. |
| 6,193,421 | B1 | 2/2001 | Tamekuni et al. |
| RE37,079 | E | 3/2001 | Stephenson et al. |
| RE37,080 | E | 3/2001 | Stephenson et al. |
| 6,200,040 | B1 | 3/2001 | Edwards et al. |
| 6,206,579 | B1 | 3/2001 | Selfridge et al. |
| 6,206,581 | B1 | 3/2001 | Driscoll et al. |
| 6,220,762 | B1 | 4/2001 | Kanai et al. |
| 6,224,268 | B1 | 5/2001 | Manning et al. |
| 6,224,270 | B1 | 5/2001 | Nakajima et al. |
| 6,229,944 | B1 | 5/2001 | Yokokawa et al. |
| 6,234,683 | B1 | 5/2001 | Waldron et al. |
| 6,234,685 | B1 | 5/2001 | Carlisle et al. |
| 6,249,628 | B1 | 6/2001 | Rutterman et al. |
| 6,256,438 | B1 | 7/2001 | Gimblet |
| 6,261,006 | B1 | 7/2001 | Selfridge |
| 6,264,374 | B1 | 7/2001 | Selfridge et al. |
| 6,269,214 | B1 | 7/2001 | Naudin et al. |
| 6,287,016 | B1 | 9/2001 | Weigel |
| 6,293,710 | B1 | 9/2001 | Lampert et al. |
| 6,298,190 | B2 | 10/2001 | Waldron et al. |
| 6,304,698 | B1 | 10/2001 | Morris |
| 6,305,849 | B1 | 10/2001 | Roehrs et al. |
| 6,321,013 | B1 | 11/2001 | Hardwick et al. |
| 6,340,249 | B1 | 1/2002 | Hayes et al. |
| 6,356,390 | B1 | 3/2002 | Hall, Jr. |
| 6,356,690 | B1 | 3/2002 | Mcalpine et al. |
| 6,357,929 | B1 | 3/2002 | Roehrs et al. |
| 6,371,660 | B1 | 4/2002 | Roehrs et al. |
| 6,375,363 | B1 | 4/2002 | Harrison et al. |
| 6,379,054 | B2 | 4/2002 | Throckmorton et al. |
| 6,386,891 | B1 | 5/2002 | Howard et al. |
| 6,402,388 | B1 | 6/2002 | Imazu et al. |
| 6,404,962 | B1 | 6/2002 | Hardwick et al. |
| 6,409,391 | B1 | 6/2002 | Chang |
| D460,043 | S | 7/2002 | Fan Wong |
| 6,422,764 | B1 | 7/2002 | Marrs et al. |
| 6,427,035 | B1 | 7/2002 | Mahony |
| 6,428,215 | B1 | 8/2002 | Nault |
| 6,439,780 | B1 | 8/2002 | Mudd et al. |
| 6,443,626 | B1 | 9/2002 | Foster |
| 6,466,725 | B2 | 10/2002 | Battey et al. |
| 6,487,344 | B1 | 11/2002 | Naudin et al. |
| 6,496,641 | B1 | 12/2002 | Mahony |
| 6,501,888 | B2 | 12/2002 | Gimblet et al. |
| 6,522,804 | B1 | 2/2003 | Mahony |
| 6,529,663 | B1 | 3/2003 | Parris et al. |
| 6,533,468 | B2 | 3/2003 | Nakajima et al. |
| 6,536,956 | B2 | 3/2003 | Luther et al. |
| 6,539,147 | B1 | 3/2003 | Mahony |
| 6,540,410 | B2 | 4/2003 | Childers et al. |
| 6,542,652 | B1 | 4/2003 | Mahony |
| 6,542,674 | B1 | 4/2003 | Gimblet |
| 6,546,175 | B1 | 4/2003 | Wagman et al. |
| 6,554,489 | B2 | 4/2003 | Kent et al. |
| 6,579,014 | B2 | 6/2003 | Melton et al. |
| 6,599,026 | B1 | 7/2003 | Fahrnbauer et al. |
| 6,599,027 | B2 | 7/2003 | Miyake et al. |
| 6,614,980 | B1 | 9/2003 | Mahony |
| 6,618,526 | B2 | 9/2003 | Jackman et al. |
| 6,619,697 | B2 | 9/2003 | Griffioen et al. |
| 6,621,964 | B2 | 9/2003 | Quinn et al. |
| 6,625,375 | B1 | 9/2003 | Mahony |
| 6,629,782 | B2 | 10/2003 | Mcphee et al. |
| 6,644,862 | B1 | 11/2003 | Berto et al. |
| 6,648,520 | B2 | 11/2003 | Mcdonald et al. |
| 6,668,127 | B1 | 12/2003 | Mahony |
| 6,672,774 | B2 | 1/2004 | Theuerkorn et al. |
| 6,678,442 | B2 | 1/2004 | Gall et al. |
| 6,678,448 | B2 | 1/2004 | Moisel et al. |
| 6,685,361 | B1 | 2/2004 | Rubino et al. |
| 6,695,489 | B2 | 2/2004 | Nault |
| 6,702,475 | B1 | 3/2004 | Giobbio et al. |
| 6,714,708 | B2 | 3/2004 | Mcalpine et al. |
| 6,714,710 | B2 | 3/2004 | Gimblet |
| 6,729,773 | B1 | 5/2004 | Finona et al. |
| 6,738,555 | B1 | 5/2004 | Cooke et al. |
| 6,748,146 | B2 | 6/2004 | Parris |
| 6,748,147 | B2 | 6/2004 | Quinn et al. |
| 6,771,861 | B2 | 8/2004 | Wagner et al. |
| 6,785,450 | B2 | 8/2004 | Wagman et al. |
| 6,789,950 | B1 | 9/2004 | Loder et al. |
| 6,809,265 | B1 | 10/2004 | Gladd et al. |
| 6,841,729 | B2 | 1/2005 | Sakabe et al. |
| 6,848,838 | B2 | 2/2005 | Doss et al. |
| 6,856,748 | B1 | 2/2005 | Elkins et al. |
| 6,877,906 | B2 | 4/2005 | Mizukami et al. |
| 6,880,219 | B2 | 4/2005 | Griffioen et al. |
| 6,899,467 | B2 | 5/2005 | Mcdonald et al. |
| 6,908,233 | B2 | 6/2005 | Nakajima et al. |
| 6,909,821 | B2 | 6/2005 | Ravasio et al. |
| 6,916,120 | B2 | 7/2005 | Zimmel et al. |
| 6,918,704 | B2 | 7/2005 | Marrs et al. |
| 6,944,387 | B2 | 9/2005 | Howell et al. |
| 6,962,445 | B2 | 11/2005 | Zimmel et al. |
| 6,970,629 | B2 | 11/2005 | Lail et al. |
| 6,983,095 | B2 | 1/2006 | Reagan et al. |
| 7,001,081 | B2 | 2/2006 | Cox et al. |
| 7,011,454 | B2 | 3/2006 | Caveney et al. |
| 7,013,074 | B2 | 3/2006 | Battey et al. |
| 7,025,507 | B2 | 4/2006 | De Marchi |
| 7,033,191 | B1 | 4/2006 | Cao |
| 7,044,650 | B1 | 5/2006 | Tran et al. |
| 7,052,185 | B2 | 5/2006 | Rubino et al. |
| 7,079,734 | B2 | 7/2006 | Seddon et al. |
| 7,085,468 | B2 | 8/2006 | Forrester |
| 7,088,899 | B2 | 8/2006 | Reagan et al. |
| 7,090,406 | B2 | 8/2006 | Melton et al. |
| 7,090,407 | B2 | 8/2006 | Melton et al. |
| 7,090,409 | B2 | 8/2006 | Nakajima et al. |
| 7,103,255 | B2 | 9/2006 | Reagan et al. |
| 7,103,257 | B2 | 9/2006 | Donaldson et al. |
| 7,104,702 | B2 | 9/2006 | Barnes et al. |
| 7,111,990 | B2 | 9/2006 | Melton et al. |
| 7,113,679 | B2 | 9/2006 | Melton et al. |
| 7,118,283 | B2 | 10/2006 | Nakajima et al. |
| 7,118,284 | B2 | 10/2006 | Nakajima et al. |
| 7,120,347 | B2 | 10/2006 | Blackwell et al. |
| 7,137,742 | B2 | 11/2006 | Theuerkorn et al. |
| 7,146,089 | B2 | 12/2006 | Reagan et al. |
| 7,146,090 | B2 | 12/2006 | Vo et al. |
| 7,150,567 | B1 | 12/2006 | Luther et al. |
| 7,165,893 | B2 | 1/2007 | Schmitz |
| 7,171,102 | B2 | 1/2007 | Reagan et al. |
| 7,178,990 | B2 | 2/2007 | Caveney et al. |
| 7,184,634 | B2 | 2/2007 | Hurley et al. |
| 7,195,403 | B2 | 3/2007 | Oki et al. |
| 7,200,317 | B2 | 4/2007 | Reagan et al. |
| 7,201,518 | B2 | 4/2007 | Holmquist |
| 7,204,644 | B2 | 4/2007 | Barnes et al. |
| 7,213,975 | B2 | 5/2007 | Khemakhem et al. |
| 7,213,980 | B2 | 5/2007 | Oki et al. |
| 7,228,047 | B1 | 6/2007 | Szilagyi et al. |
| 7,232,260 | B2 | 6/2007 | Takahashi et al. |

(56) References Cited

U.S. PATENT DOCUMENTS

| | | | |
|---|---|---|---|
| 7,236,670 | B2 | 6/2007 | Lail et al. |
| 7,241,056 | B1 | 7/2007 | Kuffel et al. |
| 7,260,301 | B2 | 8/2007 | Barth et al. |
| 7,261,472 | B2 | 8/2007 | Suzuki et al. |
| 7,266,265 | B2 | 9/2007 | Gall et al. |
| 7,266,274 | B2 | 9/2007 | Elkins et al. |
| 7,270,487 | B2 | 9/2007 | Billman et al. |
| 7,277,614 | B2 | 10/2007 | Cody et al. |
| 7,279,643 | B2 | 10/2007 | Morrow et al. |
| 7,292,763 | B2 | 11/2007 | Smith et al. |
| 7,302,152 | B2 | 11/2007 | Luther et al. |
| 7,318,677 | B2 | 1/2008 | Dye |
| 7,326,091 | B2 | 2/2008 | Nania et al. |
| 7,330,629 | B2 | 2/2008 | Cooke et al. |
| 7,333,708 | B2 | 2/2008 | Blackwell et al. |
| 7,336,873 | B2 | 2/2008 | Lail et al. |
| 7,341,382 | B2 | 3/2008 | Dye |
| 7,346,256 | B2 | 3/2008 | Marrs et al. |
| 7,349,605 | B2 | 3/2008 | Noonan et al. |
| 7,357,579 | B2 | 4/2008 | Feldner |
| 7,357,582 | B2 | 4/2008 | Oki et al. |
| 7,366,416 | B2 | 4/2008 | Ramachandran et al. |
| 7,394,964 | B2 | 7/2008 | Tinucci et al. |
| 7,397,997 | B2 | 7/2008 | Ferris et al. |
| 7,400,815 | B2 | 7/2008 | Mertesdorf et al. |
| D574,775 | S | 8/2008 | Amidon |
| 7,407,332 | B2 | 8/2008 | Oki et al. |
| 7,428,366 | B2 | 9/2008 | Mullaney et al. |
| 7,444,056 | B2 | 10/2008 | Allen et al. |
| 7,454,107 | B2 | 11/2008 | Miller et al. |
| 7,463,803 | B2 | 12/2008 | Cody et al. |
| 7,467,896 | B2 | 12/2008 | Melton et al. |
| 7,469,091 | B2 | 12/2008 | Mullaney et al. |
| 7,477,824 | B2 | 1/2009 | Reagan et al. |
| 7,480,437 | B2 | 1/2009 | Ferris et al. |
| 7,484,898 | B2 | 2/2009 | Katagiyama et al. |
| 7,485,804 | B2 | 2/2009 | Dinh et al. |
| 7,489,849 | B2 | 2/2009 | Reagan et al. |
| 7,492,996 | B2 | 2/2009 | Kowalczyk et al. |
| 7,497,896 | B2 | 3/2009 | Bromet et al. |
| 7,512,304 | B2 | 3/2009 | Gronvall et al. |
| 7,520,678 | B2 | 4/2009 | Khemakhem et al. |
| 7,539,387 | B2 | 5/2009 | Mertesdorf et al. |
| 7,539,388 | B2 | 5/2009 | Mertesdorf et al. |
| 7,542,645 | B1 | 6/2009 | Hua et al. |
| 7,559,702 | B2 | 7/2009 | Fujiwara et al. |
| 7,565,055 | B2 | 7/2009 | Lu et al. |
| 7,568,845 | B2 | 8/2009 | Caveney et al. |
| 7,572,065 | B2 | 8/2009 | Lu et al. |
| 7,580,607 | B2 | 8/2009 | Jones et al. |
| 7,591,595 | B2 | 9/2009 | Lu et al. |
| 7,614,797 | B2 | 11/2009 | Lu et al. |
| 7,621,675 | B1 | 11/2009 | Bradley |
| 7,627,222 | B2 | 12/2009 | Reagan et al. |
| 7,628,545 | B2 | 12/2009 | Cody et al. |
| 7,628,548 | B2 | 12/2009 | Benjamin et al. |
| 7,641,398 | B2 | 1/2010 | O'Riorden et al. |
| 7,646,958 | B1 | 1/2010 | Reagan et al. |
| 7,653,282 | B2 | 1/2010 | Blackwell et al. |
| 7,654,747 | B2 | 2/2010 | Theuerkorn et al. |
| 7,654,748 | B2 | 2/2010 | Kuffel et al. |
| 7,658,549 | B2 | 2/2010 | Elkins et al. |
| 7,661,995 | B2 | 2/2010 | Nania et al. |
| 7,677,812 | B2 | 3/2010 | Castagna et al. |
| 7,677,814 | B2 | 3/2010 | Lu et al. |
| 7,680,388 | B2 | 3/2010 | Reagan et al. |
| 7,695,197 | B2 | 4/2010 | Gurreri |
| 7,708,476 | B2 | 5/2010 | Liu |
| 7,709,733 | B1 | 5/2010 | Plankell |
| 7,712,971 | B2 | 5/2010 | Lee et al. |
| 7,713,679 | B2 | 5/2010 | Ishiduka et al. |
| 7,722,262 | B2 | 5/2010 | Caveney et al. |
| 7,726,998 | B2 | 6/2010 | Siebens |
| 7,738,759 | B2 | 6/2010 | Parikh et al. |
| 7,740,409 | B2 | 6/2010 | Bolton et al. |
| 7,742,117 | B2 | 6/2010 | Lee et al. |
| 7,742,670 | B2 | 6/2010 | Benjamin et al. |
| 7,744,286 | B2 | 6/2010 | Lu et al. |
| 7,744,288 | B2 | 6/2010 | Lu et al. |
| 7,747,117 | B2 | 6/2010 | Greenwood et al. |
| 7,751,666 | B2 | 7/2010 | Parsons et al. |
| 7,753,596 | B2 | 7/2010 | Cox |
| 7,762,726 | B2 | 7/2010 | Lu et al. |
| 7,785,015 | B2 | 8/2010 | Melton et al. |
| 7,785,019 | B2 | 8/2010 | Lewallen et al. |
| RE41,743 | E | 9/2010 | Naudin et al. |
| 7,802,926 | B2 | 9/2010 | Leeman et al. |
| 7,805,044 | B2 | 9/2010 | Reagan et al. |
| 7,806,599 | B2 | 10/2010 | Margolin et al. |
| 7,811,006 | B2 | 10/2010 | Milette et al. |
| 7,820,090 | B2 | 10/2010 | Morrow et al. |
| D626,506 | S | 11/2010 | Giefers et al. |
| 7,844,148 | B2 | 11/2010 | Jenkins et al. |
| 7,844,158 | B2 | 11/2010 | Gronvall et al. |
| 7,844,160 | B2 | 11/2010 | Reagan et al. |
| 7,869,681 | B2 | 1/2011 | Battey et al. |
| RE42,094 | E | 2/2011 | Barnes et al. |
| 7,881,576 | B2 | 2/2011 | Melton et al. |
| 7,889,961 | B2 | 2/2011 | Cote et al. |
| 7,891,882 | B2 | 2/2011 | Kuffel et al. |
| 7,903,923 | B2 | 3/2011 | Gronvall et al. |
| 7,903,925 | B2 | 3/2011 | Cooke et al. |
| 7,918,609 | B2 | 4/2011 | Melton et al. |
| 7,933,517 | B2 | 4/2011 | Ye et al. |
| 7,938,670 | B2 | 5/2011 | Nania et al. |
| 7,941,027 | B2 | 5/2011 | Mertesdorf et al. |
| 7,942,590 | B2 | 5/2011 | Lu et al. |
| 7,959,361 | B2 | 6/2011 | Lu et al. |
| 8,002,476 | B2 | 8/2011 | Caveney et al. |
| 8,005,335 | B2 | 8/2011 | Reagan et al. |
| 8,023,793 | B2 | 9/2011 | Kowalczyk et al. |
| 8,025,445 | B2 | 9/2011 | Rambow et al. |
| 8,041,178 | B2 | 10/2011 | Lu et al. |
| 8,052,333 | B2 | 11/2011 | Kuffel et al. |
| 8,055,167 | B2 | 11/2011 | Park et al. |
| 8,083,418 | B2 | 12/2011 | Fujiwara et al. |
| 8,111,966 | B2 | 2/2012 | Holmberg et al. |
| 8,137,002 | B2 | 3/2012 | Lu et al. |
| 8,147,147 | B2 | 4/2012 | Khemakhem et al. |
| 8,157,454 | B2 | 4/2012 | Ito et al. |
| 8,164,050 | B2 | 4/2012 | Ford et al. |
| 8,180,191 | B2 | 5/2012 | Blackwell et al. |
| 8,202,008 | B2 | 6/2012 | Lu et al. |
| 8,213,761 | B2 | 7/2012 | Gronvall et al. |
| 8,218,935 | B2 | 7/2012 | Reagan et al. |
| 8,224,145 | B2 | 7/2012 | Reagan et al. |
| 8,229,263 | B2 | 7/2012 | Parris et al. |
| 8,231,282 | B2 | 7/2012 | Kuffel et al. |
| 8,238,706 | B2 | 8/2012 | Kachmar |
| 8,238,709 | B2 | 8/2012 | Solheid et al. |
| 8,249,450 | B2 | 8/2012 | Conner |
| 8,256,971 | B2 | 9/2012 | Caveney et al. |
| 8,267,596 | B2 | 9/2012 | Theuerkorn |
| 8,272,792 | B2 | 9/2012 | Coleman et al. |
| RE43,762 | E | 10/2012 | Smith et al. |
| 8,301,003 | B2 | 10/2012 | De et al. |
| 8,301,004 | B2 | 10/2012 | Cooke et al. |
| 8,317,411 | B2 | 11/2012 | Fujiwara et al. |
| 8,348,519 | B2 | 1/2013 | Kuffel et al. |
| 8,363,999 | B2 | 1/2013 | Mertesdorf et al. |
| 8,376,629 | B2 | 2/2013 | Cline et al. |
| 8,376,632 | B2 | 2/2013 | Blackburn et al. |
| 8,402,587 | B2 | 3/2013 | Sugita et al. |
| 8,408,811 | B2 | 4/2013 | De et al. |
| 8,414,196 | B2 | 4/2013 | Lu et al. |
| 8,439,577 | B2 | 5/2013 | Jenkins |
| 8,465,235 | B2 | 6/2013 | Jenkins et al. |
| 8,466,262 | B2 | 6/2013 | Siadak et al. |
| 8,472,773 | B2 | 6/2013 | De Jong |
| 8,480,312 | B2 | 7/2013 | Smith et al. |
| 8,494,329 | B2 | 7/2013 | Nhep et al. |
| 8,496,384 | B2 | 7/2013 | Kuffel et al. |
| 8,506,173 | B2 | 8/2013 | Lewallen et al. |
| 8,520,996 | B2 | 8/2013 | Cowen et al. |

(56) References Cited

U.S. PATENT DOCUMENTS

| | | | |
|---|---|---|---|
| 8,534,928 | B2 | 9/2013 | Cooke et al. |
| 8,536,516 | B2 | 9/2013 | Ford et al. |
| 8,556,522 | B2 | 10/2013 | Cunningham |
| 8,556,645 | B2 | 10/2013 | Crain |
| 8,573,855 | B2 | 11/2013 | Nhep |
| 8,591,124 | B2 | 11/2013 | Griffiths et al. |
| 8,622,627 | B2 | 1/2014 | Elkins et al. |
| 8,622,634 | B2 | 1/2014 | Arnold et al. |
| 8,634,688 | B2 | 1/2014 | Bryon et al. |
| 8,635,733 | B2 | 1/2014 | Bardzilowski |
| 8,662,760 | B2 | 3/2014 | Cline et al. |
| 8,668,512 | B2 | 3/2014 | Chang |
| 8,678,668 | B2 | 3/2014 | Cooke et al. |
| 8,687,930 | B2 | 4/2014 | Mcdowell et al. |
| 8,702,324 | B2 | 4/2014 | Caveney et al. |
| 8,714,835 | B2 | 5/2014 | Kuffel et al. |
| 8,727,638 | B2 | 5/2014 | Lee et al. |
| 8,737,837 | B2 | 5/2014 | Conner et al. |
| 8,755,654 | B1 | 6/2014 | Danley et al. |
| 8,755,663 | B2 | 6/2014 | Makrides-Saravanos et al. |
| 8,758,046 | B2 | 6/2014 | Pezzetti et al. |
| 8,764,316 | B1 | 7/2014 | Barnette et al. |
| 8,768,133 | B2 | 7/2014 | Bryon et al. |
| 8,770,861 | B2 | 7/2014 | Smith et al. |
| 8,770,862 | B2 | 7/2014 | Lu et al. |
| D711,320 | S | 8/2014 | Yang et al. |
| 8,798,430 | B2 | 8/2014 | Bryon et al. |
| D712,360 | S | 9/2014 | Su et al. |
| 8,821,036 | B2 | 9/2014 | Shigehara |
| 8,837,894 | B2 | 9/2014 | Holmberg et al. |
| 8,864,390 | B2 | 10/2014 | Chen et al. |
| 8,870,469 | B2 | 10/2014 | Kachmar |
| 8,879,883 | B2 | 11/2014 | Parikh et al. |
| 8,882,364 | B2 | 11/2014 | Busse et al. |
| 8,917,966 | B2 | 12/2014 | Thompson et al. |
| 8,944,703 | B2 | 2/2015 | Song et al. |
| 8,974,124 | B2 | 3/2015 | Chang |
| 8,985,862 | B2 | 3/2015 | Cote et al. |
| 8,992,097 | B2 | 3/2015 | Koreeda et al. |
| 8,998,502 | B2 | 4/2015 | Benjamin et al. |
| 8,998,506 | B2 | 4/2015 | Pepin et al. |
| 9,011,858 | B2 | 4/2015 | Siadak et al. |
| 9,039,293 | B2 | 5/2015 | Hill et al. |
| 9,057,862 | B2 | 6/2015 | Strasser et al. |
| 9,075,205 | B2 | 7/2015 | Pepe et al. |
| 9,081,154 | B2 | 7/2015 | Zimmel et al. |
| 9,146,364 | B2 | 9/2015 | Chen et al. |
| D741,803 | S | 10/2015 | Davidson, Jr. |
| 9,151,906 | B2 | 10/2015 | Kobayashi et al. |
| 9,151,909 | B2 | 10/2015 | Chen et al. |
| 9,158,074 | B2 | 10/2015 | Anderson et al. |
| 9,158,075 | B2 | 10/2015 | Benjamin et al. |
| 9,182,567 | B2 | 11/2015 | Mullaney |
| 9,188,759 | B2 | 11/2015 | Conner |
| 9,207,410 | B2 | 12/2015 | Lee et al. |
| 9,207,421 | B2 | 12/2015 | Conner |
| 9,213,150 | B2 | 12/2015 | Matsui et al. |
| 9,223,106 | B2 | 12/2015 | Coan et al. |
| 9,239,441 | B2 | 1/2016 | Melton et al. |
| D749,519 | S | 2/2016 | Su et al. |
| 9,268,102 | B2 | 2/2016 | Daems et al. |
| 9,274,286 | B2 | 3/2016 | Caveney et al. |
| 9,279,951 | B2 | 3/2016 | Mcgranahan et al. |
| 9,285,550 | B2 | 3/2016 | Nhep et al. |
| 9,297,974 | B2 | 3/2016 | Valderrabano et al. |
| 9,297,976 | B2 | 3/2016 | Hill et al. |
| 9,310,570 | B2 | 4/2016 | Busse et al. |
| 9,316,791 | B2 | 4/2016 | Durrant et al. |
| 9,322,998 | B2 | 4/2016 | Miller |
| 9,360,640 | B2 | 6/2016 | Ishigami et al. |
| 9,383,539 | B2 | 7/2016 | Hill et al. |
| 9,400,364 | B2 | 7/2016 | Hill et al. |
| 9,405,068 | B2 | 8/2016 | Graham et al. |
| 9,417,403 | B2 | 8/2016 | Mullaney et al. |
| 9,423,584 | B2 | 8/2016 | Coan et al. |
| 9,429,732 | B2 | 8/2016 | Ahmed et al. |
| 9,435,969 | B2 | 9/2016 | Lambourn et al. |
| 9,442,257 | B2 | 9/2016 | Lu |
| 9,450,393 | B2 | 9/2016 | Thompson et al. |
| 9,459,412 | B2 | 10/2016 | Katoh |
| 9,482,819 | B2 | 11/2016 | Li et al. |
| 9,482,829 | B2 | 11/2016 | Lu et al. |
| 9,513,444 | B2 | 12/2016 | Barnette et al. |
| 9,513,451 | B2 | 12/2016 | Corbille et al. |
| 9,535,229 | B2 | 1/2017 | Ott et al. |
| 9,541,711 | B2 | 1/2017 | Raven et al. |
| 9,551,842 | B2 | 1/2017 | Theuerkorn |
| 9,557,504 | B2 | 1/2017 | Holmberg et al. |
| 9,581,775 | B2 | 2/2017 | Kondo et al. |
| 9,588,304 | B2 | 3/2017 | Durrant et al. |
| 9,595,786 | B1 | 3/2017 | Takano et al. |
| D783,618 | S | 4/2017 | Wu et al. |
| 9,612,407 | B2 | 4/2017 | Kobayashi et al. |
| 9,618,704 | B2 | 4/2017 | Dean et al. |
| 9,618,718 | B2 | 4/2017 | Islam |
| 9,624,296 | B2 | 4/2017 | Siadak et al. |
| 9,625,660 | B2 | 4/2017 | Daems et al. |
| 9,638,871 | B2 | 5/2017 | Bund et al. |
| 9,645,331 | B1 | 5/2017 | Kim |
| 9,645,334 | B2 | 5/2017 | Ishii et al. |
| 9,651,741 | B2 | 5/2017 | Isenhour et al. |
| 9,664,862 | B2 | 5/2017 | Lu et al. |
| 9,678,285 | B2 | 6/2017 | Hill et al. |
| 9,678,293 | B2 | 6/2017 | Coan et al. |
| 9,684,136 | B2 | 6/2017 | Cline et al. |
| 9,684,138 | B2 | 6/2017 | Lu |
| 9,696,500 | B2 | 7/2017 | Barnette et al. |
| 9,711,868 | B2 | 7/2017 | Scheucher |
| 9,720,193 | B2 | 8/2017 | Nishimura |
| 9,733,436 | B2 | 8/2017 | Van et al. |
| 9,739,951 | B2 | 8/2017 | Busse et al. |
| 9,762,322 | B1 | 9/2017 | Amundson |
| 9,766,416 | B1 | 9/2017 | Kim |
| 9,772,457 | B2 | 9/2017 | Hill et al. |
| 9,804,343 | B2 | 10/2017 | Hill et al. |
| 9,810,855 | B2 | 11/2017 | Cox et al. |
| 9,810,856 | B2 | 11/2017 | Graham et al. |
| 9,829,658 | B2 | 11/2017 | Nishimura |
| 9,829,668 | B2 | 11/2017 | Coenegracht et al. |
| 9,851,522 | B2 | 12/2017 | Reagan et al. |
| 9,857,540 | B2 | 1/2018 | Ahmed et al. |
| 9,864,151 | B2 | 1/2018 | Lu |
| 9,878,038 | B2 | 1/2018 | Siadak et al. |
| D810,029 | S | 2/2018 | Robert et al. |
| 9,885,841 | B2 | 2/2018 | Pepe et al. |
| 9,891,391 | B2 | 2/2018 | Watanabe |
| 9,905,933 | B2 | 2/2018 | Scheucher |
| 9,910,224 | B2 | 3/2018 | Liu et al. |
| 9,910,236 | B2 | 3/2018 | Cooke et al. |
| 9,921,375 | B2 | 3/2018 | Compton et al. |
| 9,927,580 | B2 | 3/2018 | Bretz et al. |
| 9,933,582 | B1 | 4/2018 | Lin |
| 9,939,591 | B2 | 4/2018 | Mullaney et al. |
| 9,964,713 | B2 | 5/2018 | Barnette et al. |
| 9,964,715 | B2 | 5/2018 | Lu |
| 9,977,194 | B2 | 5/2018 | Waldron et al. |
| 9,977,198 | B2 | 5/2018 | Bund et al. |
| 9,983,374 | B2 | 5/2018 | Li et al. |
| 9,989,711 | B2 | 6/2018 | Ott et al. |
| 10,007,068 | B2 | 6/2018 | Hill et al. |
| 10,031,302 | B2 | 7/2018 | Ji et al. |
| 10,036,859 | B2 | 7/2018 | Daems et al. |
| 10,038,946 | B2 | 7/2018 | Smolorz |
| 10,042,136 | B2 | 8/2018 | Reagan et al. |
| 10,061,090 | B2 | 8/2018 | Coenegracht |
| 10,061,091 | B2 | 8/2018 | Kempeneers et al. |
| 10,073,224 | B2 | 9/2018 | Tong et al. |
| 10,094,986 | B2 | 10/2018 | Barnette et al. |
| 10,101,538 | B2 | 10/2018 | Lu et al. |
| 10,107,968 | B2 | 10/2018 | Tong et al. |
| 10,109,927 | B2 | 10/2018 | Scheucher |
| 10,114,176 | B2 | 10/2018 | Gimblet et al. |
| 10,126,508 | B2 | 11/2018 | Compton et al. |
| 10,133,019 | B2 | 11/2018 | Kowalczyk et al. |

(56) References Cited

U.S. PATENT DOCUMENTS 10,180,541 B2 1/2019 Coenegracht et al.
10,209,454 B2 2/2019 Isenhour et al.
10,215,930 B2 2/2019 Mullaney et al.
10,235,184 B2 3/2019 Walker
10,261,268 B2 4/2019 Theuerkorn
10,268,011 B2 4/2019 Courchaine et al.
10,288,820 B2 5/2019 Coenegracht
10,288,821 B2 5/2019 Isenhour
10,317,628 B2 6/2019 Van et al.
10,324,263 B2 6/2019 Bund et al.
10,338,323 B2 7/2019 Lu et al.
10,353,154 B2 7/2019 Ott et al.
10,353,156 B2 7/2019 Hill et al.
10,359,577 B2 7/2019 Dannoux et al.
10,371,914 B2 8/2019 Coan et al.
10,379,298 B2 8/2019 Dannoux et al.
10,379,308 B2 8/2019 Coate
10,386,584 B2 8/2019 Rosson
10,401,575 B2 9/2019 Daily et al.
10,401,578 B2 9/2019 Coenegracht
10,401,584 B2 9/2019 Coan et al.
10,409,007 B2 9/2019 Kadar-Kallen et al.
10,422,962 B2 9/2019 Coenegracht
10,422,970 B2 9/2019 Holmberg et al.
10,429,593 B2 10/2019 Baca et al.
10,429,594 B2 10/2019 Dannoux et al.
10,434,173 B2 10/2019 Siadak et al.
10,439,295 B2 10/2019 Scheucher
10,444,442 B2 10/2019 Takano et al.
10,451,811 B2 10/2019 Coenegracht et al.
10,451,817 B2 10/2019 Lu
10,451,830 B2 10/2019 Szumacher et al.
10,488,597 B2 11/2019 Parikh et al.
10,495,822 B2 12/2019 Nhep
10,502,916 B2 12/2019 Coan et al.
10,502,920 B2 * 12/2019 Coenegracht ........ G02B 6/4472
10,520,683 B2 12/2019 Nhep
10,539,745 B2 1/2020 Kamada et al.
10,545,298 B2 1/2020 Bauco et al.
10,578,821 B2 3/2020 Ott et al.
10,585,246 B2 3/2020 Bretz et al.
10,591,678 B2 3/2020 Mullaney et al.
10,605,998 B2 3/2020 Rosson
10,606,006 B2 3/2020 Hill et al.
D880,423 S 4/2020 Obata et al.
10,613,278 B2 4/2020 Kempeneers et al.
10,620,388 B2 4/2020 Isenhour et al.
10,641,967 B1 5/2020 Cote et al.
10,656,347 B2 5/2020 Kato
10,677,998 B2 6/2020 Van et al.
10,680,343 B2 6/2020 Scheucher
10,712,516 B2 7/2020 Courchaine et al.
10,739,534 B2 8/2020 Murray et al.
10,746,939 B2 8/2020 Lu et al.
10,761,274 B2 9/2020 Pepe et al.
10,768,382 B2 9/2020 Cote et al.
10,782,487 B2 9/2020 Lu
10,802,236 B2 10/2020 Kowalczyk et al.
10,830,967 B2 11/2020 Pimentel et al.
10,830,975 B2 11/2020 Vaughn et al.
10,852,498 B2 12/2020 Hill et al.
10,852,499 B2 12/2020 Cooke et al.
10,859,771 B2 12/2020 Nhep
10,859,781 B2 12/2020 Hill et al.
10,921,530 B2 2/2021 Wong et al.
10,921,531 B2 2/2021 Wong et al.
10,962,731 B2 3/2021 Coenegracht
10,976,500 B2 4/2021 Ott et al.
11,061,191 B2 7/2021 Van Baelen et al.
11,073,664 B2 7/2021 Chang et al.
11,105,986 B2 8/2021 Coenegracht et al.
11,112,567 B2 9/2021 Higley et al.
11,161,603 B2 11/2021 Vallart et al.
11,262,509 B2 3/2022 Rosson
11,290,188 B2 3/2022 Tuccio et al.
11,487,073 B2 11/2022 Ripumaree et al.
11,493,700 B2 11/2022 Rosson
D982,519 S 4/2023 Gaidosch
2001/0002220 A1 5/2001 Throckmorton et al.
2001/0012428 A1 8/2001 Nakajima et al.
2001/0019654 A1 9/2001 Waldron et al.
2001/0036342 A1 11/2001 Knecht et al.
2001/0036345 A1 11/2001 Gimblet et al.
2002/0012502 A1 1/2002 Farrar et al.
2002/0062978 A1 5/2002 Sakabe et al.
2002/0064364 A1 5/2002 Battey et al.
2002/0076165 A1 6/2002 Childers et al.
2002/0079697 A1 6/2002 Griffioen et al.
2002/0081077 A1 6/2002 Nault
2002/0122634 A1 9/2002 Miyake et al.
2002/0122653 A1 9/2002 Donaldson et al.
2002/0131721 A1 9/2002 Gaio et al.
2002/0159745 A1 10/2002 Howell et al.
2002/0172477 A1 11/2002 Quinn et al.
2002/0181893 A1 12/2002 White et al.
2003/0016440 A1 1/2003 Zeidan et al.
2003/0031447 A1 2/2003 Nault
2003/0059181 A1 3/2003 Jackman et al.
2003/0063866 A1 4/2003 Melton et al.
2003/0063867 A1 4/2003 Mcdonald et al.
2003/0063868 A1 4/2003 Fentress
2003/0063897 A1 4/2003 Heo
2003/0080555 A1 5/2003 Griffioen et al.
2003/0086664 A1 5/2003 Moisel et al.
2003/0094298 A1 5/2003 Morrow et al.
2003/0099448 A1 5/2003 Gimblet
2003/0103733 A1 6/2003 Fleenor et al.
2003/0123813 A1 7/2003 Ravasio et al.
2003/0128936 A1 7/2003 Fahrnbauer et al.
2003/0165311 A1 9/2003 Wagman et al.
2003/0201117 A1 10/2003 Sakabe et al.
2003/0206705 A1 11/2003 Mcalpine et al.
2003/0210875 A1 11/2003 Wagner et al.
2004/0047566 A1 3/2004 Mcdonald et al.
2004/0052474 A1 3/2004 Lampert et al.
2004/0057676 A1 3/2004 Doss et al.
2004/0057681 A1 3/2004 Quinn et al.
2004/0072454 A1 4/2004 Nakajima et al.
2004/0076377 A1 4/2004 Mizukami et al.
2004/0076386 A1 4/2004 Nechitailo
2004/0086238 A1 5/2004 Finona et al.
2004/0096162 A1 5/2004 Kocher et al.
2004/0120662 A1 6/2004 Lail et al.
2004/0120663 A1 6/2004 Lail et al.
2004/0157449 A1 8/2004 Hidaka et al.
2004/0157499 A1 8/2004 Nania et al.
2004/0206542 A1 10/2004 Gladd et al.
2004/0223699 A1 11/2004 Melton et al.
2004/0223720 A1 11/2004 Melton et al.
2004/0228589 A1 11/2004 Melton et al.
2004/0240807 A1 12/2004 Frohlich et al.
2004/0240808 A1 12/2004 Rhoney et al.
2004/0247251 A1 12/2004 Rubino et al.
2004/0252954 A1 12/2004 Ginocchio et al.
2004/0262023 A1 12/2004 Morrow et al.
2005/0019031 A1 1/2005 Ye et al.
2005/0036744 A1 2/2005 Caveney et al.
2005/0036786 A1 2/2005 Ramachandran et al.
2005/0053342 A1 3/2005 Melton et al.
2005/0054237 A1 3/2005 Gladd et al.
2005/0084215 A1 4/2005 Grzegorzewska et al.
2005/0105873 A1 5/2005 Reagan et al.
2005/0123422 A1 6/2005 Lilie
2005/0129379 A1 6/2005 Reagan et al.
2005/0163448 A1 7/2005 Blackwell et al.
2005/0175307 A1 8/2005 Battey et al.
2005/0180697 A1 8/2005 De Marchi
2005/0213890 A1 9/2005 Barnes et al.
2005/0213892 A1 9/2005 Barnes et al.
2005/0213897 A1 9/2005 Palmer et al.
2005/0213899 A1 9/2005 Hurley et al.
2005/0213902 A1 9/2005 Parsons
2005/0213921 A1 9/2005 Mertesdorf et al.
2005/0226568 A1 10/2005 Nakajima et al.

(56) References Cited

U.S. PATENT DOCUMENTS

| | | | |
|---|---|---|---|
| 2005/0232550 | A1 | 10/2005 | Nakajima et al. |
| 2005/0232552 | A1 | 10/2005 | Takahashi et al. |
| 2005/0232567 | A1 | 10/2005 | Reagan et al. |
| 2005/0244108 | A1 | 11/2005 | Billman et al. |
| 2005/0271344 | A1 | 12/2005 | Grubish et al. |
| 2005/0281510 | A1 | 12/2005 | Vo et al. |
| 2005/0281514 | A1 | 12/2005 | Oki et al. |
| 2005/0286837 | A1 | 12/2005 | Oki et al. |
| 2005/0286838 | A1 | 12/2005 | Oki et al. |
| 2006/0002668 | A1 | 1/2006 | Lail et al. |
| 2006/0008232 | A1 | 1/2006 | Reagan et al. |
| 2006/0008233 | A1 | 1/2006 | Reagan et al. |
| 2006/0008234 | A1 | 1/2006 | Reagan et al. |
| 2006/0045428 | A1 | 3/2006 | Theuerkorn et al. |
| 2006/0045430 | A1 | 3/2006 | Theuerkorn et al. |
| 2006/0056769 | A1 | 3/2006 | Khemakhem et al. |
| 2006/0056770 | A1 | 3/2006 | Schmitz |
| 2006/0088247 | A1 | 4/2006 | Tran et al. |
| 2006/0093278 | A1 | 5/2006 | Elkins et al. |
| 2006/0093303 | A1 | 5/2006 | Reagan et al. |
| 2006/0093304 | A1 | 5/2006 | Battey et al. |
| 2006/0098932 | A1 | 5/2006 | Battey et al. |
| 2006/0120672 | A1 | 6/2006 | Cody et al. |
| 2006/0127016 | A1 | 6/2006 | Baird et al. |
| 2006/0133748 | A1 | 6/2006 | Seddon et al. |
| 2006/0133758 | A1 | 6/2006 | Mullaney et al. |
| 2006/0133759 | A1 | 6/2006 | Mullaney et al. |
| 2006/0147172 | A1 | 7/2006 | Luther et al. |
| 2006/0153503 | A1 | 7/2006 | Suzuki et al. |
| 2006/0153517 | A1 | 7/2006 | Reagan et al. |
| 2006/0165352 | A1 | 7/2006 | Caveney et al. |
| 2006/0171638 | A1 | 8/2006 | Dye |
| 2006/0171640 | A1 | 8/2006 | Dye |
| 2006/0210750 | A1 | 9/2006 | Morrow et al. |
| 2006/0233506 | A1 | 10/2006 | Noonan et al. |
| 2006/0257092 | A1 | 11/2006 | Lu et al. |
| 2006/0269204 | A1 | 11/2006 | Barth et al. |
| 2006/0269208 | A1 | 11/2006 | Allen et al. |
| 2006/0280420 | A1 | 12/2006 | Blackwell et al. |
| 2006/0283619 | A1 | 12/2006 | Kowalczyk et al. |
| 2006/0291787 | A1 | 12/2006 | Seddon |
| 2007/0025665 | A1 | 2/2007 | Dean et al. |
| 2007/0031100 | A1 | 2/2007 | Garcia et al. |
| 2007/0031103 | A1 | 2/2007 | Tinucci et al. |
| 2007/0036483 | A1 | 2/2007 | Shin et al. |
| 2007/0041732 | A1 | 2/2007 | Oki et al. |
| 2007/0047897 | A1 | 3/2007 | Cooke et al. |
| 2007/0077010 | A1 | 4/2007 | Melton et al. |
| 2007/0098343 | A1 | 5/2007 | Miller et al. |
| 2007/0110374 | A1 | 5/2007 | Oki et al. |
| 2007/0116413 | A1 | 5/2007 | Cox |
| 2007/0127872 | A1 | 6/2007 | Caveney et al. |
| 2007/0140642 | A1 | 6/2007 | Mertesdorf et al. |
| 2007/0160327 | A1 | 7/2007 | Lewallen et al. |
| 2007/0189674 | A1 | 8/2007 | Scheibenreif et al. |
| 2007/0237484 | A1 | 10/2007 | Reagan et al. |
| 2007/0263961 | A1 | 11/2007 | Khemakhem et al. |
| 2007/0286554 | A1 | 12/2007 | Kuffel et al. |
| 2008/0019641 | A1 | 1/2008 | Elkins et al. |
| 2008/0020532 | A1 | 1/2008 | Monfray et al. |
| 2008/0025670 | A1 | 1/2008 | Castagna et al. |
| 2008/0044137 | A1 | 2/2008 | Luther et al. |
| 2008/0044145 | A1 | 2/2008 | Jenkins et al. |
| 2008/0069511 | A1 | 3/2008 | Blackwell et al. |
| 2008/0080817 | A1 | 4/2008 | Melton et al. |
| 2008/0112681 | A1 | 5/2008 | Battey et al. |
| 2008/0131068 | A1 | 6/2008 | Mertesdorf et al. |
| 2008/0138016 | A1 | 6/2008 | Katagiyama et al. |
| 2008/0138025 | A1 | 6/2008 | Reagan et al. |
| 2008/0166906 | A1 | 7/2008 | Nania et al. |
| 2008/0175541 | A1 | 7/2008 | Lu et al. |
| 2008/0175542 | A1 | 7/2008 | Lu et al. |
| 2008/0175544 | A1 | 7/2008 | Fujiwara et al. |
| 2008/0175546 | A1 | 7/2008 | Lu et al. |
| 2008/0175548 | A1 | 7/2008 | Knecht et al. |
| 2008/0226252 | A1 | 9/2008 | Mertesdorf et al. |
| 2008/0232743 | A1 | 9/2008 | Gronvall et al. |
| 2008/0240658 | A1 | 10/2008 | Leeman et al. |
| 2008/0260344 | A1 | 10/2008 | Smith et al. |
| 2008/0260345 | A1 | 10/2008 | Mertesdorf et al. |
| 2008/0264664 | A1 | 10/2008 | Dinh et al. |
| 2008/0273837 | A1 | 11/2008 | Margolin et al. |
| 2008/0310796 | A1 | 12/2008 | Lu |
| 2008/0317415 | A1 | 12/2008 | Hendrickson et al. |
| 2009/0003772 | A1 | 1/2009 | Lu et al. |
| 2009/0003777 | A1 | 1/2009 | Feldner |
| 2009/0034923 | A1 | 2/2009 | Miller et al. |
| 2009/0041411 | A1 | 2/2009 | Melton et al. |
| 2009/0041412 | A1 | 2/2009 | Danley et al. |
| 2009/0060421 | A1 | 3/2009 | Parikh et al. |
| 2009/0060423 | A1 | 3/2009 | Melton et al. |
| 2009/0067791 | A1 | 3/2009 | Greenwood et al. |
| 2009/0067849 | A1 | 3/2009 | Oki et al. |
| 2009/0074363 | A1 | 3/2009 | Parsons et al. |
| 2009/0074369 | A1 | 3/2009 | Bolton et al. |
| 2009/0123115 | A1 | 5/2009 | Gronvall et al. |
| 2009/0129729 | A1 | 5/2009 | Caveney et al. |
| 2009/0136184 | A1 | 5/2009 | Abernathy et al. |
| 2009/0148101 | A1 | 6/2009 | Lu et al. |
| 2009/0148102 | A1 | 6/2009 | Lu et al. |
| 2009/0148103 | A1 | 6/2009 | Lu et al. |
| 2009/0148104 | A1 | 6/2009 | Lu et al. |
| 2009/0148118 | A1 | 6/2009 | Gronvall et al. |
| 2009/0148120 | A1 | 6/2009 | Reagan et al. |
| 2009/0156041 | A1 | 6/2009 | Radle |
| 2009/0162016 | A1 | 6/2009 | Lu et al. |
| 2009/0185835 | A1 | 7/2009 | Park et al. |
| 2009/0190895 | A1 | 7/2009 | Reagan et al. |
| 2009/0238531 | A1 | 9/2009 | Holmberg et al. |
| 2009/0245737 | A1 | 10/2009 | Fujiwara et al. |
| 2009/0245743 | A1 | 10/2009 | Cote et al. |
| 2009/0263097 | A1 | 10/2009 | Solheid et al. |
| 2009/0297112 | A1 | 12/2009 | Mertesdorf et al. |
| 2009/0317039 | A1 | 12/2009 | Blazer et al. |
| 2009/0317045 | A1 | 12/2009 | Reagan et al. |
| 2010/0008909 | A1 | 1/2010 | Siadak et al. |
| 2010/0014813 | A1 | 1/2010 | Ito et al. |
| 2010/0014824 | A1 | 1/2010 | Lu et al. |
| 2010/0014867 | A1 | 1/2010 | Ramanitra et al. |
| 2010/0015834 | A1 | 1/2010 | Siebens |
| 2010/0021254 | A1 | 1/2010 | Jenkins et al. |
| 2010/0034502 | A1 | 2/2010 | Lu et al. |
| 2010/0040331 | A1 | 2/2010 | Khemakhem et al. |
| 2010/0040338 | A1 | 2/2010 | Sek |
| 2010/0054680 | A1 | 3/2010 | Lochkovic et al. |
| 2010/0061685 | A1 | 3/2010 | Kowalczyk et al. |
| 2010/0074578 | A1 | 3/2010 | Imaizumi et al. |
| 2010/0080516 | A1 | 4/2010 | Coleman et al. |
| 2010/0086260 | A1 | 4/2010 | Parikh et al. |
| 2010/0086267 | A1 | 4/2010 | Cooke et al. |
| 2010/0092129 | A1 | 4/2010 | Conner |
| 2010/0092133 | A1 | 4/2010 | Conner |
| 2010/0092136 | A1 | 4/2010 | Nhep |
| 2010/0092146 | A1 | 4/2010 | Conner et al. |
| 2010/0092169 | A1 | 4/2010 | Conner et al. |
| 2010/0092171 | A1 | 4/2010 | Conner |
| 2010/0129034 | A1 | 5/2010 | Kuffel et al. |
| 2010/0144183 | A1 | 6/2010 | Nania et al. |
| 2010/0172616 | A1 | 7/2010 | Lu et al. |
| 2010/0197222 | A1 | 8/2010 | Scheucher |
| 2010/0215321 | A1 | 8/2010 | Jenkins |
| 2010/0220962 | A1 | 9/2010 | Caveney et al. |
| 2010/0226615 | A1 | 9/2010 | Reagan et al. |
| 2010/0232753 | A1 | 9/2010 | Parris et al. |
| 2010/0247053 | A1 | 9/2010 | Cowen et al. |
| 2010/0266242 | A1 | 10/2010 | Lu et al. |
| 2010/0266244 | A1 | 10/2010 | Lu et al. |
| 2010/0266245 | A1 | 10/2010 | Sabo |
| 2010/0272399 | A1 | 10/2010 | Griffiths et al. |
| 2010/0284662 | A1 | 11/2010 | Reagan et al. |
| 2010/0290741 | A1 | 11/2010 | Lu et al. |
| 2010/0303416 | A1 | 12/2010 | Danley et al. |
| 2010/0303426 | A1 | 12/2010 | Davis |
| 2010/0303427 | A1 | 12/2010 | Rambow et al. |

(56) References Cited

U.S. PATENT DOCUMENTS

| | | | |
|---|---|---|---|
| 2010/0310213 | A1 | 12/2010 | Lewallen et al. |
| 2010/0322563 | A1 | 12/2010 | Melton et al. |
| 2010/0329625 | A1 | 12/2010 | Reagan et al. |
| 2011/0019964 | A1 | 1/2011 | Nhep et al. |
| 2011/0033157 | A1 | 2/2011 | Drouard |
| 2011/0044588 | A1 | 2/2011 | Larson et al. |
| 2011/0047731 | A1 | 3/2011 | Sugita et al. |
| 2011/0067452 | A1 | 3/2011 | Gronvall et al. |
| 2011/0069932 | A1 | 3/2011 | Overton et al. |
| 2011/0097050 | A1 | 4/2011 | Blackwell et al. |
| 2011/0108719 | A1 | 5/2011 | Ford et al. |
| 2011/0116749 | A1 | 5/2011 | Kuffel et al. |
| 2011/0123157 | A1 | 5/2011 | Belsan et al. |
| 2011/0123166 | A1 | 5/2011 | Reagan et al. |
| 2011/0129185 | A1 | 6/2011 | Lewallen et al. |
| 2011/0129186 | A1 | 6/2011 | Lewallen et al. |
| 2011/0164854 | A1 | 7/2011 | Desard et al. |
| 2011/0222826 | A1 | 9/2011 | Blackburn et al. |
| 2011/0229098 | A1 | 9/2011 | Abernathy et al. |
| 2011/0262099 | A1 | 10/2011 | Castonguay et al. |
| 2011/0262100 | A1 | 10/2011 | Reagan et al. |
| 2011/0299814 | A1 | 12/2011 | Nakagawa |
| 2011/0305421 | A1 | 12/2011 | Caveney et al. |
| 2012/0002925 | A1 | 1/2012 | Nakagawa |
| 2012/0008909 | A1 | 1/2012 | Mertesdorf et al. |
| 2012/0045179 | A1 | 2/2012 | Theuerkorn |
| 2012/0057830 | A1 | 3/2012 | Taira et al. |
| 2012/0063724 | A1 | 3/2012 | Kuffel et al. |
| 2012/0063729 | A1 | 3/2012 | Fujiwara et al. |
| 2012/0106912 | A1 | 5/2012 | Mcgranahan et al. |
| 2012/0106913 | A1 | 5/2012 | Makrides-Saravanos et al. |
| 2012/0134629 | A1 | 5/2012 | Lu et al. |
| 2012/0183268 | A1 | 7/2012 | De et al. |
| 2012/0213478 | A1 | 8/2012 | Chen et al. |
| 2012/0251060 | A1 | 10/2012 | Hurley |
| 2012/0251063 | A1 | 10/2012 | Reagan et al. |
| 2012/0252244 | A1 | 10/2012 | Elkins et al. |
| 2012/0257858 | A1 | 10/2012 | Nhep |
| 2012/0275749 | A1 | 11/2012 | Kuffel et al. |
| 2012/0321256 | A1 | 12/2012 | Caveney et al. |
| 2013/0004122 | A1 | 1/2013 | Kingsbury |
| 2013/0020480 | A1 | 1/2013 | Ford et al. |
| 2013/0022317 | A1 | 1/2013 | Norris et al. |
| 2013/0034333 | A1 | 2/2013 | Holmberg et al. |
| 2013/0051734 | A1 | 2/2013 | Shen et al. |
| 2013/0064506 | A1 | 3/2013 | Eberle et al. |
| 2013/0094821 | A1 | 4/2013 | Logan |
| 2013/0100900 | A1 | 4/2013 | Lee et al. |
| 2013/0109213 | A1 | 5/2013 | Chang |
| 2013/0114930 | A1 | 5/2013 | Smith et al. |
| 2013/0136402 | A1 | 5/2013 | Kuffel et al. |
| 2013/0170834 | A1 | 7/2013 | Cho et al. |
| 2013/0209099 | A1 | 8/2013 | Reagan et al. |
| 2013/0236139 | A1 | 9/2013 | Chen et al. |
| 2013/0266562 | A1 | 10/2013 | Siadak et al. |
| 2013/0315538 | A1 | 11/2013 | Kuffel et al. |
| 2014/0016902 | A1 | 1/2014 | Pepe et al. |
| 2014/0021962 | A1 | 1/2014 | Barnaby et al. |
| 2014/0029897 | A1 | 1/2014 | Shimazu et al. |
| 2014/0044397 | A1 | 2/2014 | Hikosaka et al. |
| 2014/0050446 | A1 | 2/2014 | Chang |
| 2014/0056561 | A1 | 2/2014 | Lu et al. |
| 2014/0079356 | A1 | 3/2014 | Pepin et al. |
| 2014/0133804 | A1 | 5/2014 | Lu et al. |
| 2014/0133806 | A1 | 5/2014 | Hill et al. |
| 2014/0133807 | A1 | 5/2014 | Katoh |
| 2014/0133808 | A1 | 5/2014 | Hill et al. |
| 2014/0153876 | A1 | 6/2014 | Dendas et al. |
| 2014/0153878 | A1 | 6/2014 | Mullaney |
| 2014/0161397 | A1 | 6/2014 | Gallegos et al. |
| 2014/0205257 | A1 | 7/2014 | Durrant et al. |
| 2014/0219609 | A1 | 8/2014 | Nielson et al. |
| 2014/0219622 | A1 | 8/2014 | Coan et al. |
| 2014/0226945 | A1 | 8/2014 | Claessens et al. |
| 2014/0233896 | A1 | 8/2014 | Ishigami et al. |
| 2014/0241670 | A1 | 8/2014 | Barnette et al. |
| 2014/0241671 | A1 | 8/2014 | Koreeda et al. |
| 2014/0241689 | A1 | 8/2014 | Bradley et al. |
| 2014/0254987 | A1 | 9/2014 | Caveney et al. |
| 2014/0294395 | A1 | 10/2014 | Waldron et al. |
| 2014/0314379 | A1 | 10/2014 | Lu et al. |
| 2014/0328559 | A1 | 11/2014 | Kobayashi et al. |
| 2014/0341511 | A1 | 11/2014 | Daems et al. |
| 2014/0348467 | A1 | 11/2014 | Cote et al. |
| 2014/0355936 | A1 | 12/2014 | Bund et al. |
| 2015/0003787 | A1 | 1/2015 | Chen et al. |
| 2015/0003788 | A1 | 1/2015 | Chen et al. |
| 2015/0036982 | A1 | 2/2015 | Nhep et al. |
| 2015/0100555 | A1 | 4/2015 | Tremblay et al. |
| 2015/0110451 | A1 | 4/2015 | Blazer et al. |
| 2015/0115545 | A1 | 4/2015 | Kempeneers et al. |
| 2015/0144883 | A1 | 5/2015 | Sendelweck |
| 2015/0153532 | A1 | 6/2015 | Holmberg et al. |
| 2015/0168657 | A1 | 6/2015 | Islam |
| 2015/0183869 | A1 | 7/2015 | Siadak et al. |
| 2015/0185423 | A1 | 7/2015 | Matsui et al. |
| 2015/0253527 | A1 | 9/2015 | Hill et al. |
| 2015/0253528 | A1 | 9/2015 | Corbille et al. |
| 2015/0260936 | A1 | 9/2015 | Newbury et al. |
| 2015/0268423 | A1 | 9/2015 | Burkholder et al. |
| 2015/0268434 | A1 | 9/2015 | Barnette et al. |
| 2015/0270626 | A1 | 9/2015 | Bishop |
| 2015/0286011 | A1 | 10/2015 | Nhep |
| 2015/0293310 | A1 | 10/2015 | Kanno |
| 2015/0309274 | A1 | 10/2015 | Hurley et al. |
| 2015/0316727 | A1 | 11/2015 | Kondo et al. |
| 2015/0346435 | A1 | 12/2015 | Kato |
| 2015/0346436 | A1 | 12/2015 | Pepe et al. |
| 2016/0015885 | A1 | 1/2016 | Pananen et al. |
| 2016/0018605 | A1 | 1/2016 | Ott et al. |
| 2016/0041346 | A1 | 2/2016 | Barnette et al. |
| 2016/0041356 | A1 | 2/2016 | Wang et al. |
| 2016/0062053 | A1 | 3/2016 | Mullaney |
| 2016/0085032 | A1 | 3/2016 | Lu et al. |
| 2016/0109671 | A1 | 4/2016 | Coan et al. |
| 2016/0116686 | A1 | 4/2016 | Durrant et al. |
| 2016/0126667 | A1 | 5/2016 | Droesbeke et al. |
| 2016/0131851 | A1 | 5/2016 | Theuerkorn |
| 2016/0131857 | A1 | 5/2016 | Pimentel et al. |
| 2016/0139346 | A1 | 5/2016 | Bund et al. |
| 2016/0154184 | A1 | 6/2016 | Bund et al. |
| 2016/0154186 | A1 | 6/2016 | Gimblet et al. |
| 2016/0161682 | A1 | 6/2016 | Nishimura |
| 2016/0161688 | A1 | 6/2016 | Nishimura |
| 2016/0161689 | A1 | 6/2016 | Nishimura |
| 2016/0187590 | A1 | 6/2016 | Lu |
| 2016/0202431 | A1 | 7/2016 | Hill et al. |
| 2016/0209599 | A1 | 7/2016 | Van et al. |
| 2016/0209602 | A1 | 7/2016 | Theuerkorn |
| 2016/0209605 | A1 | 7/2016 | Lu et al. |
| 2016/0216468 | A1 | 7/2016 | Gimblet et al. |
| 2016/0223759 | A1 | 8/2016 | Marcouiller et al. |
| 2016/0238810 | A1 | 8/2016 | Hubbard et al. |
| 2016/0246019 | A1 | 8/2016 | Ishii et al. |
| 2016/0249019 | A1 | 8/2016 | Westwick et al. |
| 2016/0259133 | A1 | 9/2016 | Kobayashi et al. |
| 2016/0259134 | A1 | 9/2016 | Daems et al. |
| 2016/0306122 | A1 | 10/2016 | Tong et al. |
| 2016/0327754 | A1 | 11/2016 | Hill et al. |
| 2016/0349458 | A1 | 12/2016 | Murray et al. |
| 2016/0356963 | A1 | 12/2016 | Liu et al. |
| 2016/0359266 | A1 | 12/2016 | Wang et al. |
| 2017/0023758 | A1 | 1/2017 | Reagan et al. |
| 2017/0038538 | A1 | 2/2017 | Isenhour et al. |
| 2017/0045699 | A1 | 2/2017 | Coan et al. |
| 2017/0052325 | A1 | 2/2017 | Mullaney et al. |
| 2017/0059784 | A1 | 3/2017 | Gniadek et al. |
| 2017/0123163 | A1 | 5/2017 | Lu et al. |
| 2017/0123165 | A1 | 5/2017 | Barnette et al. |
| 2017/0131509 | A1 | 5/2017 | Xiao et al. |
| 2017/0139158 | A1 | 5/2017 | Coenegracht |
| 2017/0160492 | A1 | 6/2017 | Lin et al. |
| 2017/0168248 | A1 | 6/2017 | Hayauchi et al. |
| 2017/0168256 | A1 | 6/2017 | Reagan et al. |

(56) References Cited

U.S. PATENT DOCUMENTS

| | | | |
|---|---|---|---|
| 2017/0170596 | A1 | 6/2017 | Goossens et al. |
| 2017/0176252 | A1 | 6/2017 | Marple et al. |
| 2017/0176690 | A1 | 6/2017 | Bretz et al. |
| 2017/0182160 | A1 | 6/2017 | Siadak et al. |
| 2017/0212313 | A1 | 7/2017 | Elenabaas et al. |
| 2017/0219782 | A1 | 8/2017 | Nishimura |
| 2017/0235067 | A1 | 8/2017 | Holmberg et al. |
| 2017/0238822 | A1 | 8/2017 | Young et al. |
| 2017/0254961 | A1 | 9/2017 | Kamada et al. |
| 2017/0254962 | A1 | 9/2017 | Mueller-Schlomka et al. |
| 2017/0261696 | A1 | 9/2017 | Compton et al. |
| 2017/0261698 | A1 | 9/2017 | Compton et al. |
| 2017/0261699 | A1 | 9/2017 | Compton et al. |
| 2017/0285275 | A1 | 10/2017 | Hill et al. |
| 2017/0285279 | A1 | 10/2017 | Daems et al. |
| 2017/0288315 | A1 | 10/2017 | Scheucher |
| 2017/0293091 | A1 | 10/2017 | Lu et al. |
| 2017/0307828 | A1 | 10/2017 | Elenbaas |
| 2017/0336587 | A1 | 11/2017 | Coan et al. |
| 2017/0343741 | A1 | 11/2017 | Coenegracht et al. |
| 2017/0343745 | A1 | 11/2017 | Rosson |
| 2017/0351037 | A1 | 12/2017 | Watanabe et al. |
| 2018/0003902 | A1 | 1/2018 | Rosson et al. |
| 2018/0031774 | A1 | 2/2018 | Van et al. |
| 2018/0079569 | A1 | 3/2018 | Simpson |
| 2018/0081127 | A1 | 3/2018 | Coenegracht |
| 2018/0143386 | A1 | 5/2018 | Coan et al. |
| 2018/0151960 | A1 | 5/2018 | Scheucher |
| 2018/0180831 | A1 | 6/2018 | Blazer et al. |
| 2018/0224610 | A1 | 8/2018 | Pimentel et al. |
| 2018/0239094 | A1 | 8/2018 | Barnette et al. |
| 2018/0246283 | A1 | 8/2018 | Pepe et al. |
| 2018/0259721 | A1 | 9/2018 | Bund et al. |
| 2018/0267243 | A1 | 9/2018 | Nhep et al. |
| 2018/0267265 | A1 | 9/2018 | Zhang et al. |
| 2018/0321448 | A1 | 11/2018 | Wu et al. |
| 2018/0329149 | A1 | 11/2018 | Mullaney et al. |
| 2018/0329153 | A1 | 11/2018 | Verheyden |
| 2018/0348447 | A1 | 12/2018 | Nhep et al. |
| 2018/0372962 | A1 | 12/2018 | Isenhour et al. |
| 2019/0004251 | A1 | 1/2019 | Dannoux et al. |
| 2019/0004252 | A1 | 1/2019 | Rosson |
| 2019/0004255 | A1 | 1/2019 | Dannoux et al. |
| 2019/0004256 | A1 | 1/2019 | Rosson |
| 2019/0004258 | A1 | 1/2019 | Dannoux et al. |
| 2019/0011641 | A1 | 1/2019 | Isenhour et al. |
| 2019/0014987 | A1 | 1/2019 | Sasaki et al. |
| 2019/0018210 | A1 | 1/2019 | Coan et al. |
| 2019/0033531 | A1 | 1/2019 | Taira et al. |
| 2019/0033532 | A1 | 1/2019 | Gimblet et al. |
| 2019/0038743 | A1 | 2/2019 | Siadak et al. |
| 2019/0041584 | A1 | 2/2019 | Coenegracht et al. |
| 2019/0041585 | A1 | 2/2019 | Bretz et al. |
| 2019/0041595 | A1 | 2/2019 | Reagan et al. |
| 2019/0058259 | A1 | 2/2019 | Scheucher |
| 2019/0107677 | A1 | 4/2019 | Coenegracht et al. |
| 2019/0147202 | A1 | 5/2019 | Harney |
| 2019/0162910 | A1 | 5/2019 | Gurreri |
| 2019/0162914 | A1 | 5/2019 | Baca et al. |
| 2019/0170961 | A1 | 6/2019 | Coenegracht et al. |
| 2019/0187396 | A1 | 6/2019 | Finnegan et al. |
| 2019/0235177 | A1 | 8/2019 | Lu et al. |
| 2019/0250338 | A1 | 8/2019 | Mullaney et al. |
| 2019/0258010 | A1 | 8/2019 | Anderson et al. |
| 2019/0271817 | A1 | 9/2019 | Coenegracht |
| 2019/0324217 | A1 | 10/2019 | Lu et al. |
| 2019/0339460 | A1 | 11/2019 | Dannoux et al. |
| 2019/0339461 | A1 | 11/2019 | Dannoux et al. |
| 2019/0339475 | A1 | 11/2019 | Takano et al. |
| 2019/0361177 | A1 | 11/2019 | Aoshima et al. |
| 2019/0369336 | A1 | 12/2019 | Van et al. |
| 2019/0369345 | A1 | 12/2019 | Reagan et al. |
| 2019/0374637 | A1 | 12/2019 | Siadak et al. |
| 2020/0003963 | A1 | 1/2020 | Iizumi et al. |
| 2020/0012051 | A1 | 1/2020 | Coenegracht et al. |
| 2020/0036101 | A1 | 1/2020 | Scheucher |
| 2020/0049922 | A1 | 2/2020 | Rosson |
| 2020/0057205 | A1 | 2/2020 | Dannoux et al. |
| 2020/0057222 | A1 | 2/2020 | Dannoux et al. |
| 2020/0057223 | A1 | 2/2020 | Dannoux et al. |
| 2020/0057224 | A1 | 2/2020 | Dannoux et al. |
| 2020/0057723 | A1 | 2/2020 | Chirca et al. |
| 2020/0096705 | A1 | 3/2020 | Rosson |
| 2020/0096709 | A1 | 3/2020 | Rosson |
| 2020/0096710 | A1 | 3/2020 | Rosson |
| 2020/0103599 | A1 | 4/2020 | Rosson |
| 2020/0103608 | A1 | 4/2020 | Johnson et al. |
| 2020/0110229 | A1 | 4/2020 | Dannoux et al. |
| 2020/0110234 | A1 | 4/2020 | Holmberg et al. |
| 2020/0112354 | A1 | 4/2020 | Chigusa et al. |
| 2020/0116949 | A1 | 4/2020 | Rosson |
| 2020/0116952 | A1 | 4/2020 | Rosson |
| 2020/0116953 | A1 | 4/2020 | Rosson |
| 2020/0116954 | A1 | 4/2020 | Rosson |
| 2020/0116955 | A1 | 4/2020 | Ho et al. |
| 2020/0116958 | A1 | 4/2020 | Dannoux et al. |
| 2020/0116962 | A1 | 4/2020 | Dannoux et al. |
| 2020/0124805 | A1 | 4/2020 | Rosson et al. |
| 2020/0124812 | A1 | 4/2020 | Dannoux et al. |
| 2020/0132939 | A1 | 4/2020 | Coenegracht et al. |
| 2020/0132941 | A1 | 4/2020 | Otsuka et al. |
| 2020/0150356 | A1 | 5/2020 | Lu |
| 2020/0174201 | A1 | 6/2020 | Cote et al. |
| 2020/0174214 | A1 | 6/2020 | Alves et al. |
| 2020/0183097 | A1 | 6/2020 | Chang et al. |
| 2020/0192042 | A1 | 6/2020 | Coan et al. |
| 2020/0209479 | A1 | 7/2020 | Zhang et al. |
| 2020/0209492 | A1 | 7/2020 | Rosson |
| 2020/0218017 | A1 | 7/2020 | Coenegracht |
| 2020/0225422 | A1 | 7/2020 | Van et al. |
| 2020/0225424 | A1 | 7/2020 | Coenegracht |
| 2020/0241211 | A1 | 7/2020 | Shonkwiler et al. |
| 2020/0301090 | A1 | 9/2020 | Petersen et al. |
| 2020/0348476 | A1 | 11/2020 | Hill et al. |
| 2020/0371306 | A1 | 11/2020 | Mosier et al. |
| 2020/0393629 | A1 | 12/2020 | Hill et al. |
| 2021/0132302 | A1 | 5/2021 | Wong et al. |
| 2021/0149124 | A1 | 5/2021 | Higley et al. |
| 2021/0149140 | A1 | 5/2021 | Jensen |
| 2021/0278607 | A1 | 9/2021 | Cote et al. |
| 2021/0278687 | A1 | 9/2021 | Tsuchiya |
| 2021/0288609 | A1 | 9/2021 | Yan et al. |
| 2021/0318499 | A1 | 10/2021 | Cote et al. |
| 2022/0236497 | A1 | 7/2022 | Calvin et al. |

FOREIGN PATENT DOCUMENTS

| | | | |
|---|---|---|---|
| CN | 1071012 | A | 4/1993 |
| CN | 1213783 | A | 4/1999 |
| CN | 1231430 | A | 10/1999 |
| CN | 1114839 | C | 7/2003 |
| CN | 1646962 | A | 7/2005 |
| CN | 1833188 | A | 9/2006 |
| CN | 1922523 | A | 2/2007 |
| CN | 1985205 | A | 6/2007 |
| CN | 101084461 | A | 12/2007 |
| CN | 101111790 | A | 1/2008 |
| CN | 101195453 | A | 6/2008 |
| CN | 201404194 | Y | 2/2010 |
| CN | 201408274 | Y | 2/2010 |
| CN | 201522561 | U | 7/2010 |
| CN | 101806939 | A | 8/2010 |
| CN | 101846773 | A | 9/2010 |
| CN | 101866034 | A | 10/2010 |
| CN | 101939680 | A | 1/2011 |
| CN | 201704194 | U | 1/2011 |
| CN | 102141655 | A | 8/2011 |
| CN | 102346281 | A | 2/2012 |
| CN | 202282523 | U | 6/2012 |
| CN | 203224645 | U | 10/2013 |
| CN | 203396982 | U | 1/2014 |
| CN | 103713362 | A | 4/2014 |
| CN | 103782209 | A | 5/2014 |
| CN | 104007514 | A | 8/2014 |

(56) References Cited

FOREIGN PATENT DOCUMENTS

| | | | |
|---|---|---|---|
| CN | 104064903 | A | 9/2014 |
| CN | 104280830 | A | 1/2015 |
| CN | 104603656 | A | 5/2015 |
| CN | 104704411 | A | 6/2015 |
| CN | 105467529 | A | 4/2016 |
| CN | 105492946 | A | 4/2016 |
| CN | 105683795 | A | 6/2016 |
| CN | 106716205 | A | 5/2017 |
| CN | 106873086 | A | 6/2017 |
| CN | 110608208 | A | 12/2019 |
| CN | 110954996 | A | 4/2020 |
| DE | 3537684 | A1 | 4/1987 |
| DE | 3737842 | C1 | 9/1988 |
| DE | 19805554 | A1 | 8/1998 |
| EP | 0012566 | A1 | 6/1980 |
| EP | 0026553 | A1 | 4/1981 |
| EP | 0122566 | A2 | 10/1984 |
| EP | 0130513 | A2 | 1/1985 |
| EP | 0244791 | A2 | 11/1987 |
| EP | 0462362 | A2 | 12/1991 |
| EP | 0468671 | A1 | 1/1992 |
| EP | 0469671 | A1 | 2/1992 |
| EP | 0547778 | A1 | 6/1993 |
| EP | 0547788 | A1 | 6/1993 |
| EP | 0762171 | A1 | 3/1997 |
| EP | 0782025 | A1 | 7/1997 |
| EP | 0855610 | A2 | 7/1998 |
| EP | 0856751 | A1 | 8/1998 |
| EP | 0856761 | A1 | 8/1998 |
| EP | 0940700 | A2 | 9/1999 |
| EP | 0949522 | A2 | 10/1999 |
| EP | 0957381 | A1 | 11/1999 |
| EP | 0978746 | A1 | 2/2000 |
| EP | 0997757 | A2 | 5/2000 |
| EP | 1065542 | A1 | 1/2001 |
| EP | 1122566 | A2 | 8/2001 |
| EP | 1243957 | A2 | 9/2002 |
| EP | 1258758 | A2 | 11/2002 |
| EP | 1391762 | A1 | 2/2004 |
| EP | 1431786 | A2 | 6/2004 |
| EP | 1438622 | A2 | 7/2004 |
| EP | 1678537 | A1 | 7/2006 |
| EP | 1759231 | A1 | 3/2007 |
| EP | 1810062 | A1 | 7/2007 |
| EP | 2069845 | A2 | 6/2009 |
| EP | 2149063 | A1 | 2/2010 |
| EP | 2150847 | A1 | 2/2010 |
| EP | 2193395 | A1 | 6/2010 |
| EP | 2255233 | A1 | 12/2010 |
| EP | 2333597 | A2 | 6/2011 |
| EP | 2362253 | A1 | 8/2011 |
| EP | 2401641 | A1 | 1/2012 |
| EP | 2609458 | A1 | 7/2013 |
| EP | 2622395 | A1 | 8/2013 |
| EP | 2734879 | A1 | 5/2014 |
| EP | 2815259 | A1 | 12/2014 |
| EP | 2817667 | A1 | 12/2014 |
| EP | 2992372 | A1 | 3/2016 |
| EP | 3022596 | A1 | 5/2016 |
| EP | 3064973 | A2 | 9/2016 |
| EP | 3101740 | A1 | 12/2016 |
| EP | 3207223 | A1 | 8/2017 |
| EP | 3234672 | A1 | 10/2017 |
| EP | 3245545 | A1 | 11/2017 |
| EP | 3265859 | A1 | 1/2018 |
| EP | 3336992 | A1 | 6/2018 |
| EP | 3362830 | A1 | 8/2018 |
| EP | 3427096 | A1 | 1/2019 |
| EP | 3443395 | A1 | 2/2019 |
| EP | 3535614 | A1 | 9/2019 |
| EP | 3537197 | A1 | 9/2019 |
| EP | 3646074 | A1 | 5/2020 |
| EP | 3646079 | A1 | 5/2020 |
| EP | 3403125 | B1 | 7/2021 |
| ES | 1184287 | U | 5/2017 |

| | | | |
|---|---|---|---|
| FR | 2485754 | A1 | 12/1981 |
| GB | 2022284 | A | 12/1979 |
| GB | 2154333 | A | 9/1985 |
| GB | 2169094 | A | 7/1986 |
| GB | 6192781 | | 2/2022 |
| GB | 6192782 | | 2/2022 |
| GB | 6192783 | | 2/2022 |
| GB | 6192784 | | 2/2022 |
| JP | 52-030447 | A | 3/1977 |
| JP | 58-142308 | A | 8/1983 |
| JP | 61-145509 | A | 7/1986 |
| JP | 62-054204 | A | 3/1987 |
| JP | 63-020111 | A | 1/1988 |
| JP | 63-078908 | A | 4/1988 |
| JP | 63-089421 | A | 4/1988 |
| JP | 03-063615 | A | 3/1991 |
| JP | 03-207223 | A | 9/1991 |
| JP | 05-106765 | A | 4/1993 |
| JP | 05-142439 | A | 6/1993 |
| JP | 05-297246 | A | 11/1993 |
| JP | 06-320111 | A | 11/1994 |
| JP | 07-318758 | A | 12/1995 |
| JP | 08-050211 | A | 2/1996 |
| JP | 08-054522 | A | 2/1996 |
| JP | 08-062432 | A | 3/1996 |
| JP | 08-292331 | A | 11/1996 |
| JP | 09-049942 | A | 2/1997 |
| JP | 09-135526 | A | 5/1997 |
| JP | 09-159867 | A | 6/1997 |
| JP | 09-203831 | A | 8/1997 |
| JP | 09-325223 | A | 12/1997 |
| JP | 09-325249 | A | 12/1997 |
| JP | 10-170781 | A | 6/1998 |
| JP | 10-332953 | A | 12/1998 |
| JP | 10-339826 | A | 12/1998 |
| JP | 11-064682 | A | 3/1999 |
| JP | 11-119064 | A | 4/1999 |
| JP | 11-248979 | A | 9/1999 |
| JP | 11-271582 | A | 10/1999 |
| JP | 11-281861 | A | 10/1999 |
| JP | 11-326693 | A | 11/1999 |
| JP | 11-337768 | A | 12/1999 |
| JP | 11-352368 | A | 12/1999 |
| JP | 2000-002828 | A | 1/2000 |
| JP | 2001-116968 | A | 4/2001 |
| JP | 2001-290051 | A | 10/2001 |
| JP | 2002-520987 | A | 7/2002 |
| JP | 3296698 | B2 | 7/2002 |
| JP | 2002-250987 | A | 9/2002 |
| JP | 2003-009331 | A | 1/2003 |
| JP | 2003-070143 | A | 3/2003 |
| JP | 2003-121699 | A | 4/2003 |
| JP | 2003-177279 | A | 6/2003 |
| JP | 2003-302561 | A | 10/2003 |
| JP | 2004-361521 | A | 12/2004 |
| JP | 2005-024789 | A | 1/2005 |
| JP | 2005-031544 | A | 2/2005 |
| JP | 2005-077591 | A | 3/2005 |
| JP | 2005-114860 | A | 4/2005 |
| JP | 2005-520987 | A | 7/2005 |
| JP | 2006-023502 | A | 1/2006 |
| JP | 2006-146084 | A | 6/2006 |
| JP | 2006-259631 | A | 9/2006 |
| JP | 2006-337637 | A | 12/2006 |
| JP | 2007-078740 | A | 3/2007 |
| JP | 2007-121859 | A | 5/2007 |
| JP | 2008-191422 | A | 8/2008 |
| JP | 2008-250360 | A | 10/2008 |
| JP | 2009-265208 | A | 11/2009 |
| JP | 2010-152084 | A | 7/2010 |
| JP | 2010-191420 | A | 9/2010 |
| JP | 2011-018003 | A | 1/2011 |
| JP | 2011-033698 | A | 2/2011 |
| JP | 2013-041089 | A | 2/2013 |
| JP | 2013-156580 | A | 8/2013 |
| JP | 2014-085474 | A | 5/2014 |
| JP | 2014-095834 | A | 5/2014 |
| JP | 2014-134746 | A | 7/2014 |
| JP | 5537852 | B2 | 7/2014 |

(56) References Cited

FOREIGN PATENT DOCUMENTS

| | | | |
|---|---|---|---|
| JP | 5538328 | B2 | 7/2014 |
| JP | 2014-157214 | A | 8/2014 |
| JP | 2014-219441 | A | 11/2014 |
| JP | 2015-125217 | A | 7/2015 |
| JP | 2016-109816 | A | 6/2016 |
| JP | 2016-109817 | A | 6/2016 |
| JP | 2016-109819 | A | 6/2016 |
| JP | 2016-156916 | A | 9/2016 |
| JP | 3207223 | U | 11/2016 |
| JP | 3207233 | U | 11/2016 |
| KR | 10-2013-0081087 | A | 7/2013 |
| RU | 2402794 | C1 | 10/2010 |
| TW | 222688 | B | 4/1994 |
| WO | 94/25885 | A1 | 11/1994 |
| WO | 98/36304 | A1 | 8/1998 |
| WO | 01/27660 | A2 | 4/2001 |
| WO | 01/92927 | A2 | 12/2001 |
| WO | 01/92937 | A1 | 12/2001 |
| WO | 02/25340 | A1 | 3/2002 |
| WO | 03/36358 | A2 | 5/2003 |
| WO | 2004/061509 | A1 | 7/2004 |
| WO | 2005/045494 | A1 | 5/2005 |
| WO | 2005/066674 | A2 | 7/2005 |
| WO | 2006/009597 | A1 | 1/2006 |
| WO | 2006/052420 | A1 | 5/2006 |
| WO | 2006/113726 | A1 | 10/2006 |
| WO | 2006/123777 | A1 | 11/2006 |
| WO | 2008/027201 | A2 | 3/2008 |
| WO | 2008/029072 | A1 | 3/2008 |
| WO | 2008/150408 | A1 | 12/2008 |
| WO | 2008/150423 | A1 | 12/2008 |
| WO | 2009/042066 | A1 | 4/2009 |
| WO | 2009/113819 | A1 | 9/2009 |
| WO | 2009/117060 | A1 | 9/2009 |
| WO | 2009/126411 | A1 | 10/2009 |
| WO | 2009/148797 | A1 | 12/2009 |
| WO | 2009/154990 | A2 | 12/2009 |
| WO | 2010/092009 | A1 | 8/2010 |
| WO | 2010/093794 | A1 | 8/2010 |
| WO | 2010/099141 | A1 | 9/2010 |
| WO | 2011/044090 | A2 | 4/2011 |
| WO | 2011/047111 | A1 | 4/2011 |
| WO | 2012/027313 | A1 | 3/2012 |
| WO | 2012/037727 | A1 | 3/2012 |
| WO | 2012/044741 | A1 | 4/2012 |
| WO | 2012/074688 | A2 | 6/2012 |
| WO | 2012/163052 | A1 | 12/2012 |
| WO | 2013/016042 | A1 | 1/2013 |
| WO | 2013/055714 | A1 | 4/2013 |
| WO | 2013/083729 | A2 | 6/2013 |
| WO | 2013/122752 | A1 | 8/2013 |
| WO | 2013/126488 | A1 | 8/2013 |
| WO | 2013/177016 | A1 | 11/2013 |
| WO | 2014/123940 | A1 | 8/2014 |
| WO | 2014/151259 | A1 | 9/2014 |
| WO | 2014/167447 | A1 | 10/2014 |
| WO | 2014/179411 | A1 | 11/2014 |
| WO | 2014/197894 | A1 | 12/2014 |
| WO | 2015/009435 | A1 | 1/2015 |
| WO | 2015/047508 | A1 | 4/2015 |
| WO | 2015/144883 | A1 | 10/2015 |
| WO | 2015/197588 | A1 | 12/2015 |
| WO | 2016/059320 | A1 | 4/2016 |
| WO | 2016/073862 | A2 | 5/2016 |
| WO | 2016/095213 | A1 | 6/2016 |
| WO | 2016/100078 | A1 | 6/2016 |
| WO | 2016/115288 | A1 | 7/2016 |
| WO | 2016/138297 | A1 | 9/2016 |
| WO | 2016/156610 | A1 | 10/2016 |
| WO | 2016/168389 | A1 | 10/2016 |
| WO | 2017/063107 | A1 | 4/2017 |
| WO | 2017/146722 | A1 | 8/2017 |
| WO | 2017/155754 | A1 | 9/2017 |
| WO | 2017/178920 | A1 | 10/2017 |
| WO | 2018/083561 | A1 | 5/2018 |
| WO | 2018/175123 | A1 | 9/2018 |
| WO | 2018/204864 | A1 | 11/2018 |
| WO | 2019/005190 | A2 | 1/2019 |
| WO | 2019/005191 | A1 | 1/2019 |
| WO | 2019/005192 | A1 | 1/2019 |
| WO | 2019/005193 | A1 | 1/2019 |
| WO | 2019/005194 | A1 | 1/2019 |
| WO | 2019/005195 | A1 | 1/2019 |
| WO | 2019/005196 | A1 | 1/2019 |
| WO | 2019/005197 | A1 | 1/2019 |
| WO | 2019/005198 | A1 | 1/2019 |
| WO | 2019/005199 | A1 | 1/2019 |
| WO | 2019/005200 | A1 | 1/2019 |
| WO | 2019/005201 | A1 | 1/2019 |
| WO | 2019/005202 | A1 | 1/2019 |
| WO | 2019/005203 | A1 | 1/2019 |
| WO | 2019/005204 | A1 | 1/2019 |
| WO | 2019/005789 | A1 | 1/2019 |
| WO | 2019/006121 | A1 | 1/2019 |
| WO | 2019/006176 | A1 | 1/2019 |
| WO | 2019/006191 | A1 | 1/2019 |
| WO | 2019/036339 | A1 | 2/2019 |
| WO | 2019/126333 | A1 | 6/2019 |
| WO | 2019/195652 | A1 | 10/2019 |
| WO | 2020/101850 | A1 | 5/2020 |
| WO | 2020/242847 | A1 | 12/2020 |
| WO | 2022/115271 | A1 | 6/2022 |

OTHER PUBLICATIONS

Chinese Patent Application No. 201780094010.8, Office Action dated May 7, 2021, 22 pages (12 pages of English Translation and 10 pages of Original Document), Chinese Patent Office.

Clearfield, "Fieldshield Optical Fiber Protection System: Installation Manual." for part No. 016164. Last Updated Dec. 2014. 37 pgs.

Clearfield, "FieldShield SC and LC Pushable Connectors," Last Updated Jun. 1, 2018, 2 pgs.

Clearfield, "FieldShield SmarTerminal: Hardened Pushable Connectors" Last Updated Jun. 29, 2018, 2 pgs.

Coaxum, L., et al., U.S. Appl. No. 62/341,947, "Fiber Optic Multiport Having Different Types of Ports for Multi-Use," filed May 26, 2016.

CoolShirt fittings, https://www.amazon.com/Cool-Shirt-5014-0001-Release-Connectors/dp/B01LXBXYJ9, Sep. 23, 2016 (Year: 2016).

Corning Cable Systems, "SST Figure-8 Drop Cables 1-12 Fibers", Preliminary Product Specifications, 11 pgs. (2002).

Corning Cable Systems, "SST-Drop (armor) Cables 1-12 Fibers", Product Specifications, 2 pgs. (2002).

Corning Cable Systems, "SST-Drop (Dielectric) Cables 1-12 Fibers", Product Specifications, 2 pgs. (2002).

Digital Optical Audio Cable Toslink Cable. Date: Jun. 27, 2019 [online], [Site visited Mar. 2, 2021], Available from Internet URL: https://www.amazon.com/dp/B07TJMP4TP/ (Year: 2019).

Faulkner et al. "Optical networks for local lopp applications," J. Lightwave Technol. 0733-8724 7(11), 17411751 (1989).

Fiber Systems International: Fiber Optic Solutions, data, "TFOCA-11 4-Channel Fiber Optic Connector" sheet. , 2003, 2 pgs.

Gold Plated Toslink. Date: Feb. 5, 2015. [online], [Site visited Mar. 2, 2021], Available from Internet URL: https://www.amazon.com/dp/B00T8HWV62/ (Year: 2015).

Infolite—Design and Data Specifications, 1 pg. Retrieved Feb. 21, 2019.

Liu et al., "Variable optical power splitters create new apps", Retrieved from: https://www.lightwaveonline.com/fttx/pon-systems/article/16648432/variable-optical-power-splitters-create-new-apps, 2005, 14 pages.

Nawata, "Multimode and Single-Mode Fiber Connectors Technology"; IEEE Journal of Quantum Electronics, vol. QE-16, No. 6 Published Jun. 1980.

Optical connector. (Design—(Copyrights) Questel) orbit.com. [Online PDF compilation of references selected by 3 [examiner] 20 pgs. Print Dates Range Mar. 9, 2003-May 25, 2015. [Retrieved Feb. 3, 2021] https://www.orbit.com/export/UCZAH96B/pdf4/81c7766a-d250-4555-a8f1-3bdf9dc 1 bd6c-185304.pdf (Year: 2021).

(56) References Cited

OTHER PUBLICATIONS

Ramanitra et al. "Optical access network using a self-latching variable splitter remotely powered through an optical fiber link," Optical Engineering 46(4) p. 45007-1-9, Apr. 2007.
Ratnam et al. "Burst switching using variable optical splitter based switches with wavelength conversion," ICIIS 2017—Poeceedings Jan. 2018, pp. 1-6.
Schneier, Bruce; "Applied Cryptography: Protocols, Algorithms, and Source Code in C," Book. 1995 Sec. 10.3, 12.2, 165 Pgs.
Stratos: Lightwave., "Innovation Brought to Light", Hybrid HMA Series, Hybrid Multi Application, 2002, 2 pgs.
UPC Optic Fiber Quick Connector. Date: May 13, 2016 [online], [Site visited Mar. 2, 2021], Available from Internet URL: https://www.amazon.com/dp/B01FLUV5DE/ (Year: 2016).
Wang et al. "Opto-VLSI-based dynamic optical splitter," Electron. Lett.0013-5194 10.1049/el:20046715 40(22), 14451446 (2004).
Xiao et al. "1xN wavelength selective adaptive optical power splitter for wavelength-division-multiplexed passive optical networks," Optics & Laser Technology 68, pp. 160-164, May 2015.

* cited by examiner

166

166

MULTIPORT ASSEMBLIES INCLUDING MOUNTING FEATURES OR DUST PLUGS

CROSS-REFERENCES TO RELATED APPLICATIONS

This application is a continuation of U.S. application Ser. No. 17/357,271 filed Jun. 24, 2021, which is a continuation of International Application No. PCT/US2019/067781 filed Dec. 20, 2019, which claims the benefit of priority to U.S. Application No. 62/785,871, filed Dec. 28, 2018, both applications being incorporated herein by reference.

BACKGROUND

Field

The present disclosure relates generally to multiport assemblies having one or more connector ports for interconnecting optical fibers using external fiber optic connectors that are received in respective connector ports. More particularly, the present disclosure is directed to multiport assemblies having mounting features for securing the assemblies to a pole, building, or other suitable structure and/or dust plugs for inhibiting dirt, dust or debris from entering the connector port when not in use.

Technical Background

Optical fibers are used in an increasing number and variety of applications, such as a wide variety of telecommunications and data transmission applications. As a result, fiber optic networks include an ever increasing number of terminated optical fibers and fiber optic cables that can be conveniently and reliable mated with corresponding optical receptacles or optical port in the network using fiber optic connectors. These optical fibers and fiber optic cables terminated with optical fiber connectors are available in a variety of connectorized formats including, for example, hardened OptiTap® and OptiTip® connectors, field-installable UniCam® connectors, preconnectorized single or multi-fiber cable assemblies with SC, FC, or LC connectors, etc., all of which are available from Corning Incorporated, with similar products available from other manufacturers, as is well documented in the patent literature.

The optical receptacles, optical ports or the like with which the aforementioned terminated fibers and cables are coupled are commonly provided at optical network units (ONUs), network interface devices (NIDs), multiports, closures, terminals and other types of network devices or enclosures, and often require mounting hardware that is sufficiently robust to be employed in a variety of environments under a variety of installation conditions. These diverse environments or conditions for mounting the devices may be subject to the outside plant environment, rough handling, and/or the habits of the technicians handling and installing the hardware. Consequently, there is a continuing need to enhance the robustness of these connectorized assemblies, while preserving quick, reliable, and trouble-free installation of devices into the network.

BRIEF SUMMARY

According to the subject matter of the present disclosure, multiport assemblies and methods for connecting optical connecters in a multiport assembly are provided. Specifically, multiport assemblies having one or more mounting features and/or dust plugs are disclosed. One aspect of the disclosure is directed to a multiport assembly comprising a shell, a plurality of optical adapter assemblies, and a mounting member. The shell extending between a front end and a rear end positioned opposite the front end in a longitudinal direction. The shell defines a cavity, a plurality of optical connector ports positioned at the front end of the shell and extending inward from the plurality of optical connector ports toward the cavity of the shell, and a lower surface. The plurality of optical adapter assemblies are positioned within the cavity of the shell and are structurally configured to optically couple optical connectors. The mounting member is coupled to the shell and defines an aperture extending through the mounting member, and at least one standoff that extends outward from a lower surface of the shell.

Another aspect of the disclosure is directed to a multiport assembly comprising a shell, a plurality of optical adapter assemblies, a mounting member, and a second mounting member. The shell extending between a front end and a rear end positioned opposite the front end in a longitudinal direction. The shell defines a cavity, a plurality of optical connector ports positioned at the front end of the shell and extending inward from the plurality of optical connector ports toward the cavity of the shell, a lower surface, and a rear shell aperture. The plurality of optical adapter assemblies are positioned within the cavity of the shell and are structurally configured to optically couple optical connectors. The mounting member is coupled to the shell and comprises an aperture extending through the mounting member, and at least one standoff that extends outward from a lower surface of the shell. The second mounting member comprises an aperture and a standoff portion, and the shell defines a rear shell aperture that receives a portion of the second mounting member.

Yet another aspect of the disclosure is directed to a multiport assembly comprising a shell, a plurality of optical adapter assemblies, and a dust plug. The shell extending between a front end and a rear end positioned opposite the front end in a longitudinal direction. The shell defines a cavity, a plurality of optical connector ports positioned at the front end of the shell and extending inward from the plurality of optical connector ports toward the cavity of the shell. The plurality of optical adapter assemblies are positioned within the cavity of the shell and are associated with the plurality of optical connector ports along with being structurally configured to optically couple optical connectors. The dust plug comprises a locking feature and a keying portion.

Still another aspect of the disclosure is directed to a multiport assembly comprising a shell, a plurality of optical adapter assemblies, and a mounting member. The shell extending between a front end and a rear end positioned opposite the front end in a longitudinal direction. The shell defines a cavity, a plurality of optical connector ports positioned at the front end of the shell and extending inward from the plurality of optical connector ports toward the cavity of the shell, and a lower surface. The plurality of optical adapter assemblies are positioned within the cavity of the shell and structurally configured to optically couple optical connectors. The mounting member is coupled to the shell and comprises an aperture extending through the mounting member, and at least one standoff that extends outward from a lower surface of the shell.

A further aspect of the disclosure is directed to a method for securing a multiport assembly to a surface. The method comprising positioning a fastener through an aperture of a mounting member and installing the mounting member to the surface, where in the mounting member comprises a standoff engaged with the surface and an outward face that is spaced apart from the standoff on the surface. Aligning a slot engagement tab of the mounting member with a cutout defined by a slot of a shell of the multiport assembly. Sliding the multiport assembly with respect to the mounting member to position the slot engagement tab within a channel bounded by a bottom face, a sidewall, and a tab of the slot of the shell, and engaging a latch of the mounting member with a latch recess defined by the shell of the multiport assembly.

Although the concepts of the present disclosure are described herein with reference to a set of drawings that show a particular type of fiber optic cable, and connector components of particular size and shape, it is contemplated that the concepts may be employed in any optical fiber connectorization scheme including, for example, and without limitation, hardened OptiTap® and OptiTip® connectors, field-installable UniCam® connectors, single or multi-fiber cable assemblies with SC, FC, LC, or multi-fiber connectors, etc.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Embodiments described herein generally relate to various devices for forming an optical connection between optical fibers. More particularly, embodiments described herein relate to multiport assemblies including a plurality of optical adapter assemblies structurally configured to optically couple optical connectors. Optical connectors may be selectively inserted within the multiport assembly to engage the plurality of optical adapter assemblies, and may be selectively retained within the multiport assembly by push-button securing members. The push-button securing members may also selectively release the optical connectors such that the optical connectors may be disengaged from the optical adapters.

Embodiments described herein securing members for securing a multiport assembly to a surface, such as a wall, a utility pole, or the like. Multiport assemblies may be secured to a surface of an object, and in some instances, the surface may not necessarily correspond to the exact shape and contour of the multiport assembly. As the multiport assembly is secured to a surface including a different surface contour than the shell of the multiport assembly, the shell may deform. For example, when a fastener or the like is used to secure the multiport assembly to the surface, the fastener may apply a force to the multiport assembly in a direction that is transverse to the surface, pulling the multiport assembly toward the surface. The force applied to the multiport assembly may in some instances, be sufficient to deform the shell of the multiport assembly, thereby degrading the structural integrity of the multiport assembly, which may lead a variety of issues, including allowing moisture or other environmental effects to reach a cavity of the multiport assembly.

Embodiments described herein are directed to multiport assemblies including mounting members with standoff features that limit the surface area of the multiport assembly in contact with surface to which the multiport assembly is secured. The standoffs act to space the shell of the multiport assembly apart from the surface, which assists in limiting deformation of the shell as the shell is secured to the surface, thereby assisting in maintaining the structural integrity of the multiport assembly. These and other embodiments will now be described with specific reference to the appended drawings.

As used herein, the term "longitudinal direction" refers to the forward-rearward direction of components of the multiport assembly (i.e., in the +/−Z-direction as depicted). The term "lateral direction" refers to the cross-direction of components of the multiport assembly (i.e., in the +/−X-direction as depicted), and is transverse to the longitudinal direction. The term "vertical direction" refers to the upward-downward direction of the components of the multiport assembly (i.e., in the +/−Y-direction as depicted), and is transverse to the lateral and the longitudinal directions.

Figure 1:
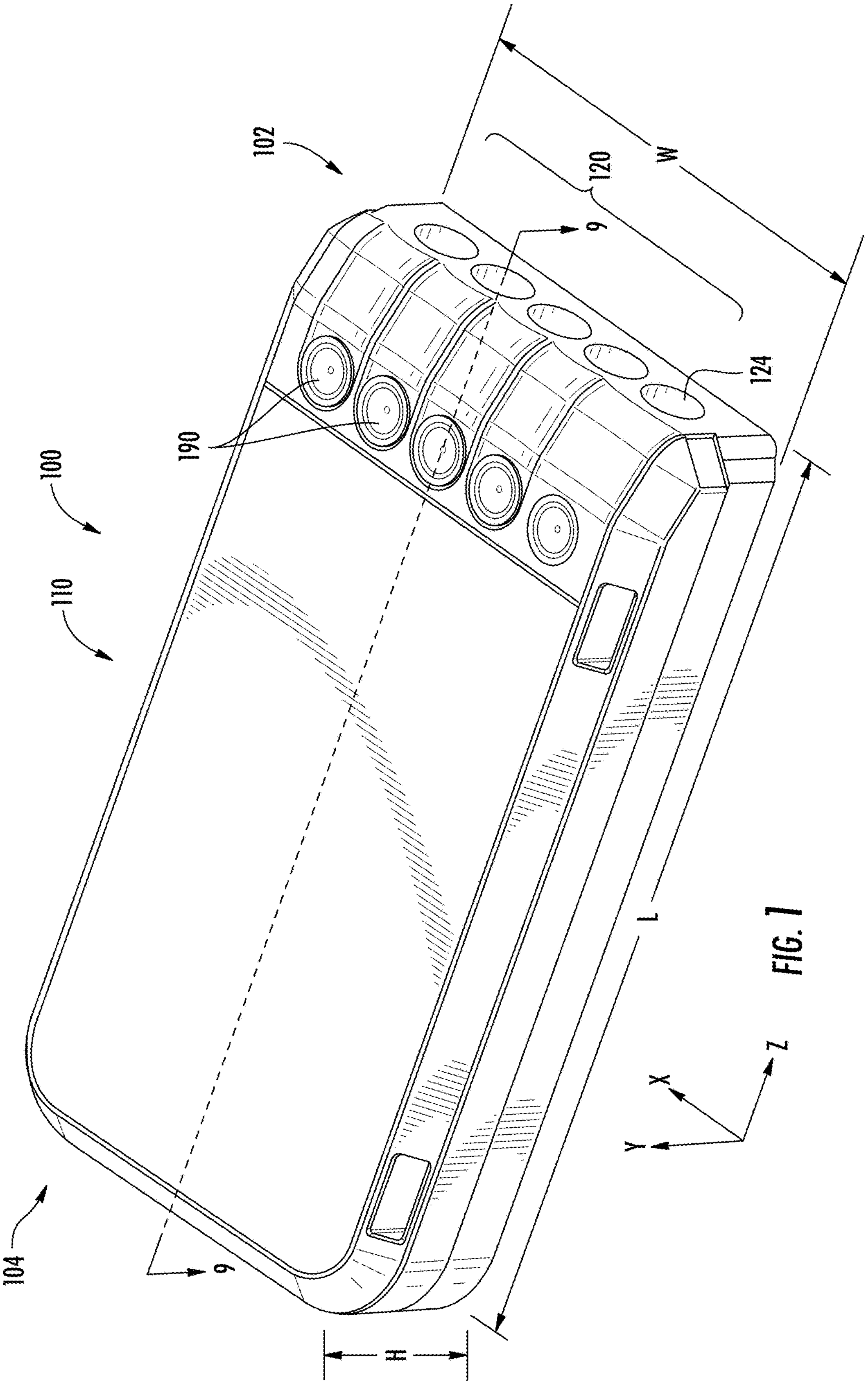
FIG. 1 schematically depicts a perspective view of a multiport assembly, according to one or more embodiments shown and described herein.

Referring initially to FIG. 1, a perspective view of a multiport assembly 100 is schematically depicted. The multiport assembly 100 generally includes a shell 110 that extends between a front end 102 and a rear end 104 in the longitudinal direction and defines a plurality of optical connector ports 120 positioned at the front end 102 of the multiport assembly 100. A plurality of optical connectors may be inserted within the plurality of optical connector ports 120 as described in greater detail herein. In some embodiments, the shell 110 defines an input connector port 124 positioned at the front end 102 of the multiport assembly 100. An input connector, such as an input tether may be inserted within the input connector port 124, as described in greater detail herein.

Figure 2:
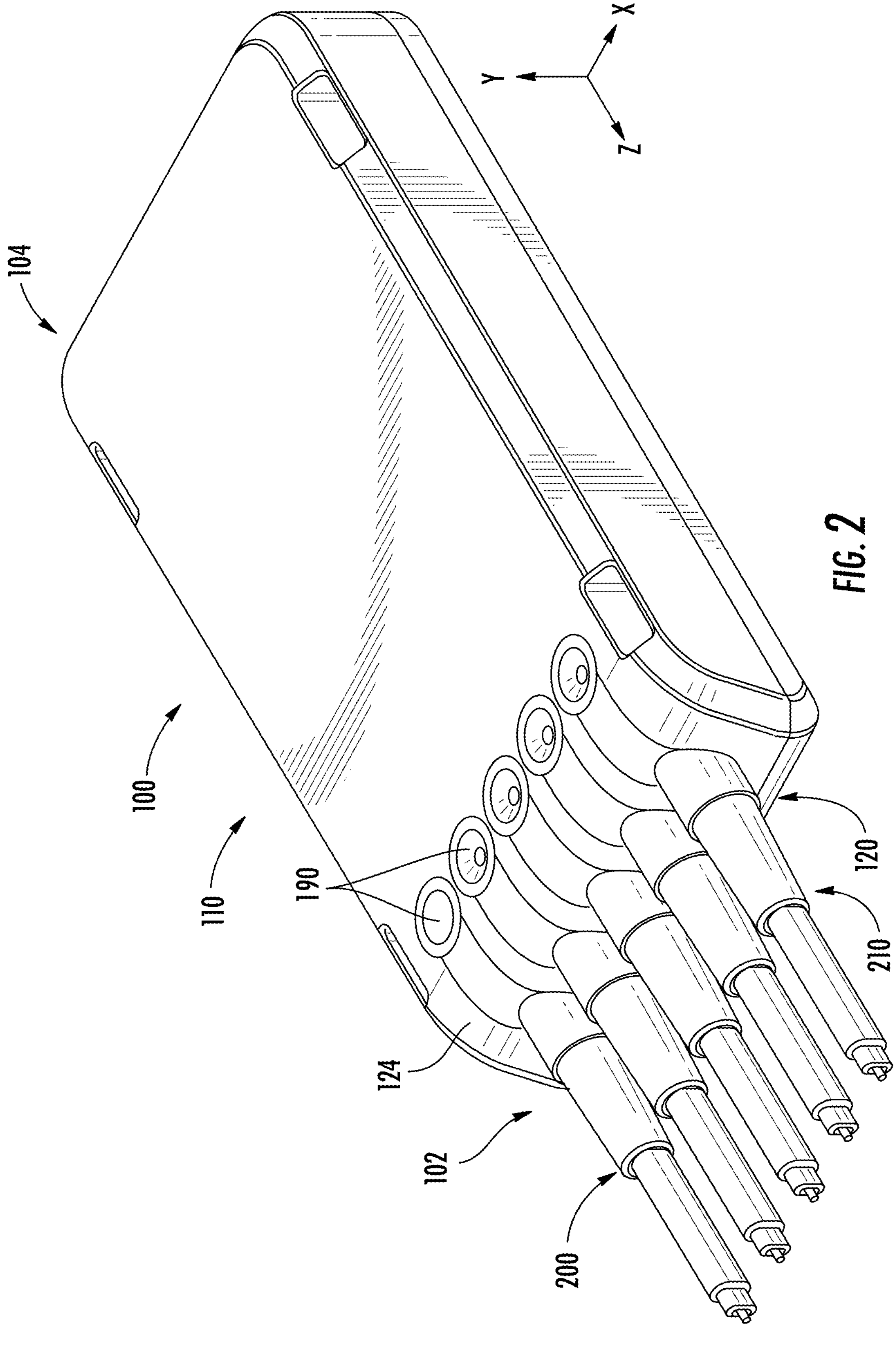
FIG. 2 schematically depicts a lower perspective view of the multiport assembly of FIG. 1 with a plurality of optical connectors and an input tether inserted within a plurality of optical connector ports of the multiport assembly, according to one or more embodiments shown and described herein.

Referring to FIG. 2, a perspective view of the multiport assembly 100 is depicted with a plurality of optical connectors 210 inserted within corresponding optical connector ports 120 of the multiport assembly 100. In the embodiment depicted in FIG. 2, an input tether 200 is inserted within the input connector port 124. While in the embodiment depicted in FIG. 2, the input connector port 124 is positioned at the front end 102 of the multiport assembly 100, it should be understood that the input connector port 124 may be positioned at any suitable location on the multiport assembly 100.

Figure 12:
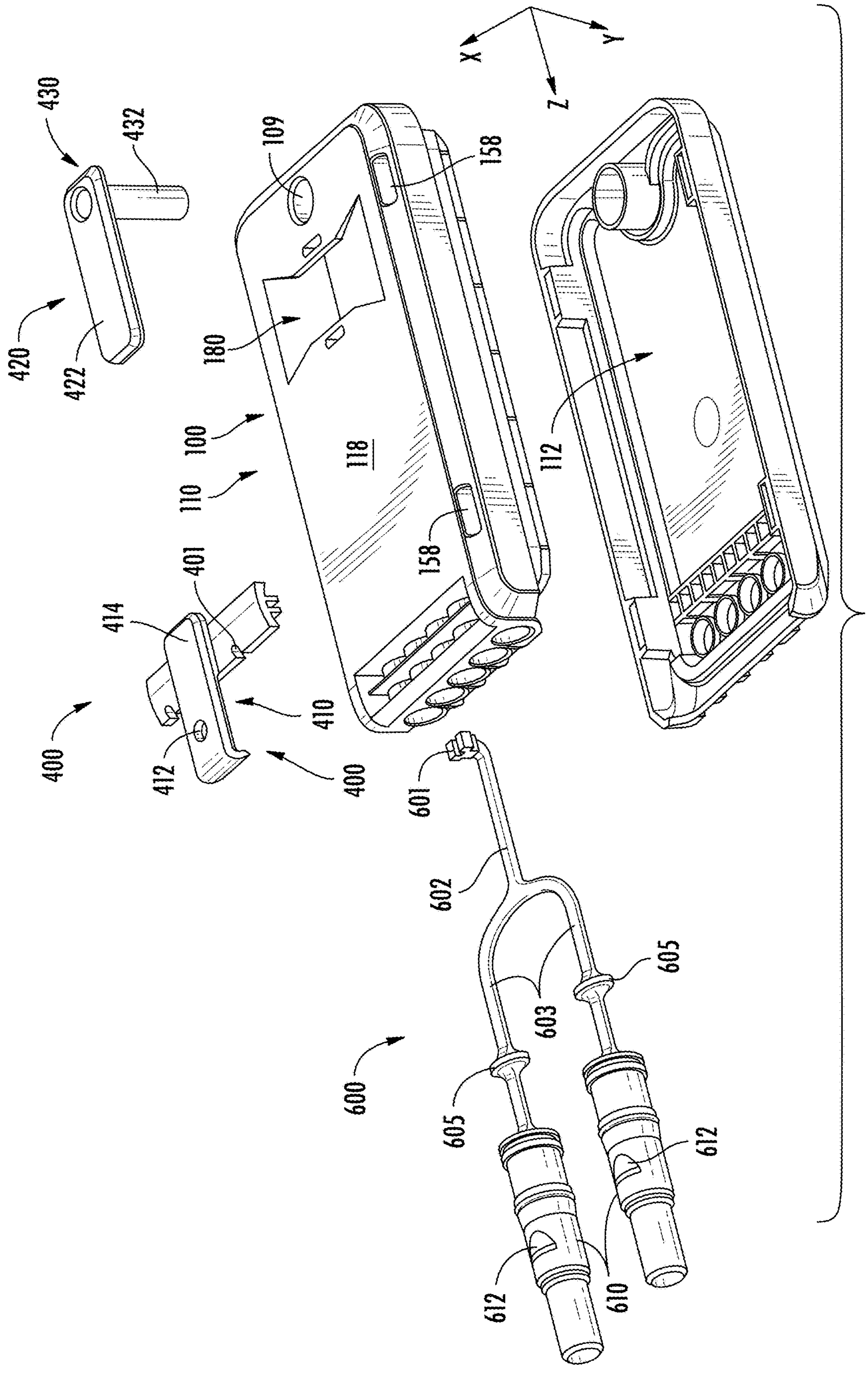
FIG. 12 schematically depicts an exploded view of the mounting member and an explanatory dust plug with a tether for use with the multiport assembly of FIG. 11 with the internal components of the multiport assembly not shown for clarity, according to one or more embodiments shown and described herein.
Figure 12A:
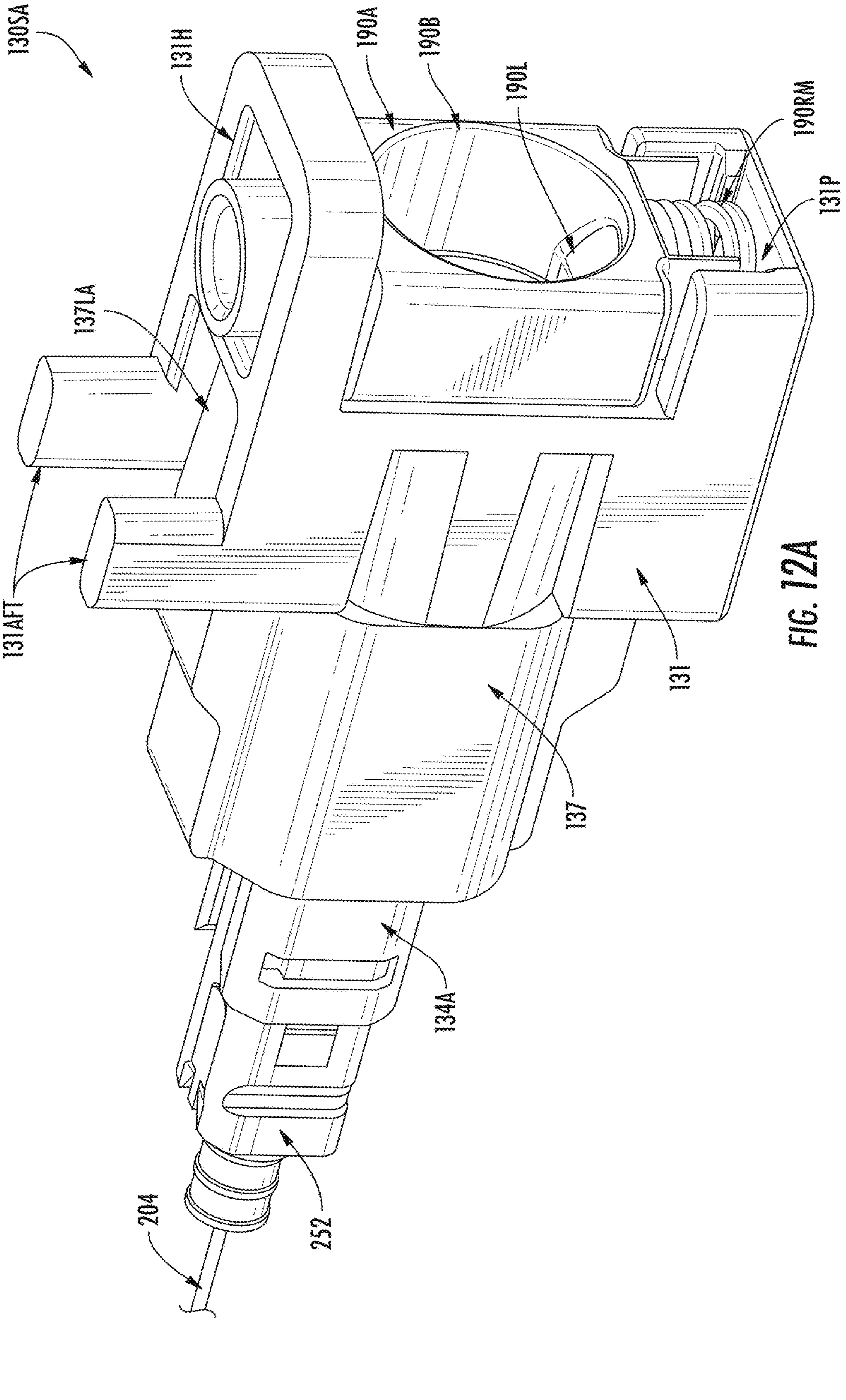
FIG. 12A schematically depicts an assembled view of an explanatory modular optical adapter assembly for use with the multiport assembly of FIG. 11 with the internal connector inserted into the rear portion of the sub-assembly.
Figure 12B:
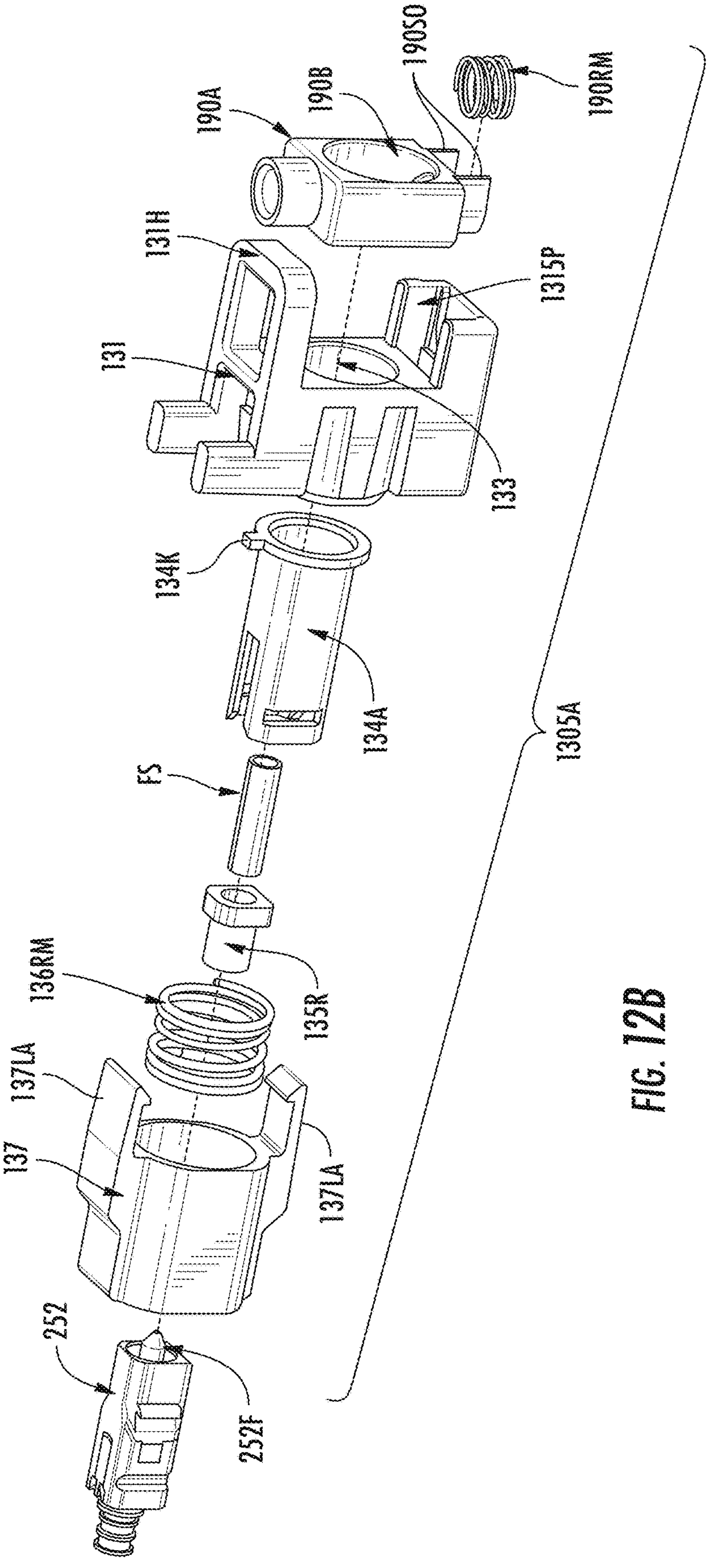
FIG. 12B schematically depicts an exploded view of the modular optical adapter assembly of FIG. 12A.

Multiport assembly 100 comprises at least one securing member 190A such as depicted in FIGS. 12A and 12B associated with the connector ports 120,124; however other structures may be used for securing the optical connectors 210 to the multiport assembly 100. The respective securing member 190A cooperate with the housing of the respective optical connectors 210 for securing the optical connectors 210 in the port when fully-seated. For instance, a locking feature 190L on the respective securing member 190A may cooperate with a cooperating locking feature integrally-formed in the housing of the optical connector 210. When a respective push-button securing members 190 associated with each of the optical connector ports 120 and the input connector port 124 is pushed downward, then the respective optical connector 210 may be released from the respective connector port 120,124. As discussed in further detail below, the securing elements 190A are generally aligned with a respective adapter that may receive an internal connector (i.e., rear connector) for aligning and making an optical connection with the external optical connector 210.

The securing elements 190A disclosed herein may take any suitable construction or configuration as desired such as being formed as a single component of a plurality of components. For instance, the push-button securing member 190 may be integrally-formed with the securing element 190A a monolithic structure if desired. Securing element 190A may be biased by a resilient member 190RM to a normally closed or secured position. Upon insertion of the optical connector 210 into connector port 120,124, the connector translates the respective securing element 190A against the resilient member 190RM until the optical connector 210 is fully-inserted into the connector port and allows the securing element 190A to translate from the force applied by the resilient member 190RM to the closed or secured position for retaining the optical connector 210 in the respective connector port 120,124.

Furthermore, the securing element 190A or portions of the securing elements may be constructed as a portion of a modular optical adapter assembly 130SA as depicted in FIGS. 12A and 12B for easy assembly. The use of modular optical adapter assemblies 130SA allows for the mating components for each connector port 120,124 to move or "float" independently of other mating components relative to the shell 110 relative to other connector ports for preserving optical performance. "Float" means that the adapter can have slight movement in the X-Y plane for alignment, and may be inhibited from over-traveling in the Z-direction along the axis of optical connector insertion so that suitable alignment is made between mating connectors, which may include a biasing spring 136RM for allowing some displacement of the adapter with a suitable restoring force provided by the spring. Of course, other constructions are possible for use with the multiport assemblies having mounting features and/or dust plugs disclosed herein, such as having common parts for mounting a plurality of adapters and/or integrally-molding portions in the lower shell such as saddles, mounts or other structures for adapters.

Figure 3:
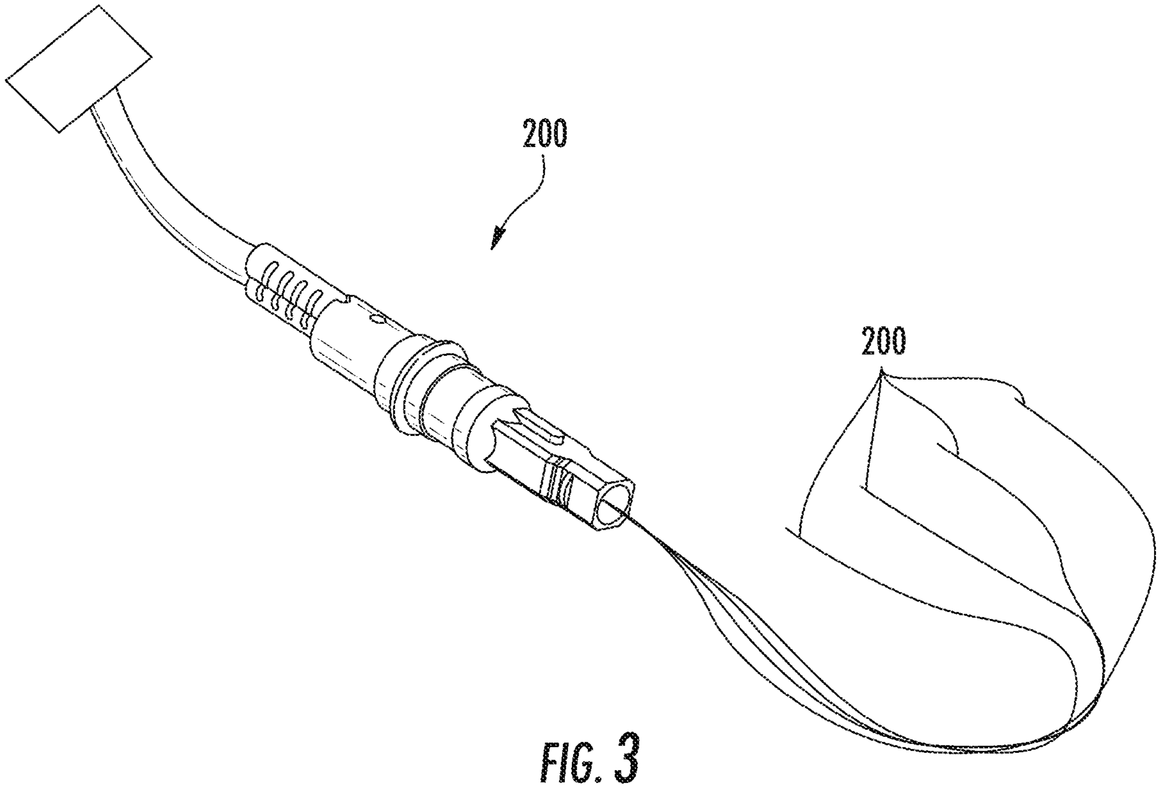
FIG. 3 schematically depicts the input tether of FIG. 2 in isolation, according to one or more embodiments shown and described herein.

Referring to FIG. 3, the input tether 200 is depicted in isolation. The input tether 200 may generally include a plurality of optical fibers 202 therein, which may be terminated within the multiport assembly 100, for example at corresponding optical adapter assemblies, as described in greater detail herein. In some embodiments, the input tether 200 may include a furcation body that generally includes a portion of the input tether 200 that transitions to the individual fibers 202 for routing within a cavity of the shell 110 to facilitate connection to corresponding optical adapter assemblies. In some embodiments, input tether 200 may terminate with a fiber optic connector or be a stubbed cable as desired. For instance, the input tether 200 could be an OptiTip® connector for optical connection to previously installed distribution cables; however, other suitable single-fiber or multi-fiber connectors such as an OptiTap® may be used for terminating the input tether 200 as desired. While the embodiment depicted in FIG. 3 depicts an input tether 200 including a plurality of optical fibers 202, it should be understood that in other embodiments, the input tether 200 may include a single optical fiber, as described in greater detail herein.

Figure 4:
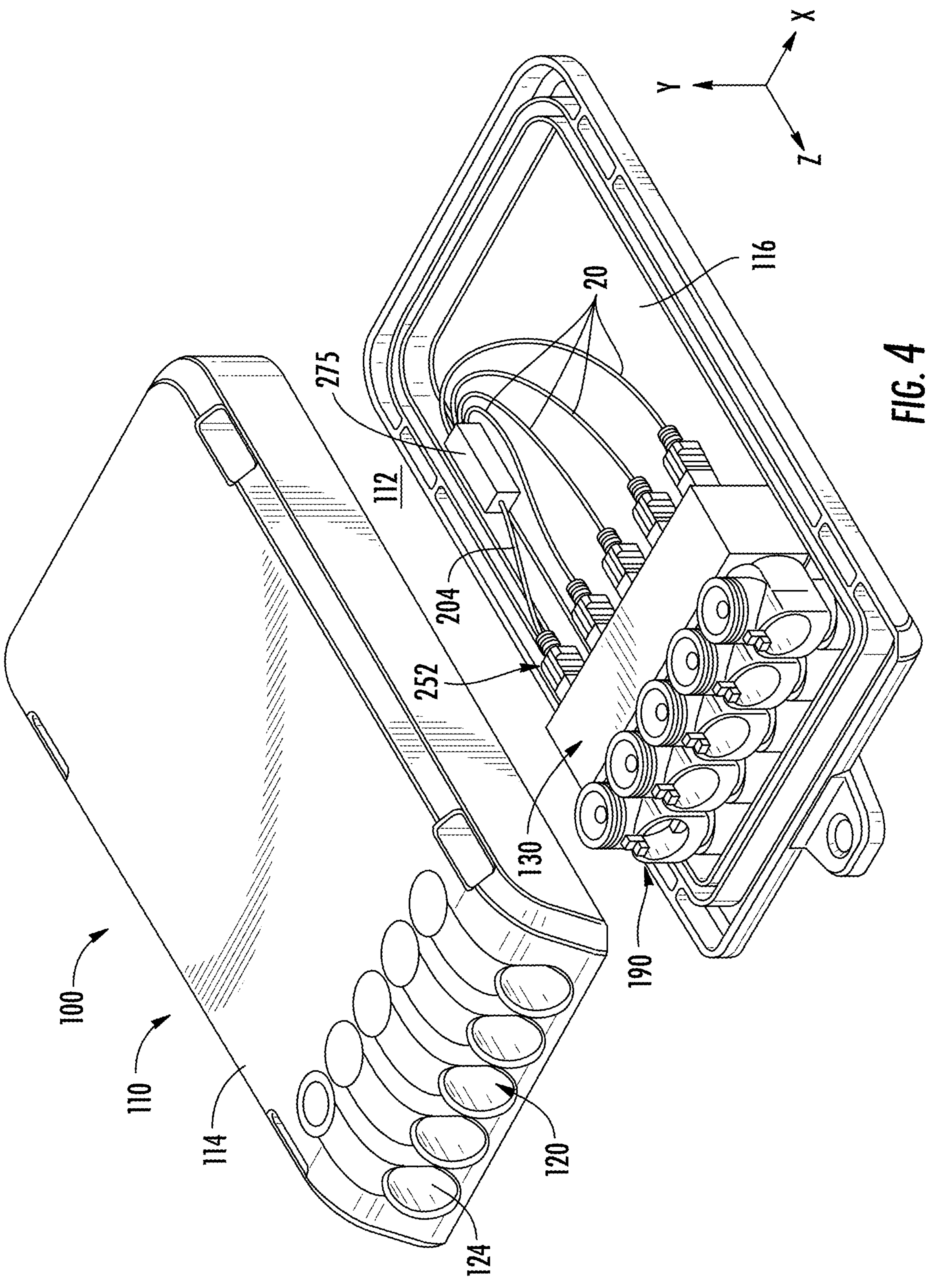
FIG. 4 schematically depicts an exploded view of the multiport assembly of FIG. 1, according to one or more embodiments shown and described herein.

Referring to FIG. 4, an exploded perspective view of the multiport assembly 100 is depicted. The shell 110 generally includes an upper shell member 114 coupled to a lower shell member 116, the upper shell member 114 and the lower shell member 116 defining a cavity 112 positioned within the shell 110. In embodiments, the upper shell member 114 and the lower shell member 116 may be formed from any suitable material, such as a polymer, a composite, a resin, or the like, and may be formed through any suitable process, such as and without limitation molding or the like. The shell 110 of the multiport assembly 100 may optionally be weatherproofed by appropriately sealing the upper shell member 114 to the lower shell member 116. The optical connector ports 120 and the input connector port 124 may also be sealed with the plurality of optical connectors 210 and the input tether 200, respectively, using any suitable means such as gaskets, O-rings, adhesive, sealant, welding, overmolding or the like. If the multiport assembly 100 is intended for indoor applications, then the weatherproofing may not be required.

In one embodiment, to seal the upper shell member 114 and the lower shell member 116 together, a heat soluble resin may be utilized. The heat soluble resin can be in the form of a thermoplastic cord containing magnetically active particles. For example, the heat soluble resin can be placed in a groove defined by the upper shell member 114 and/or the lower shell member 116, and the upper shell member 114 and the lower shell member 116 may be pressed toward each other. An induced energy may then be applied to heat the heat soluble material (also referred to herein as a resin) causing the heat soluble material to soften and then re-harden after cooling, thereby making a strong seal at the housing interface. Typically, the strength seal (e.g., the cord of thermoplastic) extends entirely around a perimeter of the upper shell member 114 and the lower shell member 116; however, in some applications the cord does not extend entirely around the perimeter. The resin can include magnetically active particles and the induced energy can be a radio frequency (RF) electromagnetic field which induces eddy currents in the magnetically active pieces. The eddy currents flowing in the magnetically active particles heat the magnetically active particles which cause the heat soluble material to soften and bond with the upper shell member 114 and the lower shell member 116. The RF field is then turned off, and when the heat soluble material cools off, the heat soluble material hardens, and thus, the upper shell member 114 and the lower shell member 116 are welded together. One exemplary process employs EMABOND™, commercially available from the Ashland Specialty Chemical company of Ohio as the heat soluble material with embedded magnetically active particles.

In some embodiments, the multiport assembly 100 includes respective push-button securing members 190 associated with each of the optical connector ports 120 and the input connector port 124; however, the securing members 190 may have other constructions such as sliders or rotating buttons that may be actuated for releasing the optical connector 210 from the respective connector ports 120,124 if desired. The plurality of push-button securing members 190 are structurally configured to engage with respective securing elements 190A so that the input tether 200 and/or the plurality of optical connectors 210 and retain at least a portion of the input tether 200 and/or the plurality of optical connectors 210 for optical connection with optical fibers within the cavity 112 of the multiport assembly 100. In embodiments, the plurality of push-button securing members 190 selectively retain the plurality of optical connectors 210 and/or the input tether 200 within the respective connector ports 120,124 of the multiport assembly 100. In the embodiment depicted in FIG. 4, the input tether 200 and the plurality of optical connectors 210 are each selectively retained within the respective connector ports 120,124 of the multiport assembly 100 using the respective securing elements 190A and may be released using the plurality of push-button securing members 190 if desired. In other embodiments, the plurality of optical connectors 210 may be selectively retained within the respective connector ports 120,124 of the multiport assembly 100, while the input tether 200 is rigidly connected to the multiport assembly 100 (i.e., the input tether 200 is not generally removable from the multiport assembly 100 without dis-assembling the multiport assembly 100). The input tether 200 and/or the optical connectors 210 may be secured to the multiport assembly 100 in other suitable manners such as, a bayonet connection, adhesive, a collar or crimp, heat shrink or combinations of the same.

The multiport assembly 100 further includes a plurality of optical adapter assemblies 130 positioned within the cavity 112 of the shell 110. The plurality of optical adapter assemblies 130 are structurally configured to receive, align, and optically couple optical connectors. In embodiments each of the plurality of optical adapter assemblies 130 are aligned with a corresponding optical connector port of the plurality of optical connector ports 120 and/or with the input connector port 124. The optical adapter assemblies 130 may receive an optical connector 252 at the rear portion for optical connection with an external optical connector 210 such as shown in FIG. 4. Any suitable optical adapter assembly is possible with the concepts disclosed herein such as using a common retainer or common clamshell for securing a plurality of optical adapters. Other variations are possible as well, and FIGS. 12A and 12B depict an explanatory optical adapter sub-assembly 130SA.

In some embodiments, one or more optical splitters 275 may be positioned within the cavity 112 defined by the shell 110, and may split a signal from a single optical fiber 204 into a plurality of optical fibers 202. In particular, the optical splitter 275 may receive a single optical fiber 204, for example from an input tether 200 (FIG. 3), and may split a signal from the optical fiber 204 into a plurality of optical fibers 202 that extend between the optical splitter 275 and the plurality of optical adapter assemblies 130. In one example, the optical splitter 275 allows a single optical signal to be split into multiple signals such as 1×N split, but other splitter arrangements are possible such as a 2×N split. In the embodiment depicted in FIG. 4, a signal from the single optical fiber 204 is split by the optical splitter 275 to four optical fibers 202 extending between the optical splitter 275 and four optical adapter assemblies 130. Other embodiments may include two splitter with the first splitter having an asymmetric power split ratio such as a 90/10 power level split with 90 percent leg of the split signal feeding downstream and the 10 percent split feeding a second splitter such as a 1×N splitter for distributing the optical signals to downstream users in the communication network. Other variations of the power-level splits are also possible. Further, the cavity 112 of the multiport assembly 100 may have other components disposed therein such as wavelength division multiplexing devices such as CWDM or DWDM devices.

Figure 5A:
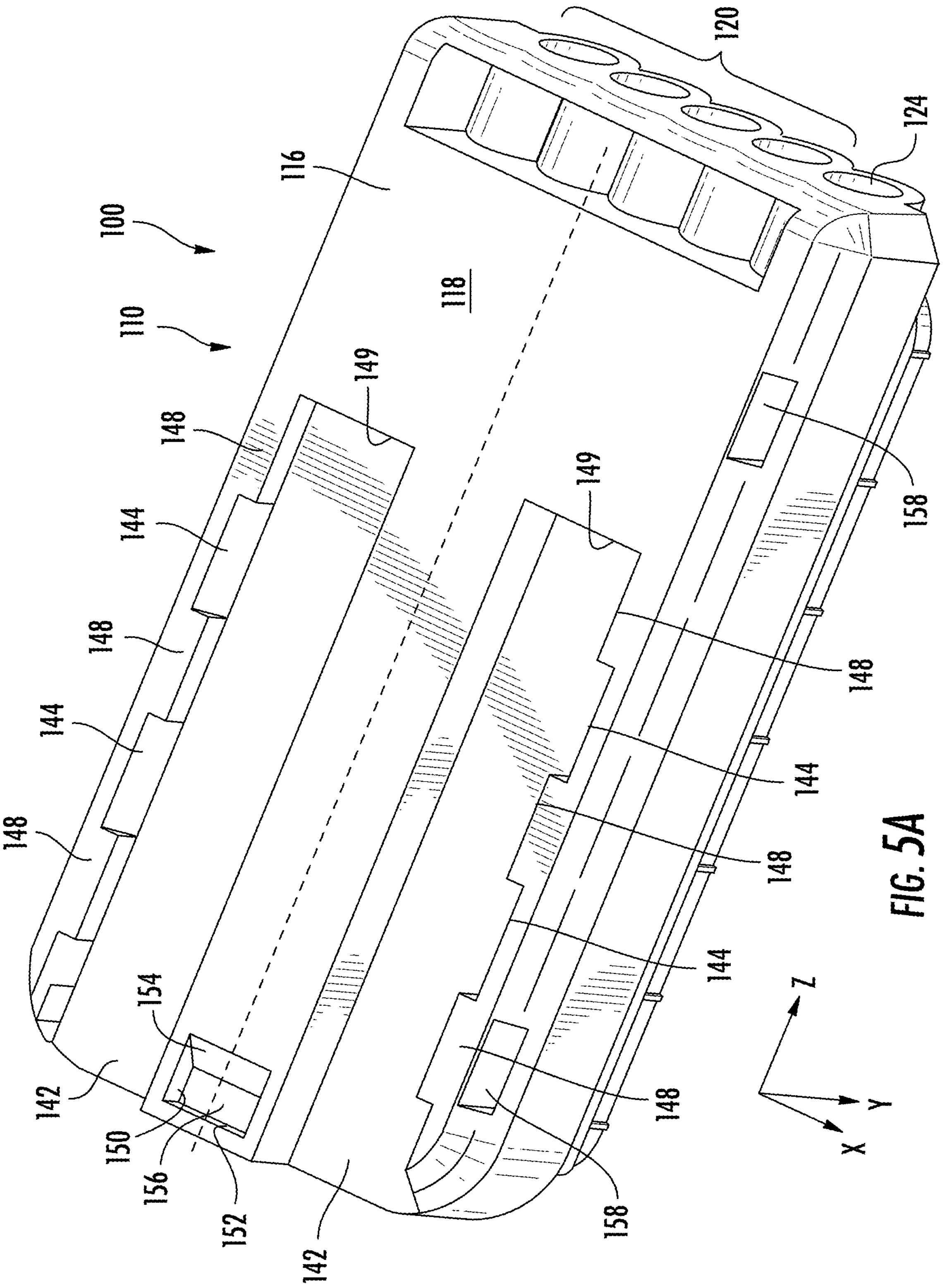
FIG. 5A schematically a lower perspective view of the shell multiport assembly of FIG. 1, according to one or more embodiments shown and described herein.
Figure 5B:
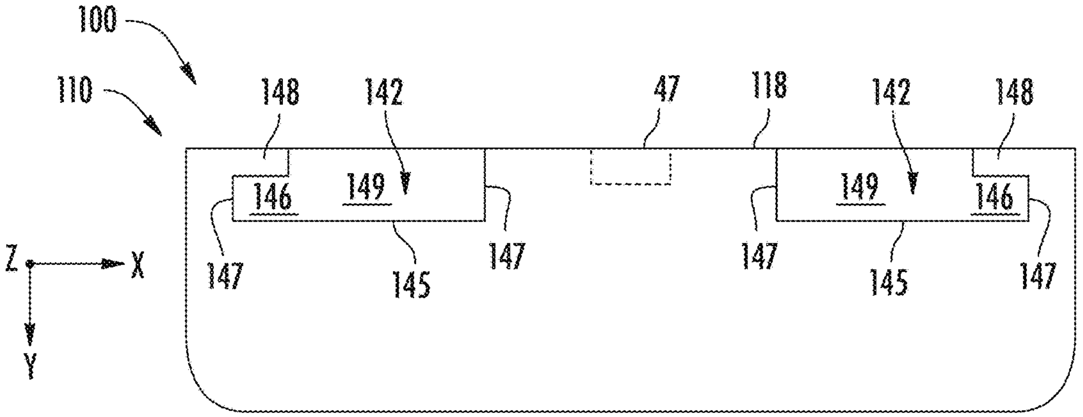
FIG. 5B schematically depicts an end view of the shell of the multiport assembly of FIG. 1, according to one or more embodiments shown and described herein.

Referring collectively to FIGS. 5A and 5B, a lower perspective view and an end view of the shell 110 are schematically depicted. In embodiments, the shell 110 defines at least one slot 142 positioned on a lower surface 118 of the shell 110 and extending in the longitudinal direction. In the embodiment depicted in FIGS. 5A and 5B, the shell 110 defines two slots 142 that are symmetric to one another about a multiport assembly centerline 10 that bisects the multiport assembly 100 in the lateral direction. The slots 142 each define a bottom face 145 positioned above the lower surface 118 of the shell 110 (i.e., in the +Y-direction). Each of the slots 142 further define opposing sidewalls 147 that extend downward from the bottom face 145 to the lower surface 118 (i.e., in the −Y-direction) of the shell 110. In particular, each of the slots 142 defines an inward-facing sidewall 147 (i.e., facing inward the centerline 10 in the lateral direction), and an opposing, outward-facing sidewall 147 (i.e., facing outward from the centerline 10 in the lateral direction). Each of the slots 142 define endfaces 149 positioned at the front end of the slots 142. The endfaces 149 are generally oriented to face rearward in the longitudinal direction (i.e., in the −Z-direction) and may restrict longitudinal movement of a mounting member positioned in the slots 142, as described in greater detail herein.

Each of the slots 142 further define one or more tabs 148 that extend over the bottom face 145 to define channels 146 that extend along the shell 110 in the longitudinal direction. The channels 146 of each of the slots 142 are generally bounded by the bottom face 145, a sidewall 147, and the tabs 148. Each of the slots 142 define cutouts 144 positioned between the tabs 148 in the longitudinal direction. At the cutouts 144, the sidewalls 147 may generally extend between the bottom face 145 of the slot 142 and the lower surface 118 of the shell 110 in the vertical direction. A mounting member may be selectively inserted into the slots 142 via the cutouts 144, as described in greater detail herein. In the embodiment depicted in FIGS. 5A and 5B, the slots 142 define tabs 148 and cutouts 144 positioned on the inward-facing sidewalls 147, however, it should be understood the tabs 148 and cutouts 144 may additionally or alternatively be positioned on the outward-facing sidewalls 147.

The shell 110 further defines a latch recess 150 extending upward into the lower surface 118 of the shell 110. The latch recess 150 defines a latch engagement face 152 that is oriented to face forward in the longitudinal direction (i.e., in the +Z-direction). The latch recess 150 further defines a recess surface 156 positioned below the latch engagement face 152. The recess surface 156 is oriented transverse to the latch engagement face 152 and extends forward from the recess surface 156 in the longitudinal direction (i.e., in the +Z-direction). In embodiments, the latch recess 150 further includes a ramp 154 that extends downward from the recess surface 156 to the lower surface 118 of the shell 110 (i.e., in the −Y-direction). The latch recess 150 may engage a latch of a mounting member to selectively couple the mounting member to the shell 110, as described in greater detail herein.

The shell 110 may also define one or more perimeter through slots 158 extending through the shell 110 in the vertical direction that may also receive a band or belt to fasten the multiport assembly 100 to a post or utility pole. Beyond these perimeter through slots 158, the multiport assembly 100 disclosed herein may also include a mounting member that attaches in any suitable manner to the shell 110 for further mounting options.

Figure 6A:
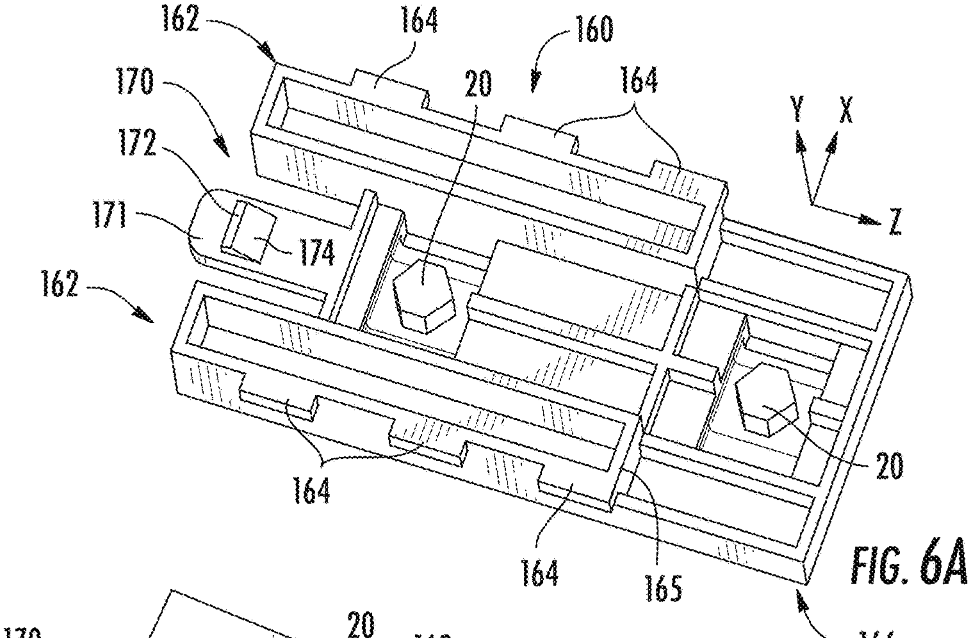
FIG. 6A schematically an upper perspective view of a mounting member of the multiport assembly of FIG. 1, according to one or more embodiments shown and described herein.
Figure 6B:
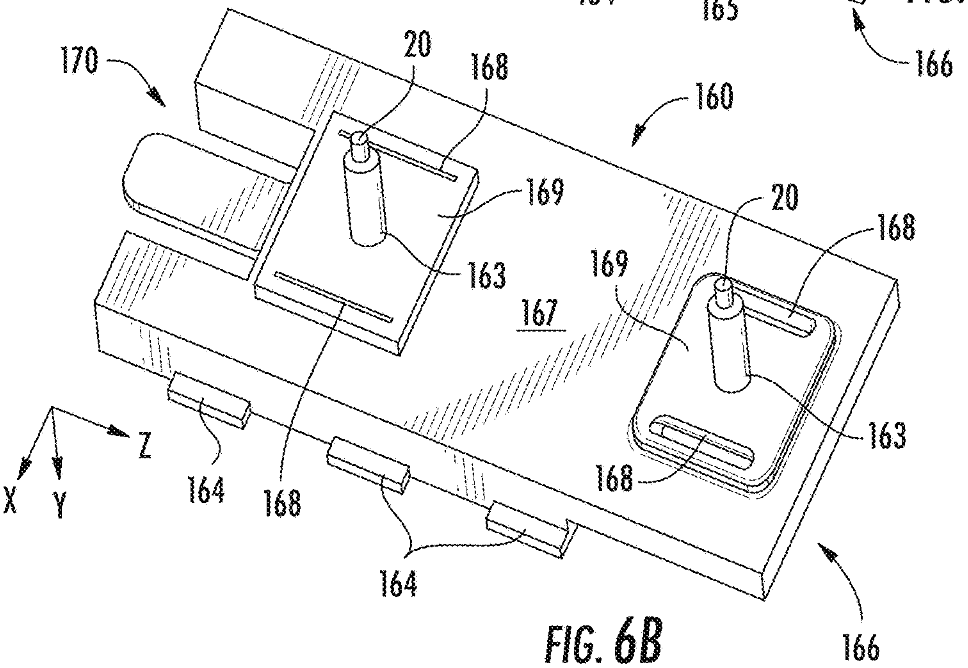
FIG. 6B schematically a lower perspective view of the mounting member of the multiport assembly of FIG. 1, according to one or more embodiments shown and described herein.

Referring to FIGS. 6A and 6B, an upper and a lower perspective view of an example mounting member 160 are schematically depicted, respectively. The mounting member 160 generally includes one or more multiport engagement portions 162, a mounting portion 166, and a latch 170. The multiport engagement portions 162 are sized and shaped to correspond to the slots 142 (FIGS. 5A and 5B) of the shell 110 of the multiport assembly 100, and each multiport engagement portion 162 includes one or more slot engagement tabs 164 extending outward from the multiport engagement portions 162. The slot engagement tabs 164 are sized and shaped to be positioned within the channels 146 (FIG. 5B) of the slots 142 and to engage with the tabs 148 (FIG. 5B) of the shell 110 of the multiport assembly 100. The multiport engagement portions 162 further define a mounting member endface 165 that is oriented to face forward in the longitudinal direction (i.e., in the +Z-direction). In embodiments, the mounting member endface 165 may engage the endfaces 149 (FIGS. 5A and 5B) of the slots 142 of the shell 110 to restrict longitudinal movement of the mounting member 160 with respect to the shell 110, as described in greater detail herein.

The latch 170 generally includes a latch tab 171 and a multiport engagement face 172 that extends outward from the latch tab 171 in the vertical direction and that is oriented to face in the rearward longitudinal direction (i.e., in the −Z-direction). In embodiments, the multiport engagement face 172 is engageable with the latch engagement face 152 (FIG. 5A) to selectively restrict movement of the mounting member 160 with respect to the shell 110 (FIG. 5A) in the longitudinal direction, as described in greater detail herein. In embodiments the latch 170 further includes a ramp 174 that extends upward from the multiport engagement face 172 to the latch tab 171 (i.e., in the +Y-direction). The ramp 174 may engage the shell 110 (FIG. 5A) to selectively deform the latch tab 171 outward form the shell 110 such that the latch 170 may be moved into the latch recess (FIG. 5A), as described in greater detail herein.

The mounting portion 166 of the mounting member 160 generally includes an outward face 167 and one or more standoffs 169 extending outward from the outward face 167. Each of the one or more standoffs 169 may define a corresponding aperture 163 through which a fastener 20 may be inserted. In the embodiment depicted in FIGS. 6A and 6B, the mounting portion 166 includes two standoffs 169, each of the standoffs 169 including a fastener 20 inserted within an aperture 163 of the standoff 169. In embodiments, the fastener 20 may include any suitable mechanical fastener, such as a screw or the like. While the embodiment depicted in FIGS. 6A and 6B includes two standoffs 169 that are spaced apart from one another in the longitudinal direction, it should be understood that the mounting member 160 may include a single standoff 169 and corresponding aperture 163, or may include multiple standoffs 169 with corresponding apertures 163.

In the embodiment depicted in FIGS. 6A and 6B each of the standoffs 169 define strap apertures 168 extending through the mounting member 160. In embodiments, the mounting member 160 may be installed to a surface, such as a wall, a utility pole, or the like. For example, the mounting member 160 may be attached to a surface either by the fasteners 20 or by a zip-tie, belt, strap the like extending through the strap apertures 168. Because the standoffs 169 extend outward from the outward face 167, as the mounting member 160 is attached to the surface, the standoffs 169 may engage the surface, while the outward face 167 of the mounting member 160 and the lower surface 118 (FIG. 5B) of the shell 110 are spaced apart from the surface. As the mounting member 160 is attached to the surface, components of the mounting member 160 in contact with the surface may tend to deform to match the contours of the surface, particularly when force is applied to engage and secure the multiport assembly 100 (FIG. 1) to the surface. Because the standoffs 169 act to space the outward face 167 of the mounting member 160 and the lower surface 118 (FIG. 5B) of the shell 110 apart from the surface, the standoffs 169 may limit deformation of the outward face 167 and the lower surface 118 of the shell 110, thereby assisting in maintaining the structural integrity of the multiport assembly 100 as it is fastened to a surface.

In embodiments, the mounting member 160 may be formed from any suitable material, such as a polymer, a composite, a resin, or the like, and may be formed through any suitable process, such as and without limitation molding or the like. In some embodiments, the mounting member 160 is formed of the same material as the shell 110 (FIG. 5A) of the multiport assembly 100. In some embodiments, the mounting member 160 is formed of a different material than the shell 110 (FIG. 5A) of the multiport assembly 100.

Figure 7:
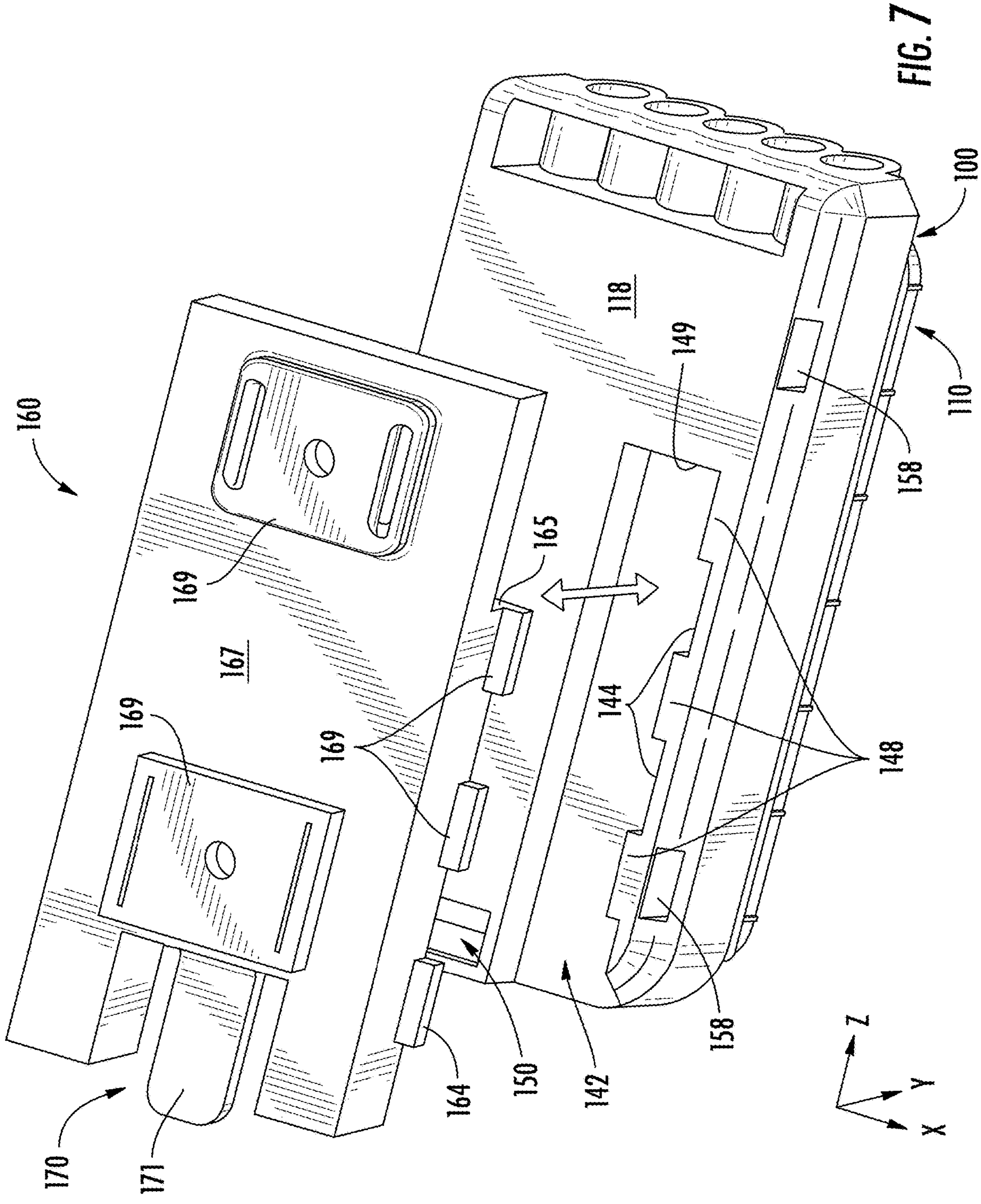
FIG. 7 schematically depicts an exploded view of the mounting member and the shell of the multiport assembly of FIG. 1, according to one or more embodiments shown and described herein.

Referring to FIG. 7, a perspective view of the mounting member 160 and the shell 110 of the multiport 100 are schematically depicted. To install the mounting member 160 to the shell 110, the slot engagement tabs 164 of the mounting member 160 are aligned with the cutouts 144 of the slots 142. With the slot engagement tabs 164 aligned with the cutouts 144, latch 170 is positioned rearward of the latch recess 150 in the longitudinal direction (i.e., in the −Z-direction). The slot engagement tabs 164 may be inserted into the cutouts 144 of the slots 142, and the mounting member 160 may be slid forward in the longitudinal direction (i.e., in the +Z-direction) such that the slot engagement tabs 164 are positioned within the channels 146 (FIG. 5B) and engaged with the tabs 148. As the mounting member 160 moves forward in the longitudinal direction, the mounting member endface 165 engages the endfaces 149 of the slots 142, restricting movement of the mounting member 160 in the +Z-direction.

Figure 8:
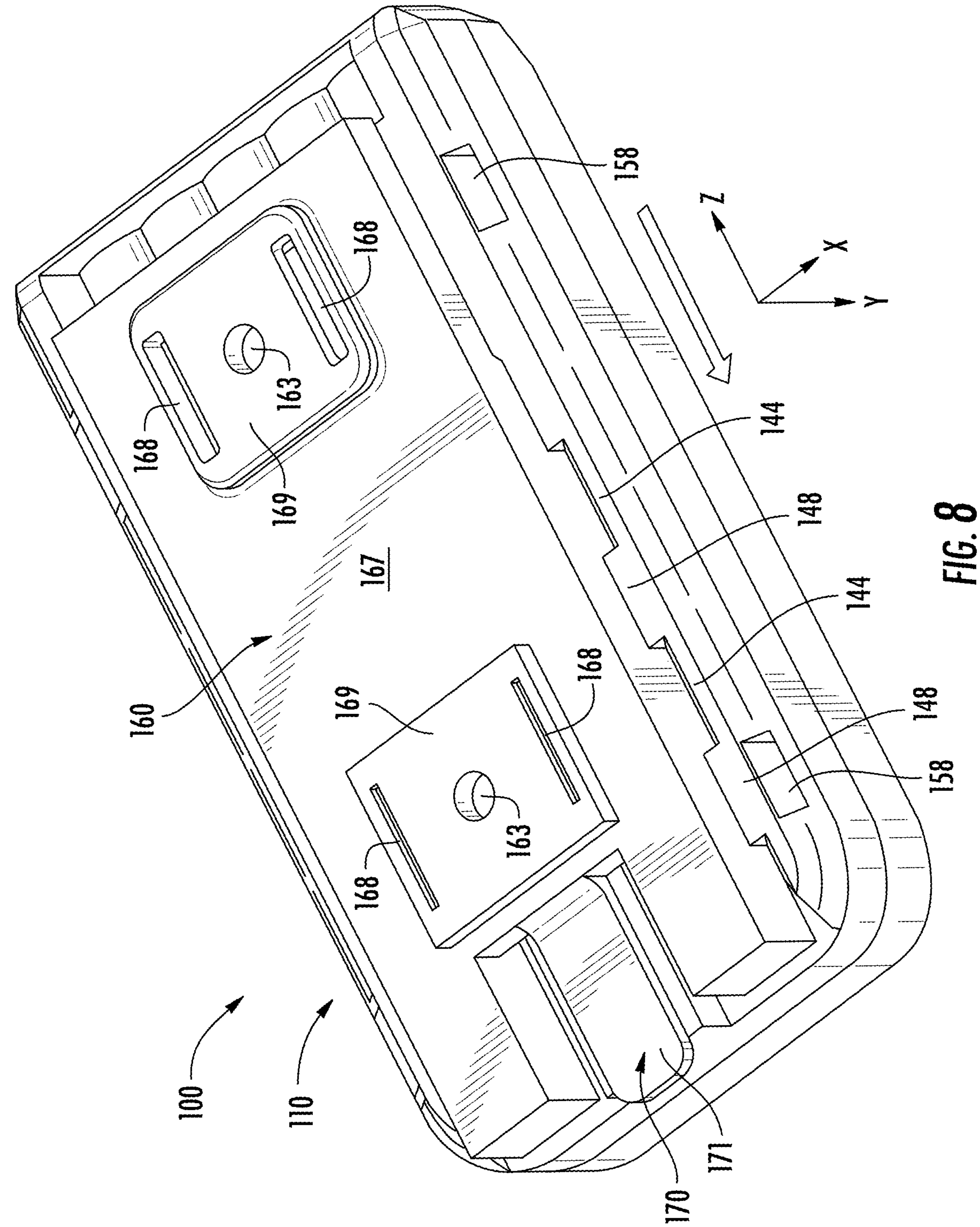
FIG. 8 schematically depicts the mounting member assembled to the shell of the multiport assembly of FIG. 1, according to one or more embodiments shown and described herein.
Figure 9:
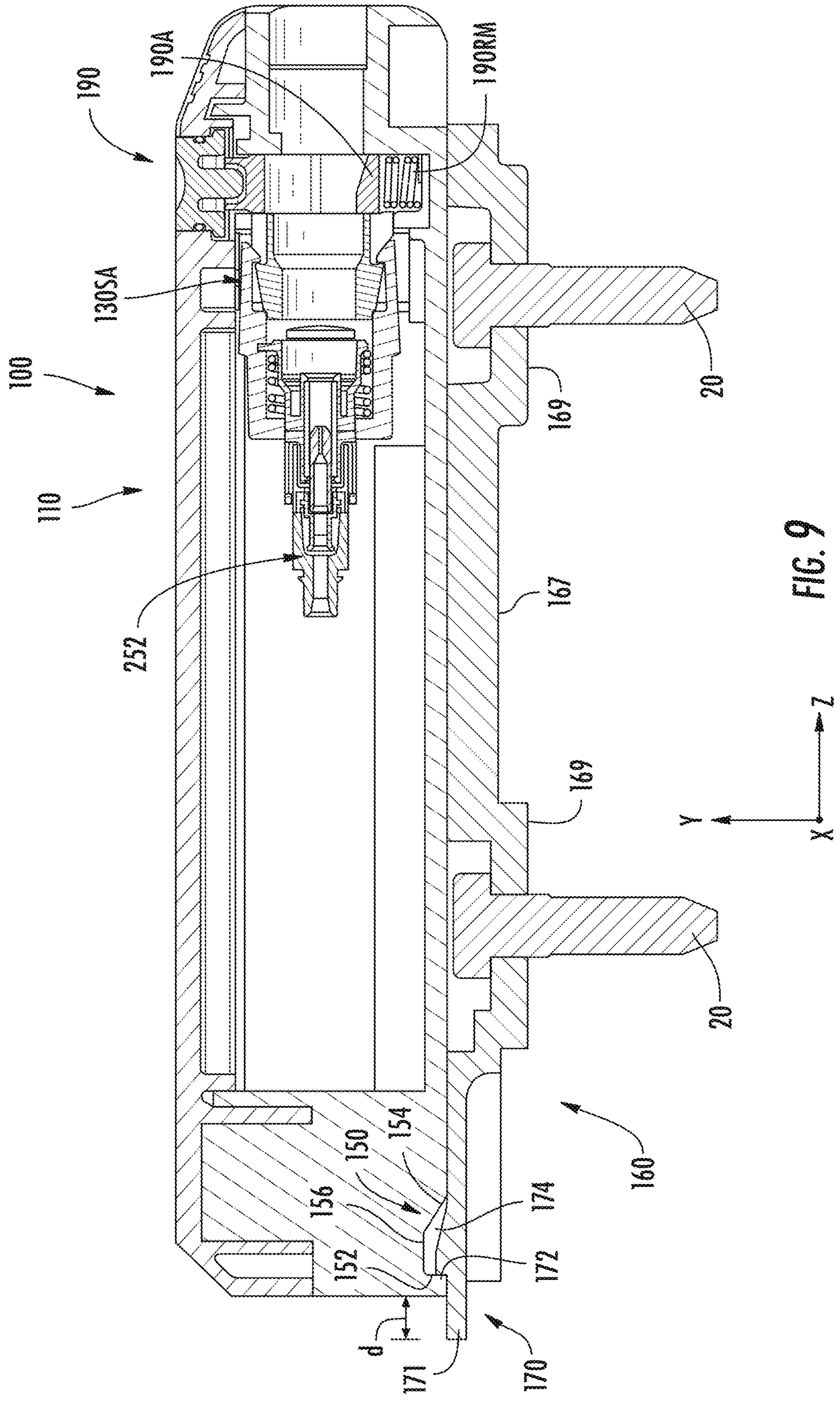
FIG. 9 schematically depicts section view of the multiport assembly along section 9-9 of FIG. 1, according to one or more embodiments shown and described herein.

As the mounting member 160 moves forward in the longitudinal direction, the latch 170 is engaged with the latch recess 150 of the shell 110. For example and referring to FIGS. 8 and 9, a perspective view and section view of the mounting member 160 installed to the shell 110 along section 9-9 of FIG. 1 are schematically depicted, respectively. As the mounting member 160 moves forward in the longitudinal direction, the ramp 174 of the latch 170 engages the shell 110, and the latch 170 may elastically deform outward and away from the shell 110 (i.e., in the −Y-direction). As the mounting member 160 continues to move forward, the ramp 174 and the multiport engagement face 172 of the latch 170 are positioned within the latch recess 150. More particularly, the multiport engagement face 172 of the latch 170 engages the latch engagement face 152 of the shell 110, thereby restricting rearward movement of the mounting member 160 in the longitudinal direction (i.e., in the −Z-direction). In some embodiments, the latch 170 may extend beyond the shell 110 by a distance d in the longitudinal direction, which may assist in ensure that a user may access the latch 170 to selectively release the shell 110 from the mounting member 160, for example by deforming the latch 170 outward and away from the shell 110 to disengage the multiport engagement face 172 from the latch engagement face 152. Through engagement between the multiport engagement face 172 and the latch engagement face 152, and through engagement between the mounting member endface 165 (FIG. 7) and the endface 149 (FIG. 7) of the slots 142, forward and rearward movement of the mounting member 160 in the longitudinal direction is restricted. Furthermore, outward movement of the mounting member 160 with respect to the shell 110 is restricted through engagement between the slot engagement tabs 164 (FIG. 7) of the mounting member 160 and the tabs 148 of the shell 110. In this way, the mounting member 160 may be selectively coupled to the shell 110.

As the mounting member 160 may be selectively coupled to the shell 110, the mounting member 160 may be installed to a surface, for example a wall or a utility pole, and then the shell 110 may subsequently be selectively coupled to the mounting member 160. By installing the mounting member 160 to the surface first, the amount of debris from the installation process (e.g., dirt or dust from installing the fasteners) exposed to the multiport assembly 100 may be reduced.

Figure 10:
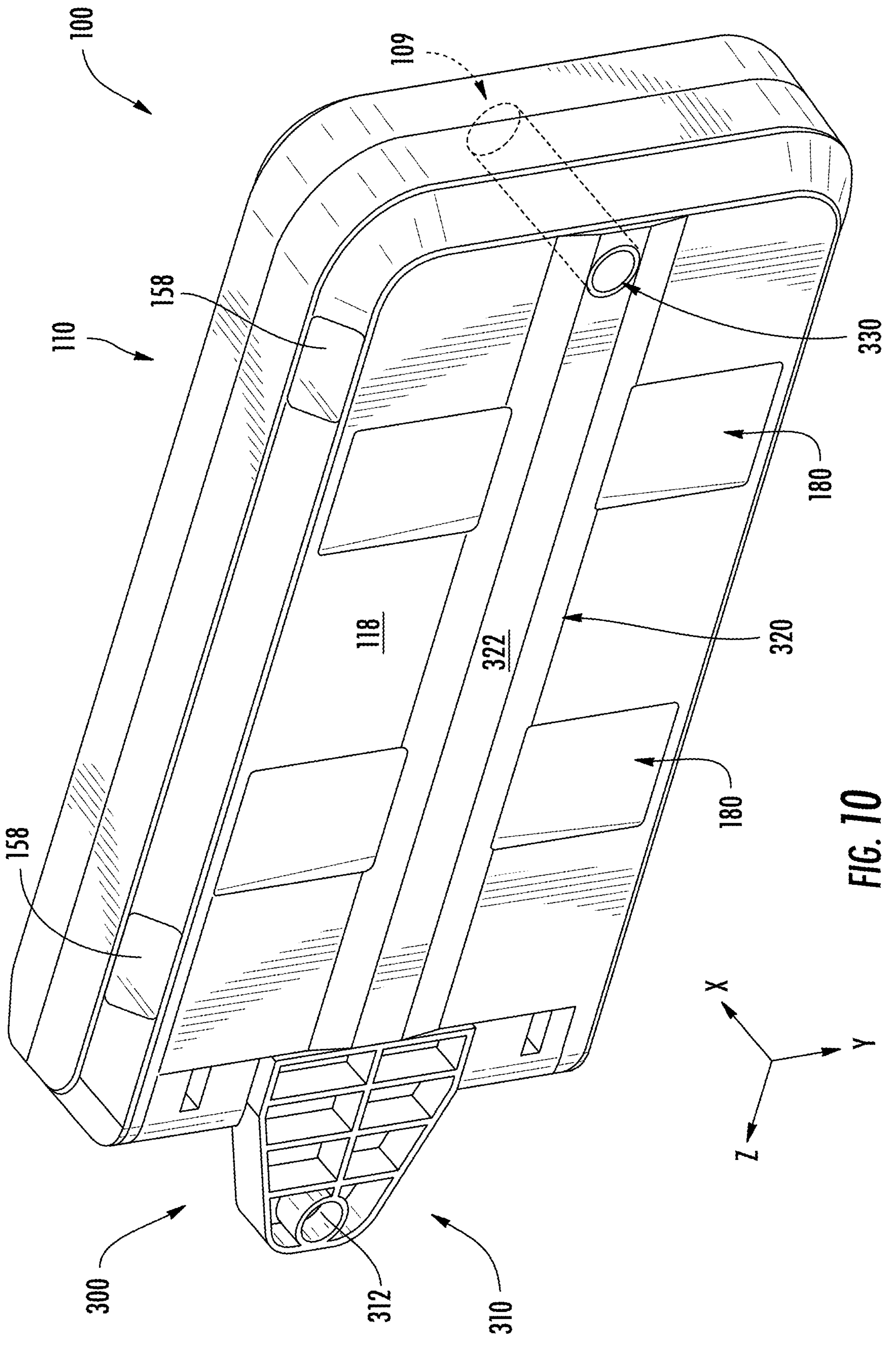
FIG. 10 schematically depicts a lower perspective view of another mounting member assembled to a multiport assembly, according to one or more embodiments shown and described herein.

Referring to FIG. 10, a lower perspective view of another multiport assembly 100 including another mounting member 300 is schematically depicted. In the embodiment depicted in FIG. 10, the shell 110 of the multiport assembly 100 defines one or more lateral slots 180 that extend inward from the lower surface 118 of the shell 110. The one or more lateral slots 180 generally extend along the lower surface 118 of the shell 110 in the lateral direction. The lateral slot 180 is arranged into back-to-back portions that extend inward toward the middle on the lower side for allowing a smooth insertion of a strap, tie-wrap, belt or the like thru an aperture to secure the multiport assembly 100.

In this embodiment, the lateral slots 180 cooperate with the longitudinal member 320 to form a strap aperture (not numbered) through a lower portion of the shell 110 for securing the multiport assembly 100 in a first manner. The multiport assemblies 100 may also be secured in a second manner using one or more apertures in the shell 210.

In the embodiment depicted in FIG. 10, the mounting member 300 generally includes a forward tab 310 that extends forward from the shell 110 in the longitudinal direction (i.e., in the +Z-direction). The forward tab 310 generally defines an aperture 312 extending through the forward tab 310 and through which a fastener may be inserted to secure the multiport assembly 100 to a surface, such as a wall, a utility pole, or the like. The mounting member 300 further includes a longitudinal member 320 that is integral with the forward tab 310 extends along the lower surface 118 of the shell 110. In embodiments, the longitudinal member 320 extends over and partially covers the one or more lateral slots 180. In embodiments, a band, a strap, or the like, may be inserted between the longitudinal member 320 and the one or more lateral slots 180 to secure the multiport assembly 100 to a surface, such as a utility pole or the like. The longitudinal member 320 extends outward from the shell 110, forming a standoff 322 that is spaced apart from the lower surface 118 in the vertical direction. Similar to the embodiment described above with respect to FIGS. 1-9, when the multiport assembly 100 is secured to a surface, the standoff 322 may contact and engage the surface while the lower surface 118 of the shell 110 is spaced apart from the surface. The standoff 322 may thereby limit contact between the multiport assembly 100 with the surface, limiting deformation of the shell 110 of the multiport assembly 100, as described above.

In the embodiment depicted in FIG. 10, the mounting member 300 further defines a rear aperture 330 positioned rearward of the forward tab 310. In some embodiments, the rear aperture 330 is positioned at the rear end 104 of the shell 110 when the mounting member 300 is assembled to the shell 110 and aligns with a rear shell aperture 109 that extends through the shell 110. In other words, there is a through-hole from the lower side to the upper-side of the shell 110. A fastener may be inserted through the rear shell aperture 109 and the rear aperture 330 of the mounting member 300 to secure the multiport assembly 100 to a surface. In embodiments, the rear aperture 330 of the mounting member 300 may be defined by a bushing 332 that extends at least partially within the rear shell aperture 109. The bushing 332 may reduce stress applied to the shell 110, such as by a fastener inserted within the rear shell aperture 109 to secure the multiport assembly 100 to a surface. In one embodiment, bushing may be slightly longer than the height H of the multiport assembly so that bushing can carry any compressive loading applied by the fastener and inhibits damage to the shell 110.

In embodiments, the mounting member 300 may be coupled to the shell 110 in any suitable manner, for example through adhesive, sealant, welding, overmolding, or the like. In some embodiments, the mounting member 300 may be coupled to the shell 110 by a snap-fit or the like.

Figure 11:
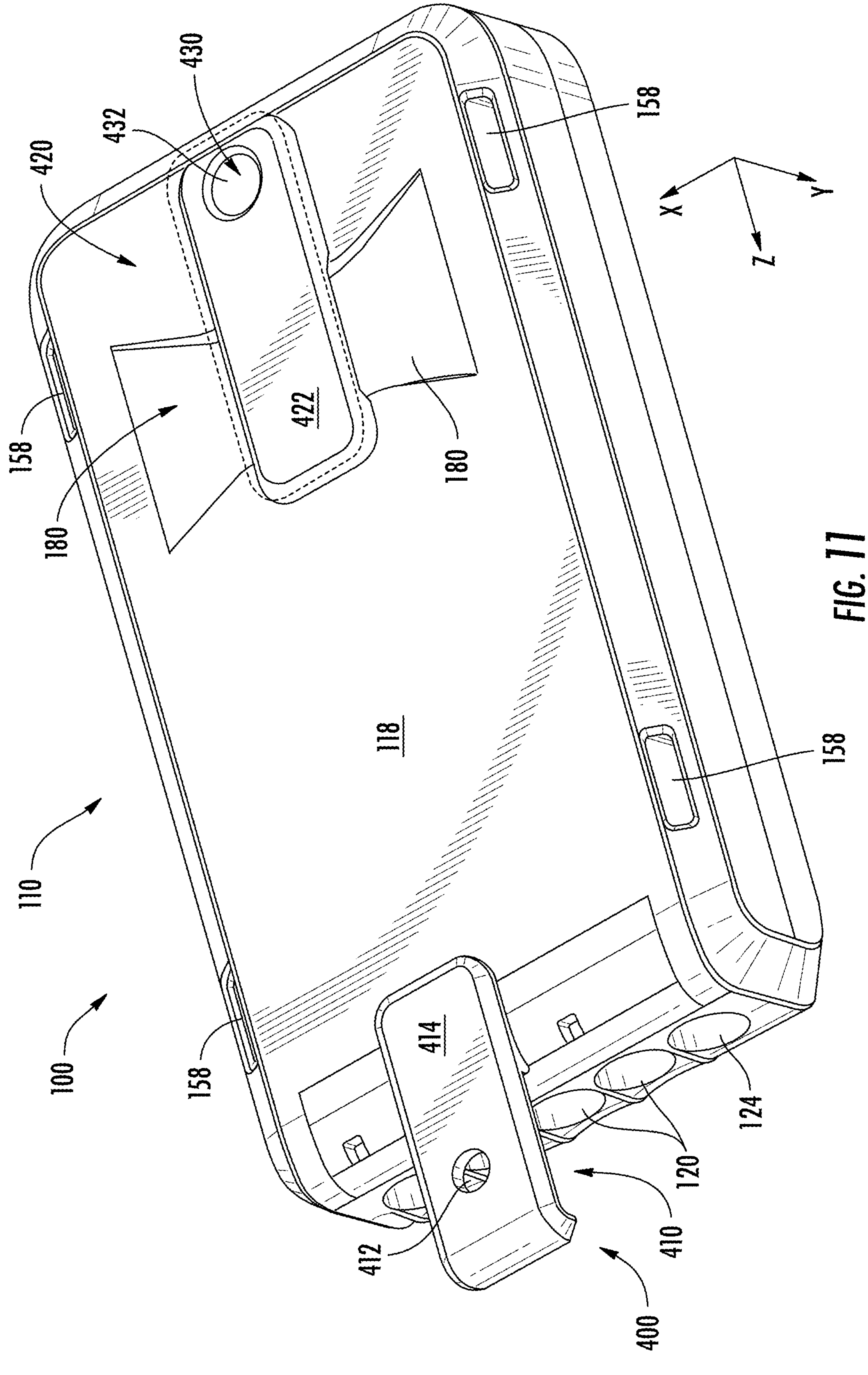
FIG. 11 schematically depicts a lower perspective view of another mounting member assembled to a multiport assembly, according to one or more embodiments shown and described herein.
Figure 16:
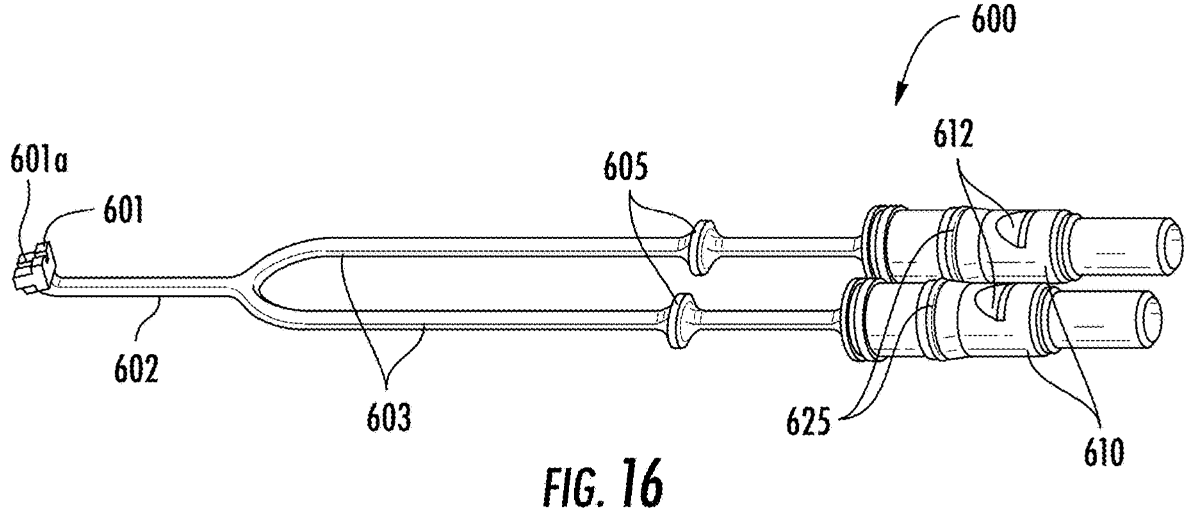
FIG. 16 is a perspective view of the dust plug with the tether of FIGS. 12-14 from a first angle to show the locking features of the dust plug body.
Figure 17:
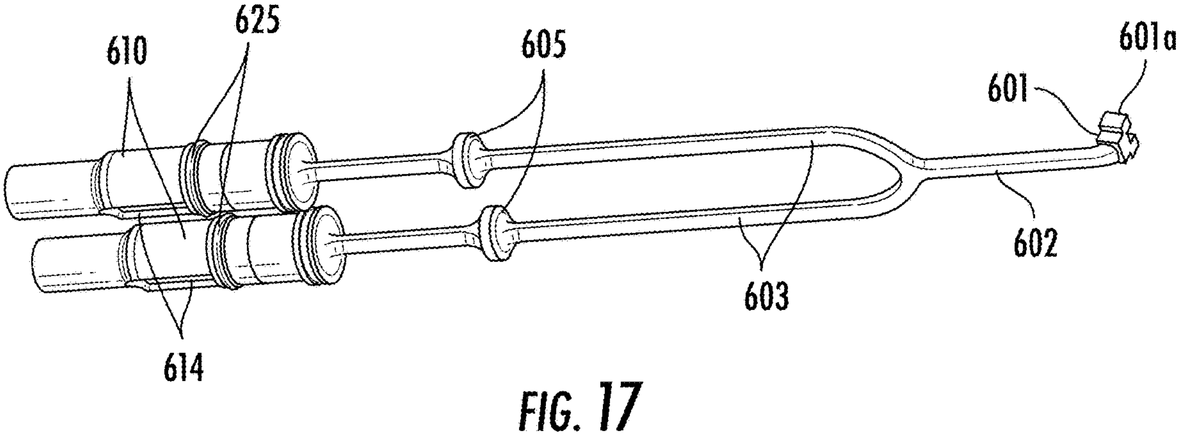
FIG. 17 is a perspective view of the dust plug with the tether of FIGS. 12-14 from a second angle to show the keying features of the dust plug body.
Figure 18:
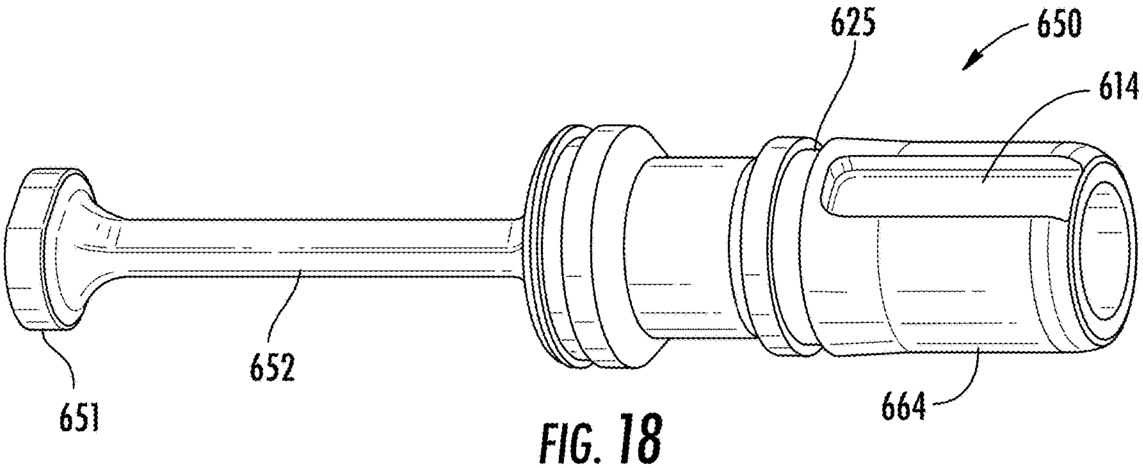
FIGS. 18 and 19 are perspective views showing details of the second dust plug of FIG. 15.
Figure 19:
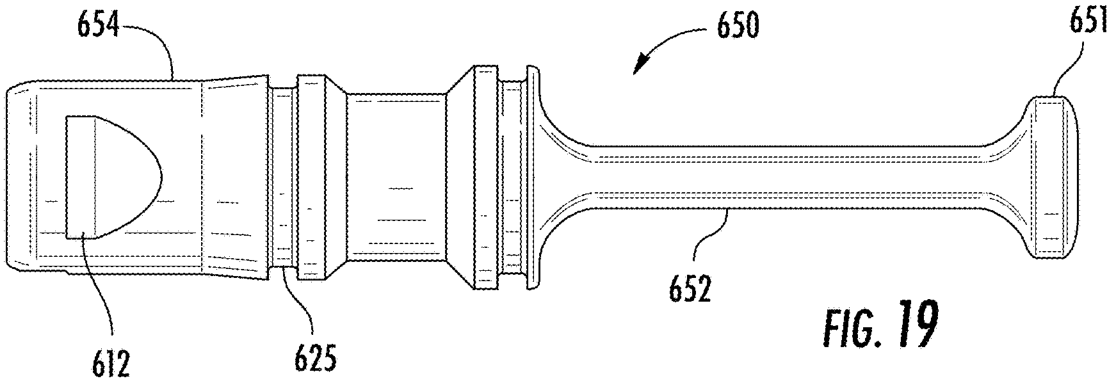

Referring to FIGS. 11 and 12, a lower perspective view and an exploded view of a multiport assembly 100 with another mounting member 400 are depicted, respectively. FIG. 12 further depicts an explanatory dust plug 600 comprising a tether that may be attached to the multiport assembly 100 if desired; however, other types of dust plugs may be used with any of the multiport assemblies 100 disclosed herein. When installed, the dust plugs inhibit dirt, dust or debris from entering the optical connector ports 120 or the input connector port 124. FIGS. 16 and 17 show further views of the dust plug 600 and FIGS. 18 and 19 depict a dust plug 650 that has a pulling grip 652, but does not include a tether. Other dust plug features or designs are also shown in FIGS. 20-33. Dust plugs disclosed herein include a body having a locking feature and a keying portion. The locking feature of the dust plug is used for engaging with a portion of multiport. The keying portion of the dust plug is disposed about 180 degrees from the locking feature as depicted for aligning the locking feature within the optical connector port. The dust plugs having tethers may be attached to multiport assemblies to prevent loss as shown if desired or not. FIGS. 12A and 12B depict explanatory modular optical adapter assemblies 130SA that may be aligned to the connector ports 120,124 of the shell 110 using one or more alignment features formed in the shell 210.

Similar to the embodiment described above and depicted in FIG. 10, the mounting member 400 includes the forward tab 410 extending forward from the shell 110, the forward tab 410 including the aperture 412 extending through the forward tab 410. The mounting member 400 further includes the longitudinal member 420 extending along the lower surface 118 of the shell 110 in the longitudinal direction. In the embodiment depicted in FIGS. 11 and 12, the longitudinal member 420 defines the rear aperture 430 extending through the longitudinal member 420.

In the embodiment depicted in FIGS. 11 and 12, the longitudinal member 420 defines the standoff 422 that is spaced apart from the lower surface 118 of the shell 110. However, in the embodiment depicted in FIG. 11, the longitudinal member 420 and the forward tab 410 are formed as separate components that are spaced apart from one another when installed to the shell 110 of the multiport assembly 100. The longitudinal member 420, and accordingly the standoff 422, extends along a discrete portion of the shell 110 in the longitudinal direction (i.e., the standoff 422 does not extend along the entire lower surface 118 of the shell 110). By extending only partially along the lower surface 118 of the shell 110, when the multiport assembly 100 is coupled to a surface, contact between the longitudinal member 420 and the surface is limited, which assists in reducing the deformation of longitudinal member 420 and the shell 110 as result of contact with a securing surface.

In embodiments, the forward tab 410 may define a forward standoff 414 that is spaced apart from the lower surface 118 of the shell 110. Like the standoff 422 of the longitudinal member 420, when the multiport assembly 100 is secured to a surface, the forward standoff 414 may contact and engage the surface, while the lower surface 118 of the shell 110 remains spaced apart from the surface. In embodiments, the forward standoff 414 and the standoff 422 of the longitudinal member 420 are aligned with one another in in the X-Z plane as depicted, so that the forward standoff 414 and the standoff 422 of the longitudinal member 420 collectively provide a level mounting surface for the multiport assembly 100. The lateral slot 180 having portions arranged back-to-back to extend inward toward the middle on the lower side allow a smooth insertion of a strap, tie-wrap, belt or the like. In this embodiment, the lateral slot 180 cooperates with longitudinal member 420 for forming a thru an aperture once the longitudinal member 420 is attached to the shell 110. The longitudinal member 420 may be attached or coupled in any suitable fashion. In one embodiment, only the area about a bushing 432 is attached or coupled to the shell in a suitable fashion such as adhesive, welding or the like, the other end is not attached so the cantilevered end may deflect. By attaching the longitudinal member 420 to the shell 110 with the cantilevered end it allows the member to deflect as needed instead of carrying unnecessary stress that could break or be damaged under excessive loading. Moreover, the bushing may be longer than the height H of the multiport assembly to inhibit damage to the shell from a fastener.

Figure 13:
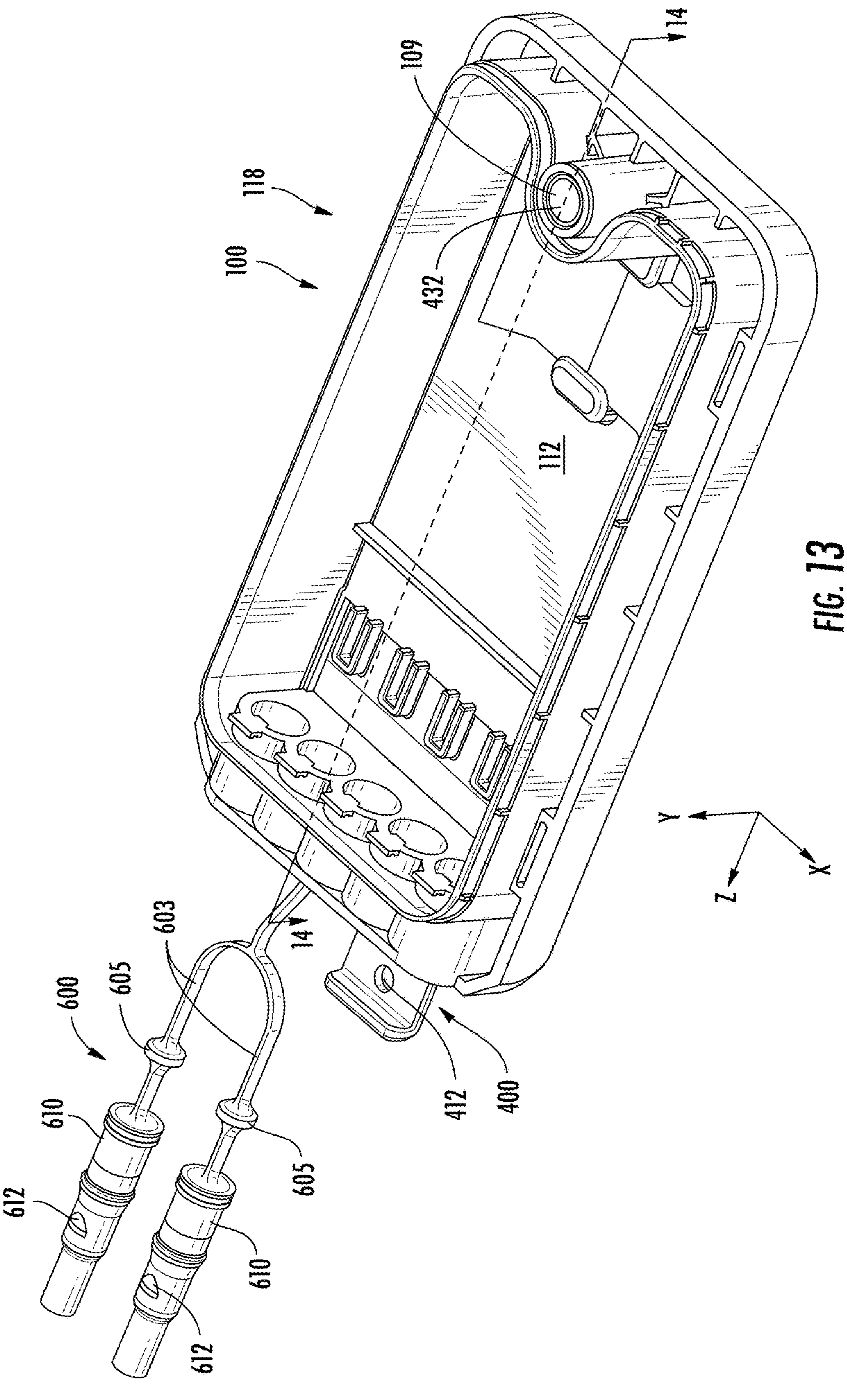
FIG. 13 schematically depicts an upper perspective view of the mounting member and the dust plug with the tether secured to the multiport assembly of FIG. 11, according to one or more embodiments shown and described herein.
Figure 27:
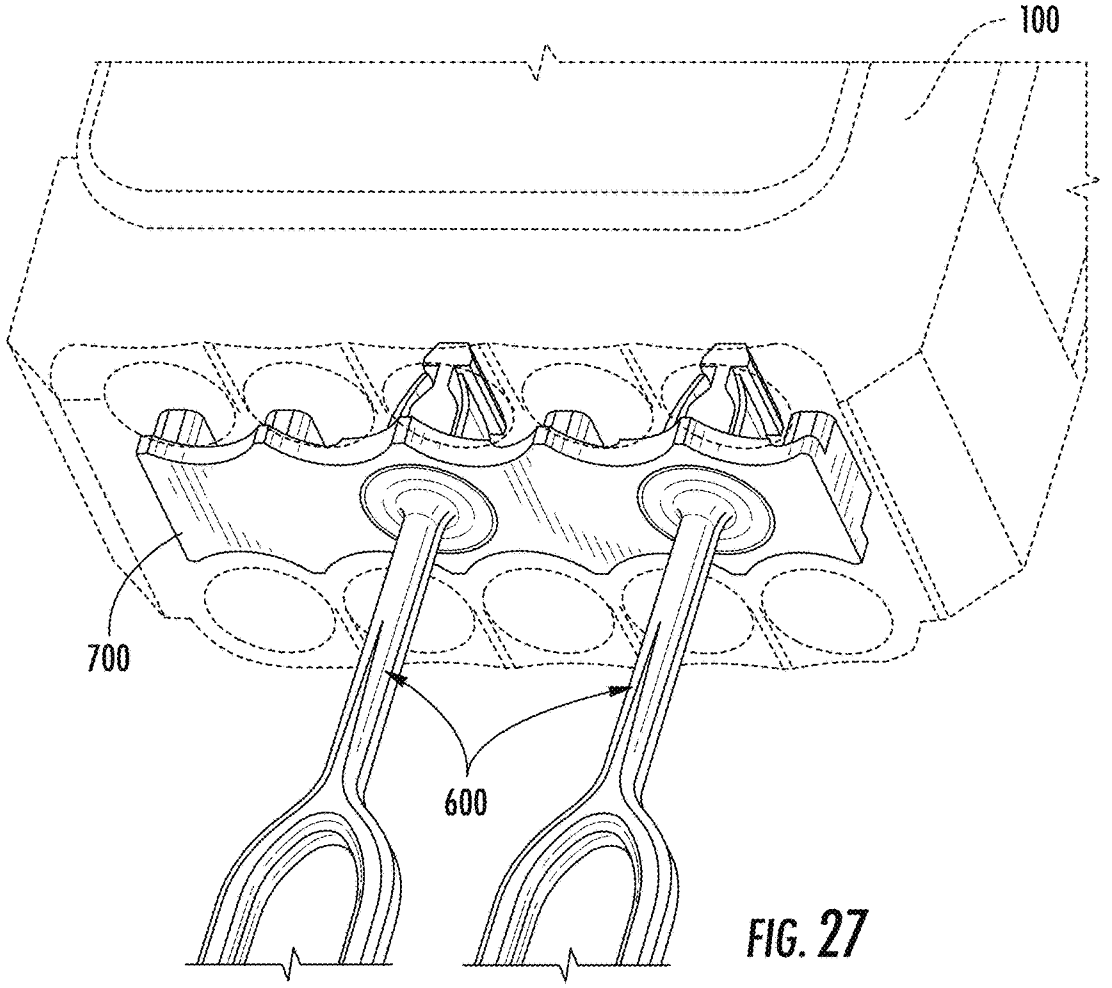
FIG. 27 depicts the faceplate and dust plug sub-assembly of FIGS. 25 and 26 attached to a multiport assembly.
Figure 31:
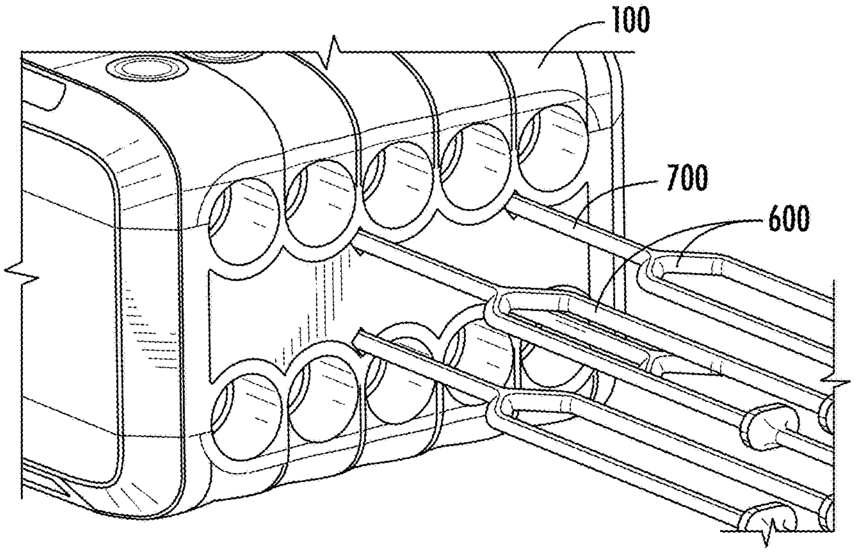
Figure 33:
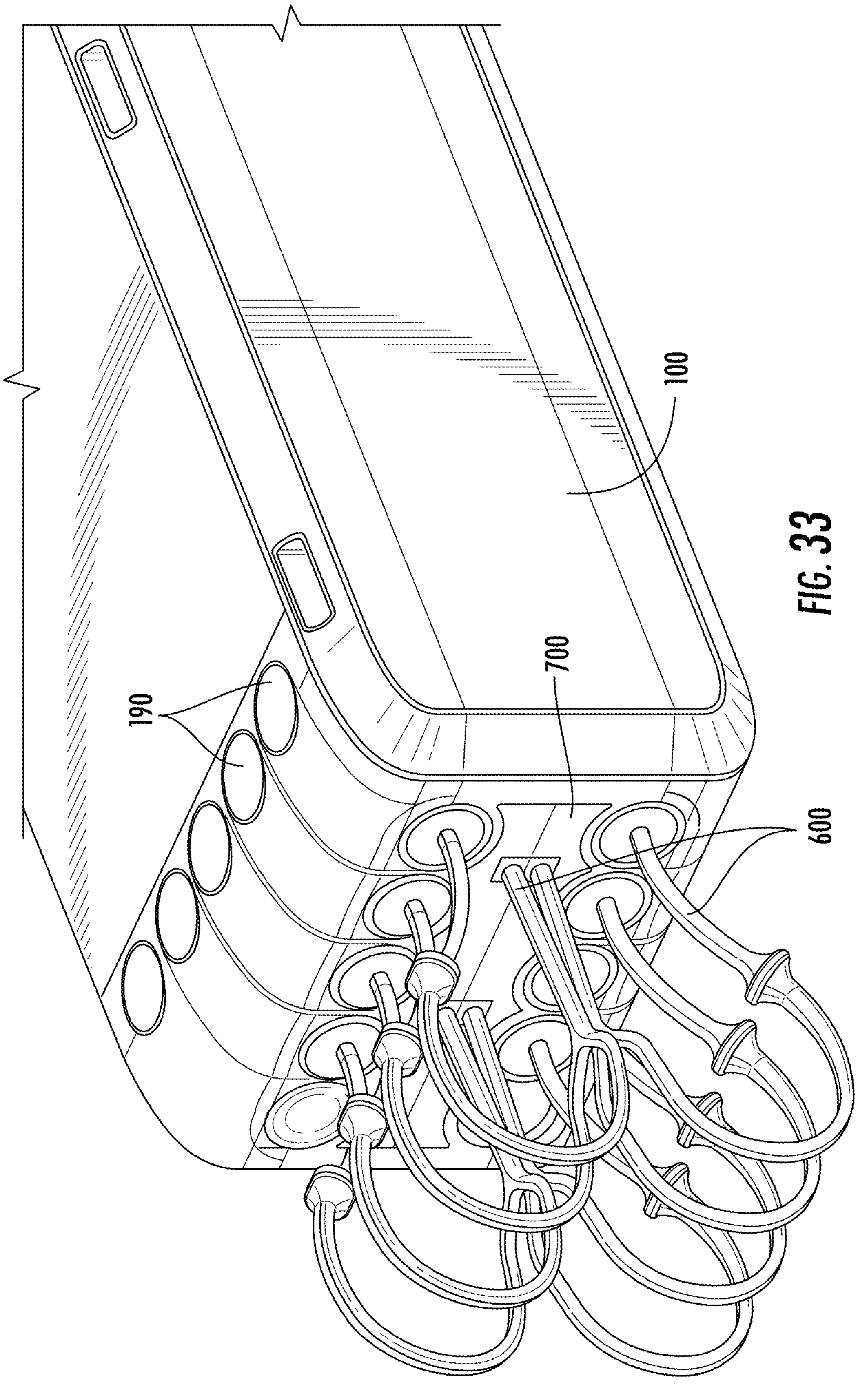

FIG. 12 also depicts dust plug 600 having a dust plug body 610 and a dust plug tether (not numbered). As shown, the dust plug body is attached to the dust plug tether. In this embodiment, the dust plug has a wishbone design with a plurality of dust plug bodies 610 attached to respective legs 603 of the dust plug tether. Consequently, multiple dust plug bodies 610 may be attached to the multiport assembly at a single point. For instance, if four dust plug bodies are desired for the multiport assembly, then less than four attachments of tethers are needed such a two attachments with each dust plug 600 having two dust plug bodies 610. To that end, respective legs 603 of the dust plug tether are attached to a respective dust plug body 610 as shown. Each leg 603 is attached to a runner 602 (FIG. 16) having an end 601 of the dust plug tether. Thus, the mounting member or faceplate may capture a portion of the dust plug tether between the faceplate and the shell of the multiport as shown in FIG. 27, 31 or 33 or between the mounting member and the shell of the multiport as shown in FIG. 13. Dust plugs may also include a gripping portion 605 disposed between the dust plug body 610 and the end 601 of the dust plug tether as depicted. The gripping portion 605 aids in the removal of the dust plug from the optical connector port 120 when depressing the push-button 190 by providing a portion to grip and pull for removal.

FIGS. 12A and 12B depict details of modular optical adapter assembly 130SA that may be used with the multiport assemblies 100 disclosed herein if desired with the rear connector 252 that is internal to the multiport assembly 100. Modular optical adapter assemblies 130SA enable quick and easy assembly of the multiport assemblies 100 in a scalable manner. As discussed, the modular optical adapter assemblies 130SA also allow the mating components such as the adapters 134A corresponding to the respective connector port 120,124 to move or "float" independently of the other modular optical adapter assemblies 130SA relative to the shell 110 for preserving optical performance. Modular optical adapter assemblies 130SA that may be aligned to the connector ports 120,124 of the shell 110 and allowed to have slight movement within the one or more alignment features formed in the shell 210. For instance, FIG. 12 depicts a row of alignment features disposed behind the opening for push-buttons 190 configured as pockets (not numbered) for receiving complementary alignment features on the top of the modular optical adapter assembly 130SA, and FIG. 13 shows a row of alignment features the connector ports 120, 124 configured as a U-shaped protrusions (not numbered) on the shell for receiving complementary alignment features on the bottom of the modular optical adapter assembly 130SA. Other suitable alignment features may be integrally formed in the cavity 112 of shell 110 if desired or have separate component that aid with alignment.

Modular optical adapter assemblies 130SA comprise adapter 134A aligned with the respective connector port 120,124 when assembled. By way of example, the top of the modular optical adapter assemblies may have alignment features 131AFT that are inserted into the pockets of the shell 110. Likewise, the bottom of the modular optical adapter assemblies may have alignment feature such as a recessed portion that cooperates with the U-shaped protrusions of shell 110. Adapter 134A may be biased by a resilient member 136RM and the adapter 134A may be secured to an adapter body 131 using a retainer 137. As best shown in FIG. 12B, modular optical adapter assembly 130SA comprises securing element 190A and securing element resilient member 190RM. However, other embodiments could comprise an actuator for translating the securing element 190A.

As depicted, securing member 190A is inserted into a front end of adapter body 131 along with securing element resilient member 190RM. Specifically, a rim (not numbered) of securing member 190 is inserted into a hoop 131H of adapter body 131, and standoffs 190SO are disposed in a portion of the resilient member pocket (not numbered) at the bottom of the adapter body 131. Securing element resilient member 190RM is disposed in the resilient member pocket as shown in FIG. 12A for biasing the securing member 190A to a retain position as shown. This construction advantageously keeps the assembly intact using the securing element resilient member 190RM. Standoffs 190SO of adapter body 131 may also act as stops to limit the translation of securing element 190A.

In this embodiment, modular optical adapter assembly 130SA may also comprise a ferrule sleeve FS, a ferrule sleeve retainer 135R, resilient member 136RM, a retainer 137 along with the adapter 134A. Adapter body 131 has a portion of the connector port passageway disposed therein for receiving a portion of the external optical connector 210. Ferrule sleeve retainer 135R and ferrule sleeve FS are aligned for assembly into the adapter 134A for assembly and seated using the ferrule sleeve retainer 135R. The resilient member 136RM is disposed over a barrel of adapter 134A and seated on the flange of adapter 134A, then retainer 137 can be attached to adapter body 131 using its latch arms 137LA to secure the same. Other variations of the modular optical adapter assembly 130SA are possible.

As best shown in FIG. 12A, the securing element 190A comprises a locking feature 190L. Locking feature 190L cooperates with a portion of the optical connector 210 when it is fully-inserted into the respective connector port 120,124 for securing the same. Specifically, the connector housing of optical connector 210 may have a cooperating geometry that engages the locking feature 190L of securing element 190A. The locking feature 190L may be disposed within the bore 190B of the securing element 190A.

In one embodiment, locking feature 190L comprises a ramp as shown. The ramp may be disposed within the bore 190B of the securing element 190A. For instance, the ramp is integrally formed at a portion of the bore 190B with the ramp angling up when looking into the connector port 120,124. The ramp allows the connector to push and translate the securing element 190A downward against the securing element resilient member 190RM as the connector is inserted into the connector port 120,124. Ramp may have any suitable geometry. For instance, the ramp may have an incline that leads to a horizontal portion. Once the locking feature 190L of the securing element 190A is aligned with the cooperating geometry of the connector, then a portion of the securing element 190A translates so the locking feature 190L engages the locking feature of the connector for securing the optical connector 210 in the respective connector port 120,124.

Locking feature 190L comprises a retention surface (not visible). In one embodiment, the backside of the ramp of the locking feature 190L forms a ledge that cooperates with complimentary geometry on the connector housing of optical connector 210. However, retention surface may have different surfaces or edges that cooperate for securing the connector for creating the desired mechanical retention. For instance, the retention surface may be canted or have a vertical wall for tailoring the pull-out force for the connector port. However, other geometries are possible for the retention surface. Additionally, the connector port 120,124 has a sealing location at the connector port passageway with an O-ring on the connector that is located closer to the connector port opening than the securing element 190 or locking feature 190L. In other words, the connector port has a sealing surface for the connector disposed at a distance from the connector port opening so it seals to the shell 110 of the multiport assembly 100.

Figure 14:
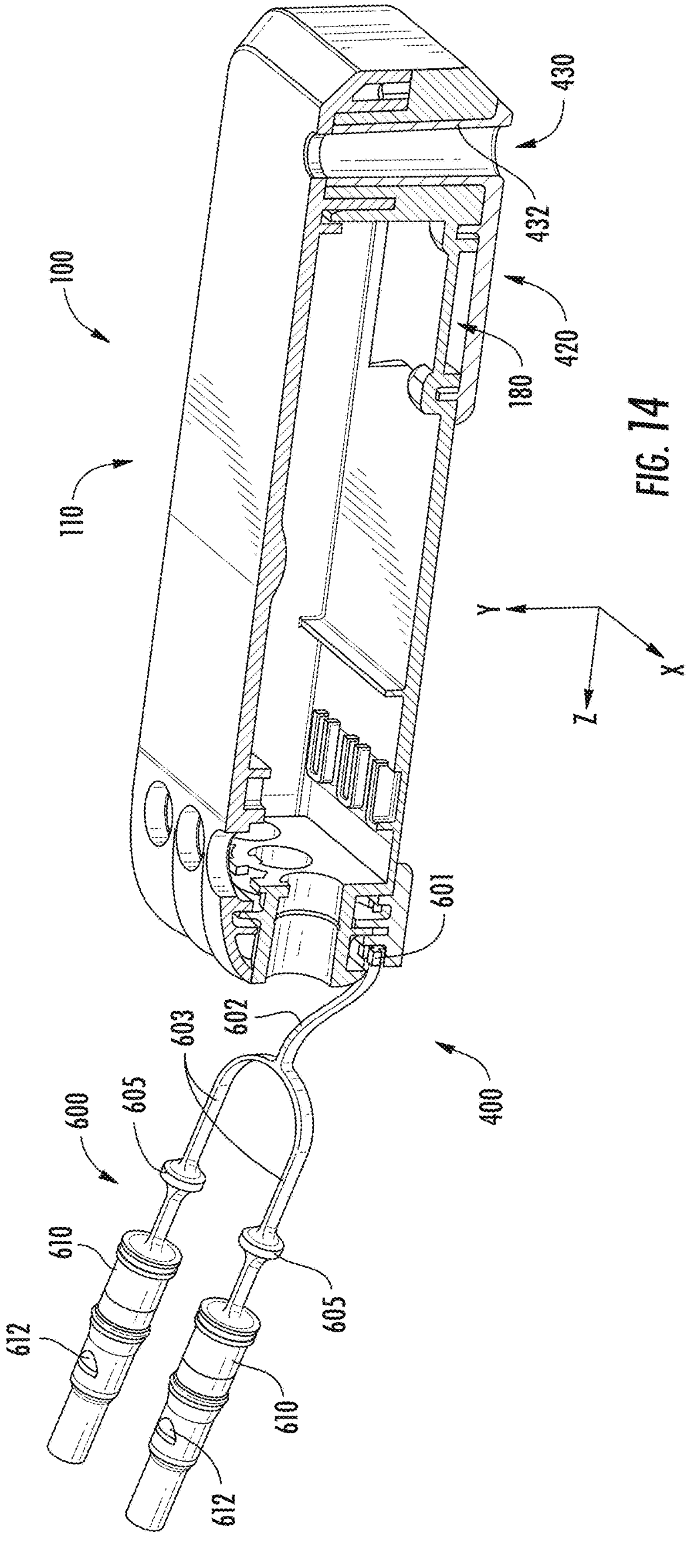
FIG. 14 schematically depicts a section view of the mounting member and multiport assembly along section 14-14 of FIG. 13, according to one or more embodiments shown and described herein.

Referring to FIGS. 13 and 14, an upper perspective view of the multiport assembly 100 and a section view of the multiport assembly 100 along section 14-14 of FIG. 13 are schematically depicted, respectively. In embodiments, the longitudinal member 420 further includes the bushing 432 extending at least partially within the rear shell aperture 109. The longitudinal member 420 may further extend over a lateral slot 180 of the shell 110 such that a strap or band may be positioned between the longitudinal member 420 and the lateral lot 180 may secure the multiport assembly 100 to a utility pole or the like.

In embodiments, the forward tab 410 and the longitudinal member 420 may be coupled to the shell 110 in any suitable manner, for example through adhesive, sealant, welding, overmolding, or the like. In some embodiments, the forward tab 410 and the longitudinal member 420 may be coupled to the shell 110 by a snap-fit or the like. In this embodiment, the mounting member 400 captures a portion of the dust plug tether (such as the end 601) between the mounting member 400 and the shell 110 as depicted in FIGS. 13 and 14. As depicted in FIG. 12, the mounting member 400 has one or more slots 401 for allowing the respective runner 602 of the dust plug tether to pass through, but slot 401 is sized so it captures the larger end 601 of the dust plug tether to inhibit removal or loss of the dust plug 600.

Figure 15:
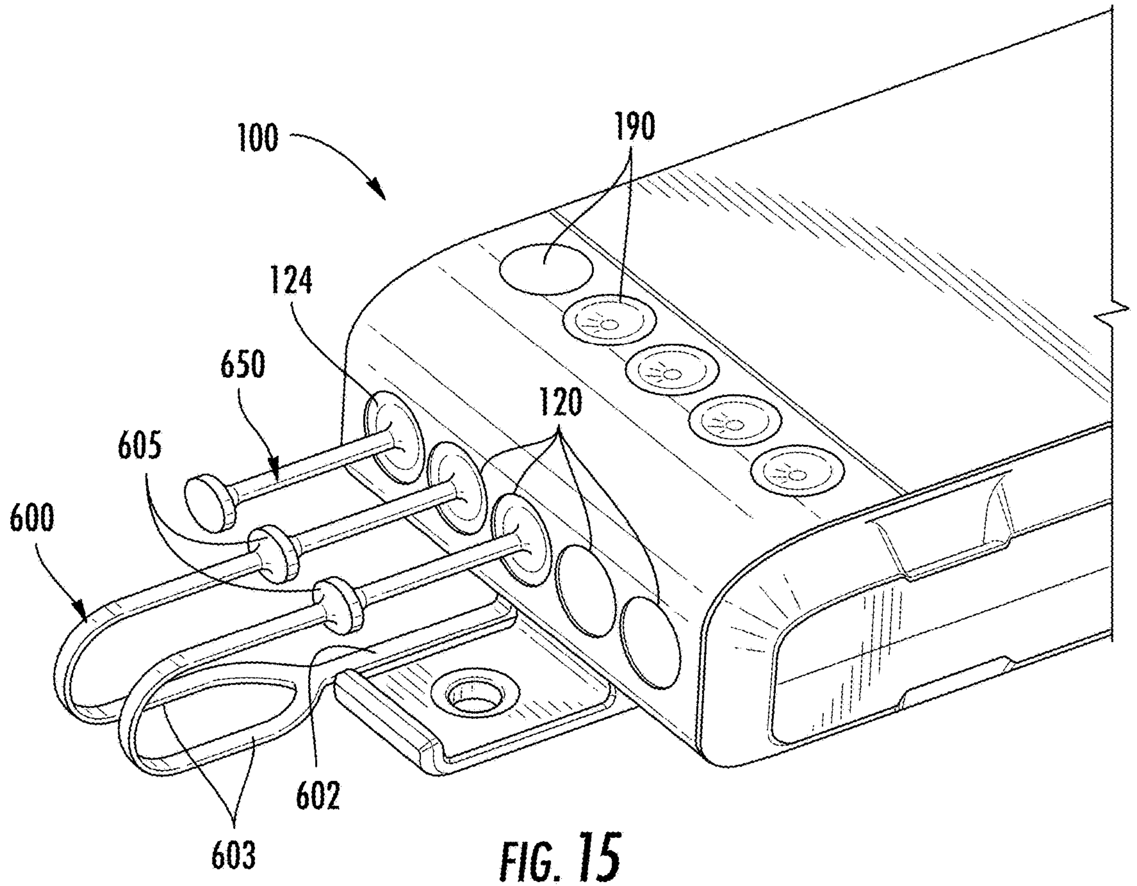
FIG. 15 is a partial front perspective view of the assembled multiport assembly of FIG. 12 showing a first type of dust plug without a tether and a second type of dust plug having a tether inserted into respective optical connector ports of the multiport assembly.

FIG. 15 depicts a front view of the assembled multiport assembly 100 of FIG. 12 with dust plug 650 without a tether inserted into input connector port 124 and the dust plug bodies 610 of dust plug 600 inserted into respective optical connector ports 120. In this embodiment, the input connector port 124 uses a different style of dust plug 650 without a tether compared with dust plug 650 having a tether. As shown, the dust plug tether of dust plug 650 is flexible so it is easily bendable so that it may have a portion that is attached to multiport assembly 100. In either instance, the dust plug 600 and dust plug 650 share similar geometry of a locking feature and keying portion for cooperating with the respective connector ports 120,124 of the multiport assembly. Using two different styles of dust plugs allows the user to easily identify and distinguish the input connector port 124 from the connector ports 120 for making optical connections toward downstream users in the network.

Figure 17A:
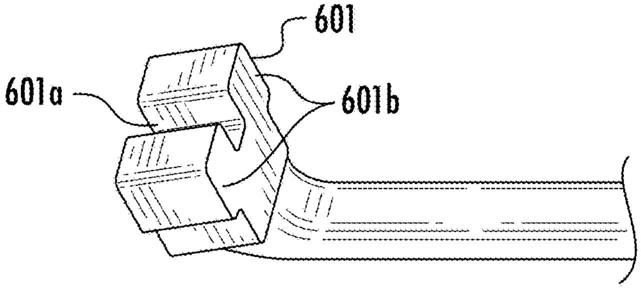
FIG. 17A is a detailed perspective view of the end of dust plug tether of FIGS. 16 and 17.

Further details of dust plug 600 are described with reference to FIGS. 16 and 17, and further details of dust plug 650 are described with reference to FIGS. 18 and 19. FIG. 16 depicts a first perspective view of the dust plug 600 where the locking feature 612 is visible. Locking feature 612 comprises a ramp portion with a ledge. The ramp portion and ledge are integrally formed in the dust plug body 610 and cooperate with a translating securing element associated with the respective connector port 124 to secure the same. Once the dust plug 600 is fully seated in the connector port, the respective push-button 190 needs to be pressed downward to translate the locking feature and allowing the release of the dust plug when pulling on the tether. FIG. 17 depicts a second perspective view of dust plug 600 showing the keying portion 614. Keying portion 614 is a female key and is arranged about 180 degrees from the locking feature 612. The dust plug 600 also comprises a groove for seating a O-ring 625. O-ring 625 is used for sealing the connector port from dust, dirt, debris or the like until the connector port is ready for use. FIG. 17A depicts end 601 of the dust plug tether. As depicted, the end 601 has a slot 601*a* for positioning the end on a rib of the shell 110 for placement so it aligns with the slot 401 of mounting member 400. End 601 also having a larger flared out portion with protrusions 601*b* on each side for inhibiting the pullout of the dust plug tether from between the mounting member 400 and shell 110.

Dust plugs 600 provides a flexible dust plug tether so that the dust plug body 610 may be easily positioned as desired such as installing into the connector port 120 or securing the dust plug body to a dust cap of an external plug connector to keep it out of the way, but allow the dust plug to be available for re-insertion into the connector port 120 if needed. The materials and geometry of the dust plug tether aid in determining the flexibility or performance of the dust plug tether. By way of explanation, the dust plug body 610 comprises a first material and the dust plug tether comprises a second material. By using two different materials for the different portions of dust plug 600 the different characteristics and properties maybe tailored for the desired functionality. The dust plug tether may comprises a portion that is overmolded about a portion of the dust plug body 610 using two different materials.

For instance, the first material for the dust plug body 610 may be harder than the second material for the dust plug tether. Another characteristic that may be tailored for desired performance between the first and second materials is the flexural modulus. For instance, the flexural modulus for the first material of the dust plug body 600 may be much larger than the flexural modulus of the second material for the dust plug tether. By example, the first material may have a flexural modulus that is 100 times greater than a flexural modulus of the second material. The performance flexibility of the second material may also be selected by hardness in one embodiment the second material has a Shore D hardness in the range of 40-50. One example of a suitable second material for the dust plug tether is a thermoplastic polyester elastomer. Such an example of a thermoplastic polyester elastomer is HYTREL® 4556 available from Dupont Performance Polymers located in Wilmington, DE. The dust plug body 610 may be formed from XAREC™ EA357 which is a syndiotactic polystyrene available from Idemitsu Kosan Co., Ltd of Tokyo, Japan or Veradel® AG320 available from Specialty Polymers of Alpharetta, GA.

FIGS. 18 and 19 are perspective views showing details of dust plug 650 shown in the input connector port 124 in FIG. 15. Dust plug 650 is similar to dust plug 600 in that it has a locking feature 612 and keying portion 614, but it may be formed from a single material without a dust plug tether. Instead, dust plug 650 comprises an enlarged end 651 on a pulling grip 651 so it may be easily removed from the input connector port 124 when its respective push-button 190 is depressed. Dust plug 650 may also comprise a groove for a O-ring 625 for sealing the dust cap 650 to the connector port like dust plug 600.

Figure 20:
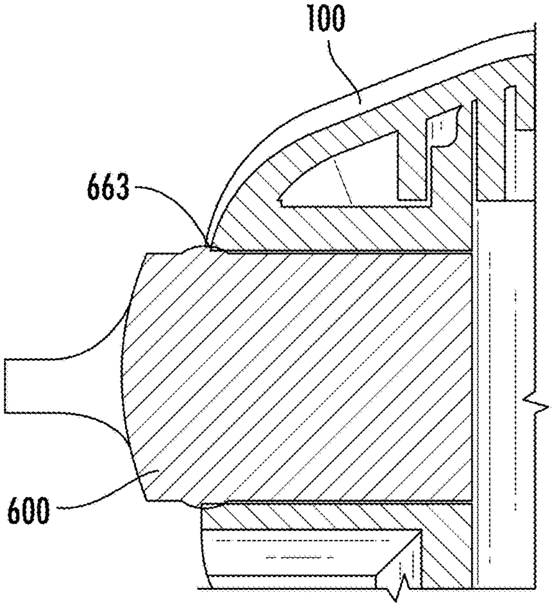
FIGS. 20 and 21 are schematically depict other concepts that may be used with the dust plugs disclosed herein.
Figure 21:
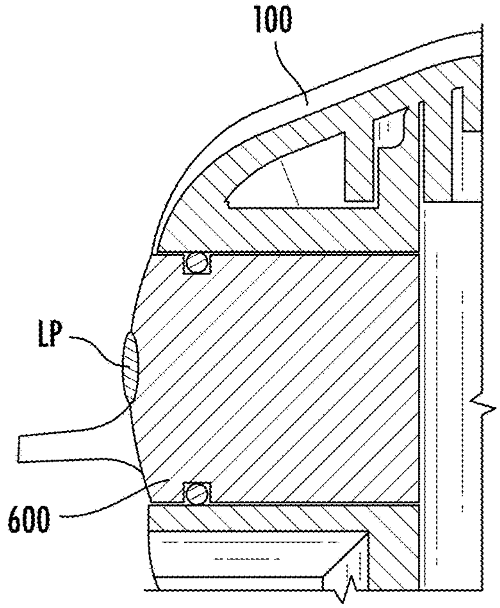

FIGS. 20 and 21 are schematically depict other concepts that may be used with the dust plugs disclosed herein. As shown in FIG. 20, dust plugs 600 or 650 may have one or more slight protruding portions 663 near the interface with the connector port of multiport assembly 100 when inserted therein so that the dust plug body is inhibited from over-insertion and making the dust plug easier to remove. FIG. 21 depicts dust plug 600 or 650 that further comprises a light pipe LP that is in communication with the respective optical fiber of the connector port so that the user may be able to tell if there is an optical connection or a test signal at the respective port.

Figure 22:
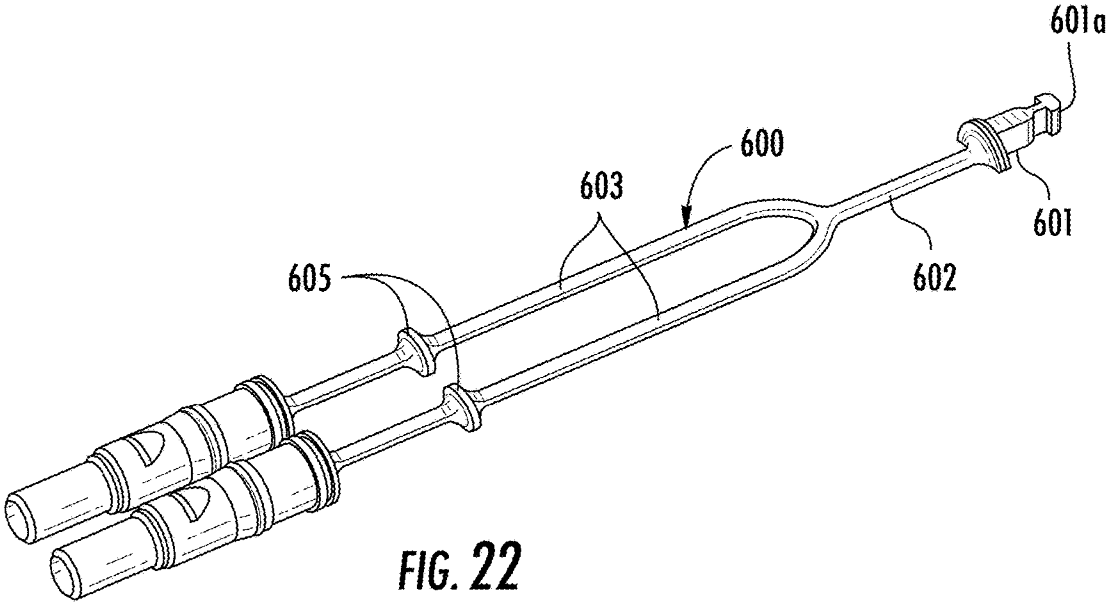
FIGS. 22-24 depict another dust plug having a tether similar to the dust plug of FIGS. 16 and 17.
Figure 23:
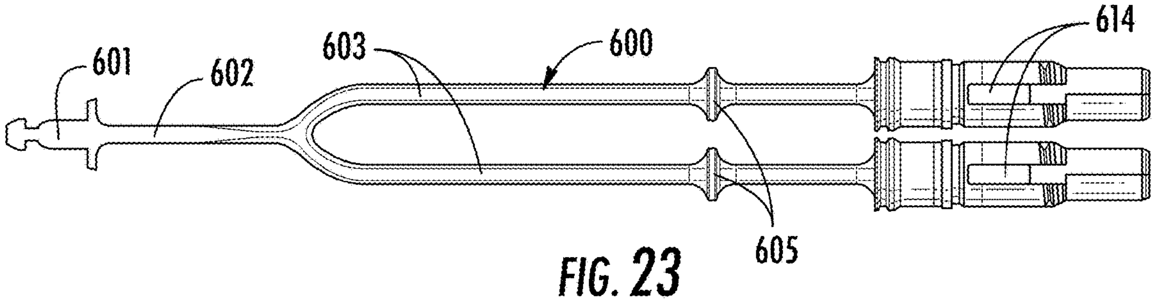
Figure 24:
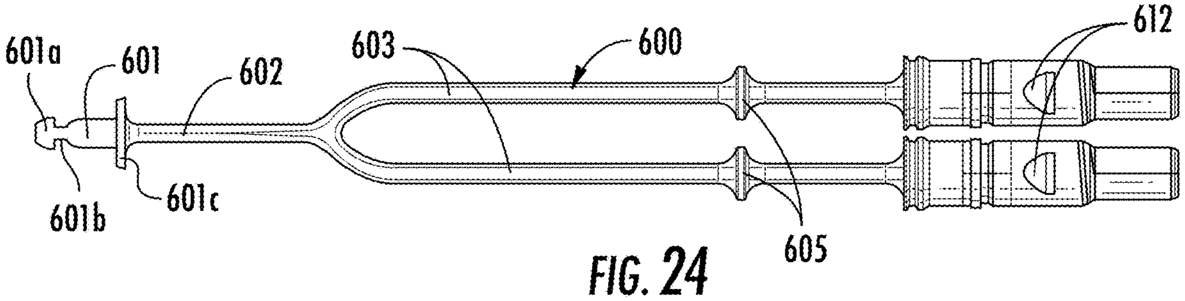
Figure 25:
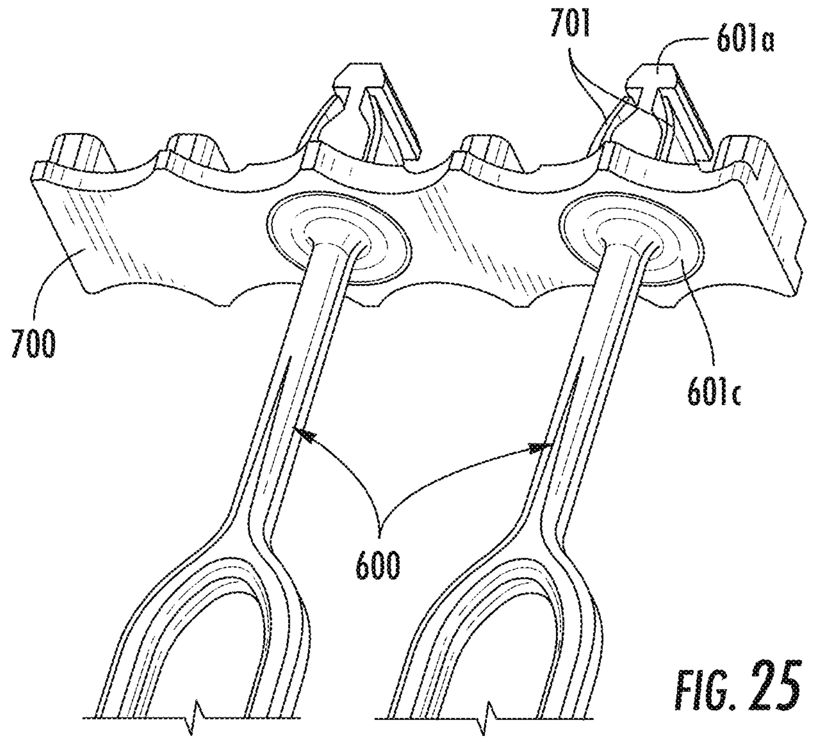
FIGS. 25 and 26 depict the tether of the dust plug of FIGS. 22-24 attached to a faceplate to form a sub-assembly that is suitable for attachment to a multiport assembly.
Figure 26:
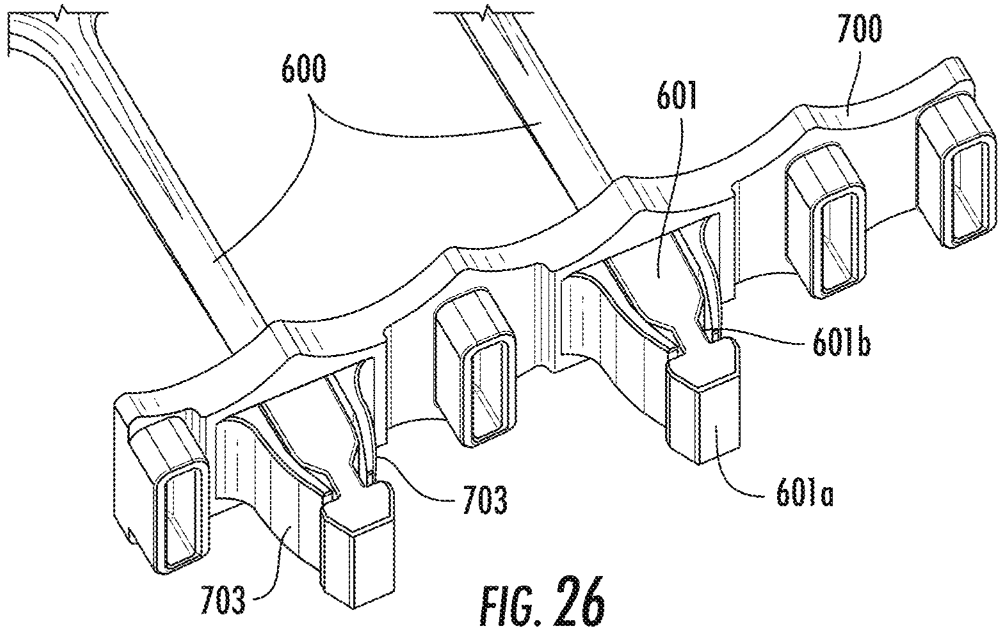

FIGS. 22-24 depict views of another dust plug 600 having a dust plug tether similar to the dust plug shown in FIGS. 16 and 17. In this embodiment, the end 601 of the dust plug 600 has a different configuration for engaging with a faceplate 700 as shown in FIGS. 25 and 26. In this variation, end 601 comprises a head 601*a* having rearward notches 601*b* disposed behind the head 601*a* along with a disc 601*c* that cooperates with a respective opening 701 in faceplate 700. As best shown in FIGS. 25 and 26 the end 601 of dust plug 600 is inserted into the faceplate 700 until the head 601*a* protrudes beyond respective latches 703 of the faceplate 700 to inhibit the removal of the dust plug 600 from the faceplate 700. FIG. 27 depicts the tether 600 and faceplate 700 sub-assembly of FIG. 25 attached to multiport assembly 100. In this manner, the faceplate 700 captures a portion of the dust plug tether between the faceplate 700 and shell of the multiport assembly. The faceplate 700 may be attached by welding, adhesive or the like to secure it to the multiport assembly 100.

Figure 28:
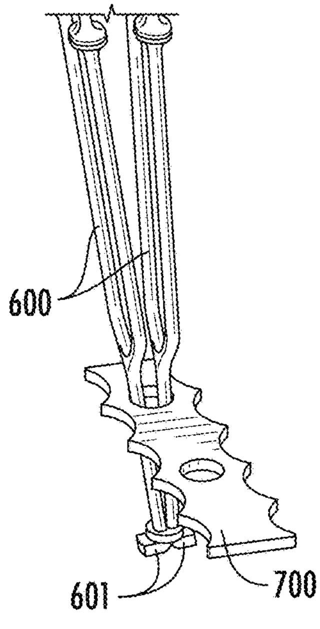
FIGS. 28 and 29 depict the another dust plug having a tether where the tethers are attached to a faceplate in a duplex configuration.
Figure 29:
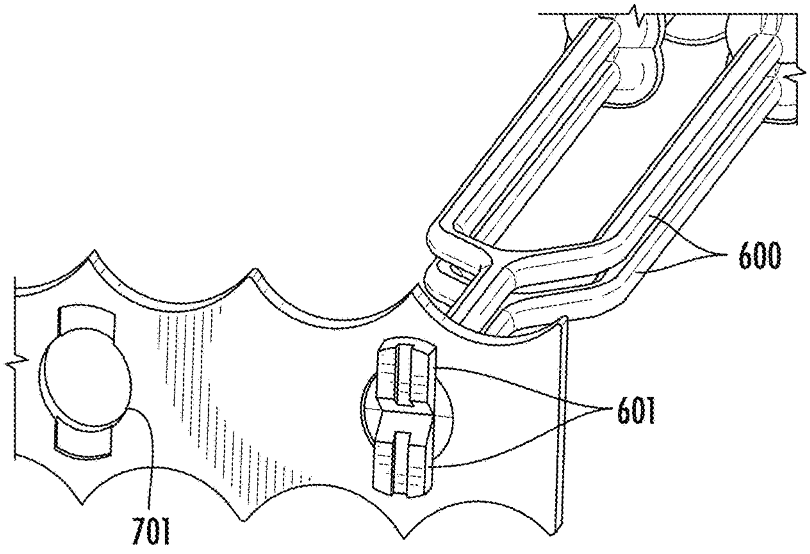

FIGS. 28 and 29 depict the another variation of dust plug 600 having a tether where the tethers are attached to faceplate 700 in a duplex configuration (i.e., two tethers in one opening 701 of faceplate) to decrease the number of dust plug attachment points on the multiport assembly 100. In this embodiment, the end 601 of each dust plug 600 has a configuration so that two ends 601 cooperate for engaging with the respective opening 701 a faceplate 700 as shown in FIGS. 28 and 29. In this variation, end 601 comprises a head 601*a* having an L-shape and a half-disc 601*c* that cooperates with a respective opening 701 in faceplate 700. As best shown in FIG. 29, the ends 601 of dust plug 600 seat into recesses on the backside of faceplate 700, and once installed to inhibit the removal of the dust plug 600 from the faceplate 700. Again, the faceplate 700 captures portions of the respective dust plug tethers between the faceplate 700 and shell of the multiport assembly, and the faceplate 700 may be attached by any suitable manner to secure it to the multiport assembly 100.

Figure 30:
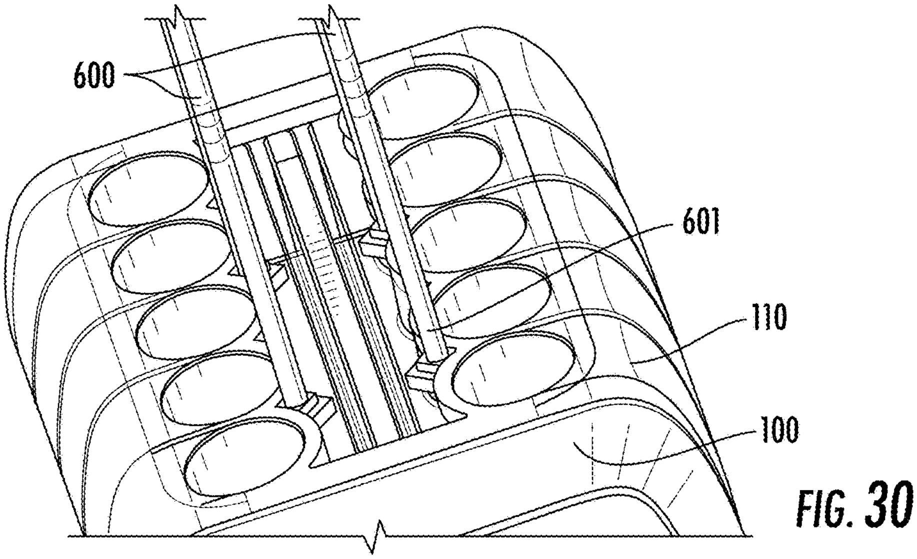
FIGS. 30 and 31 depict a further configuration of a dust plug having tether that uses a faceplate for securing an end of the tether to a multiport assembly.

FIGS. 30 and 31 depict a further configuration of a dust plug 600 having tether that uses a faceplate for securing an end of the tether to a multiport assembly. FIG. 30 depicts the dust plugs 600 having a tether where each end 601 cooperate with the shell 110 for engaging with the respective opening 701 a faceplate 700 as shown in FIG. 31. In this variation, end 601 comprises a head 601*a* having a diamond shape that is larger than the respective opening 701 in faceplate 700. The ends 601 of dust plugs 600 seat into a portion of shell 100 as shown in FIG. 30 for alignment and recesses on the backside of faceplate 700 inhibit the removal of the dust plug 600 from the faceplate 700. Again, the faceplate 700 captures portions of the respective dust plug tethers between the faceplate 700 and shell of the multiport assembly, and the faceplate 700 may be attached by any suitable manner to secure it to the multiport assembly 100.

Figure 32:
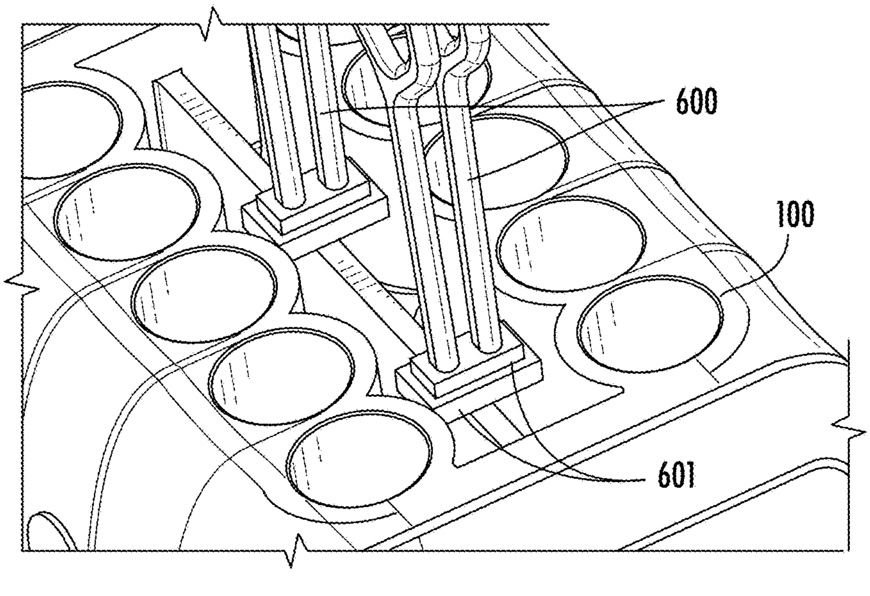
FIGS. 32 and 33 depict another configuration of a dust plug having tether where the tethers use a faceplate for securing an ends of the tethers to a multiport assembly in a duplex configuration.

FIGS. 32 and 33 depict another configuration of a dust plug 600 having tether and faceplate 700 for securing ends 601 of the tethers to a multiport assembly 100 in a duplex configuration. FIG. 32 depicts the dust plugs 600 having a tether where two ends 601 cooperate for engaging with the respective opening 701 a faceplate 700 as shown in FIG. 32. In this variation, end 601 comprises a head 601*a* having an rectangular shape that cooperates with a respective opening 701 in faceplate 700. The ends 601 of dust plugs 600 seat into recesses on the backside of faceplate 700, and once installed to inhibit the removal of the dust plug 600 from the faceplate 700. Again, the faceplate 700 captures portions of the respective dust plug tethers between the faceplate 700 and shell of the multiport assembly, and the faceplate 700 may be attached by any suitable manner to secure it to the multiport assembly 100.

Figure 34:
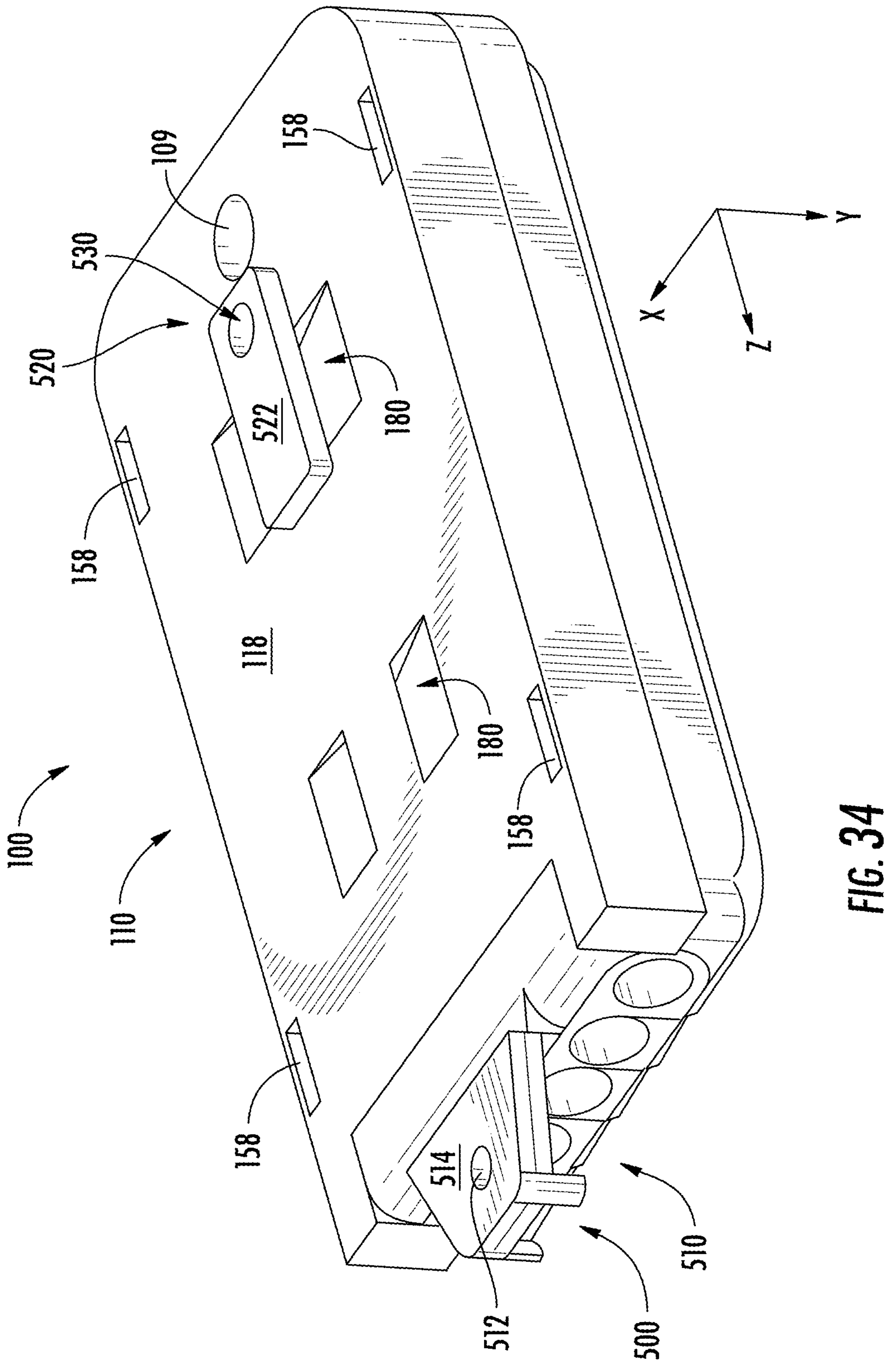
FIG. 34 schematically depicts a lower perspective view of another mounting member assembled to a multiport assembly, according to one or more embodiments shown and described herein.

Referring to FIG. 34, a lower perspective view of a multiport assembly 100 with another mounting member 500 is schematically depicted. Similar to the embodiment described above and depicted in FIGS. 11-14, the mounting member 500 includes the forward tab 510 and the separate longitudinal member 520 spaced apart from the forward tab 510. In the embodiment depicted in FIG. 15, the longitudinal member 520 defines the rear aperture 530, however, the rear aperture 530 is not aligned with the rear shell aperture 109. In embodiments, a fastener may be positioned through the rear aperture 530 of the mounting member 500, and another separate fastener may be positioned through the rear shell aperture 109.

The concepts disclosed allow relatively small multiport assemblies 100 having a relatively high-density of connections along with an organized arrangement for optical connectors 210 attached to the multiport assemblies 100. Shells have a given height H, width W and length L that define a volume for the terminal as depicted in FIG. 1. By way of example, shells 110 of multiport assembly 100 may define a volume of 800 cubic centimeters or less, other embodiments of shells 110 may define the volume of 400 cubic centimeters or less, other embodiments of shells 110 may define the volume of 100 cubic centimeters or less as desired. Some embodiments of multiport assemblies 100 comprise a port width density of at least one connector port 120,124 per 20 millimeters of width W of the multiport assembly 100. Other port width densities are possible such as 15 millimeters of width W of the terminal. Likewise, embodiments of multiport assemblies 100 may comprise a given density per volume of the shell 110 as desired.

The concepts disclosed allow relatively small form-factors for multiport assemblies as shown in Table 1. Table 1 below compares representative dimensions, volumes, and normalized volume ratios with respect to the prior art of the shells (i.e., the housings) for multiports having 4, 8 and 12 ports as examples of how compact the multiports of the present application are with respect to convention prior art multiports. Specifically, Table 1 compares examples of the conventional prior art multiports with multiport assemblies like FIG. 1 having a linear array of ports with different counts of connector ports 120. As depicted, the respective volumes of the conventional prior art multiports of FIG. 1 with the same port count are on the order of ten times larger than multiport assemblies with the same port count as disclosed herein. By way of example and not limitation, the multiport may define a volume of 400 cubic centimeters or less for 12-ports, or even if double the size could define a volume of 800 cubic centimeters or less for 12-ports. Multiports with smaller port counts such as 4-ports could be even smaller such as the shell or multiport defining a volume of 200 cubic centimeters or less for 4-ports, or even if double the size could define a volume of 200 cubic centimeters or less for 4-ports. Devices with sizes that are different will have different volumes form the explanatory examples in Table 1 and these other variations are within the scope of the disclosure. Consequently, it is apparent the size (e.g., volume) of multiports of the present application are much smaller than the conventional prior art multiports. Of course, the examples of Table 1 are for comparison purposes and other sizes and variations of multiports may use the concepts disclosed herein as desired.

One of the reasons that the size of the multiports may be reduced in size with the concepts disclosed herein is that the cable input device and/or external connectors that cooperate with the multiports have locking features that are integrated into the housing of the optical connector 210. In other words, the locking features for holding the fiber optic connector in the respective port of the terminal are integrally formed in the housing of the connector, instead of being a distinct and separate component such as bayonets or threaded coupling nuts.

In other words, the multiport assemblies 100 avoid the use of bulky structures such as a coupling nut or bayonet used with conventional hardened external connectors that mate to multiport assemblies 100. In other words, conventional external connectors for multiports have threaded connections or bayonets that require finger access for connection and disconnecting. By eliminating the threaded coupling nut or bayonets (which is a separate component that must rotate about the connector) the spacing between conventional connectors may be greatly reduced. Also eliminating the dedicated coupling nut from the conventional connectors also allows the footprint of the connectors to be smaller, which also aids in reducing the size of the multiports disclosed herein.

TABLE 1

Comparison of Conventional Multiport with Multiport Assemblies of Present Application

| Multiport Type | Port Count | Dimension L × W × H (mm) | Volume ($cm^3$) | Normalized Volume Ratio |
|---|---|---|---|---|
| Prior Art | 4 | 274 × 66 × 73 | 1320 | 1.0 |
| FIG. 1 | 8 | 312 × 76 × 86 | 2039 | 1.0 |
| | 12 | 381 × 101 × 147 | 5657 | 1.0 |
| Linear | 4 | 76 × 59 × 30 | 134 | 0.10 |
| | 8 | 123 × 109 × 30 | 402 | 0.20 |
| | 12 | 159 × 159 × 30 | 758 | 0.14 |

Accordingly, it should now be understood that embodiments described herein are directed to multiport assemblies including mounting members with standoff features that limit the surface area of the multiport assembly in contact with surface to which the multiport assembly is secured. The standoffs act to space the shell of the multiport assembly apart from the surface, which assists in limiting deformation of the shell as the shell is secured to the surface, thereby assisting in maintaining the structural integrity of the multiport assembly.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

We claim:

1. A multiport assembly comprising:
- a shell extending between a front end and a rear end positioned opposite the front end in a longitudinal direction, the shell defining a cavity of the multiport assembly;
- an input connector port;
- a plurality of optical connector ports positioned at the front end of the shell and extending inward toward the cavity of the shell;
- one or more optical fibers disposed within the cavity of the multiport assembly and routed from one or more optical connector ports of the plurality of optical connector ports toward the input connector port; and
- a plurality of dust plugs each dust plug comprising a dust plug body attached to a respective leg and the respective legs sharing a common end, wherein the common end is attached to the shell.

2. The multiport assembly of claim 1, wherein each of the plurality of dust plugs is configured for insertion into a respective one of the plurality of optical connector ports.

3. The multiport assembly of claim 1, further comprising a forward tab that extends from the shell in the longitudinal direction and defines a standoff that is spaced apart from the lower surface of the shell in a vertical direction.

4. The multiport assembly of claim 1, further comprising a through-hole extending through the multiport assembly in the vertical direction.

5. The multiport assembly of claim 1, further comprising an optical splitter positioned within the cavity of the multiport assembly.

6. The multiport assembly of claim 1, wherein the input connector port is configured to receive a fiber optic connector or an input tether.

7. The multiport assembly of claim 1, further comprising a port width density of at least one optical connector port per each 20 millimeters of width of the multiport assembly.

8. The multiport assembly of claim 1, wherein the plurality of optical connector ports are arranged in a linear array.

9. The multiport assembly of claim 1, wherein the shell defines a volume of 800 cubic centimeters or less.

10. A multiport assembly comprising:

a shell extending between a front end and a rear end positioned opposite the front end in a longitudinal direction, the shell defining a cavity of the multiport assembly;

an input connector port;

a plurality of optical connector ports positioned at the front end of the shell and extending inward toward the cavity of the shell;

one or more optical fibers disposed within the cavity of the multiport assembly and routed from one or more optical connector ports of the plurality of optical connector ports toward the input connector port; and a forward tab that extends from the shell in the longitudinal direction and defines a standoff that is spaced apart from the lower surface of the shell in a vertical direction.

11. The multiport assembly of claim 10, wherein the multiport assembly is configured to be secured to a surface, and wherein the standoff is configured to contact and engage the surface that the multiport assembly is to be secured.

12. The multiport assembly of claim 10, further comprising a first through slot and a second through slot, wherein:

the first through slot is positioned:

proximal to the front end of the shell; and adjacent to a lateral side of the shell;

the second through slot is positioned:

proximal to the rear end of the shell; and adjacent to the lateral side of the shell; and the first and second through slots extend in the vertical direction and are configured to receive a band or a belt.

13. The multiport assembly of claim 10, further comprising a through-hole extending through the multiport assembly in the vertical direction.

14. The multiport of claim 13, wherein the through-hole is adjacent to the rear end of the shell.

15. The multiport assembly of claim 10, further comprising an optical splitter positioned within the cavity of the multiport assembly.

16. The multiport assembly of claim 10, wherein the input connector port is configured to receive a fiber optic connector or an input tether.

17. The multiport assembly of claim 10, further comprising a port width density of at least one optical connector port per each 20 millimeters of width of the multiport assembly.

18. The multiport assembly of claim 10, wherein the plurality of optical connector ports are arranged in a linear array.

19. The multiport of claim 10, wherein the vertical direction is transverse to the longitudinal direction and an axis of optical connector insertion.

20. The multiport assembly of claim 10, wherein the shell defines a volume of 800 cubic centimeters or less.

21. The multiport assembly of claim 10, further comprising a dust plug comprising a dust plug body attached to a dust plug tether, wherein the dust plug tether is attached to the multiport assembly.

22. The multiport assembly of claim 10, wherein the shell comprises an upper shell member and a lower shell member, and wherein upper shell member is sealed to the lower shell member.

23. The multiport assembly of claim 10, wherein the upper shell member is sealed to the lower shell member via a seal positioned in a groove defined by the upper shell member and/or the lower shell member.

24. A multiport assembly comprising:

a shell extending between a front end and a rear end positioned opposite the front end in a longitudinal direction, the shell defining a cavity of the multiport assembly;

an input connector port;

a plurality of optical connector ports positioned at the front end of the shell and extending inward toward the cavity of the shell;

one or more optical fibers disposed within the cavity of the multiport assembly and routed from one or more optical connector ports of the plurality of optical connector ports toward the input connector port;

a dust plug comprising a dust plug body attached to a dust plug tether;

a mounting member secured to the multiport assembly, wherein:

the dust plug tether is attached to the mounting member; and the mounting member is coupled to the shell.

25. The multiport assembly of claim 24, wherein the mounting member is coupled to the shell by a snap-fit.

26. The multiport assembly of claim 24, wherein the mounting member captures a portion of the dust plug tether between the mounting member and the shell.

27. The multiport assembly of claim 24, wherein the mounting member is structurally configured for the attachment of a plurality of dust plug tethers.

28. The multiport assembly of claim 24, further comprising a forward tab that extends from the shell in the longitudinal direction and defines a standoff that is spaced apart from the lower surface of the shell in a vertical direction.

29. The multiport assembly of claim 28, wherein the multiport assembly is configured to be secured to a surface, and wherein the standoff is configured to contact and engage the surface that the multiport assembly is to be secured.

30. The multiport assembly of claim 24, further comprising a first through slot and a second through slot, wherein:

the first through slot is positioned:

proximal to the front end of the shell; and adjacent to a lateral side of the shell;

the second through slot is positioned:

proximal to the rear end of the shell; and adjacent to the lateral side of the shell; and the first and second through slots extend in the vertical direction and are configured to receive a band or a belt.

31. The multiport assembly of claim 24, further comprising a through-hole extending through the multiport assembly in the vertical direction.

32. The multiport assembly of claim 24, further comprising an optical splitter positioned within the cavity of the multiport assembly.

33. The multiport assembly of claim 24, wherein the input connector port is configured to receive a fiber optic connector or an input tether.

34. The multiport assembly of claim 24, further comprising a port width density of at least one optical connector port per each 20 millimeters of width of the multiport assembly.

35. The multiport assembly of claim 34, wherein the plurality of optical connector ports are arranged in a linear array.

36. The multiport assembly of claim 24, wherein the shell comprises an upper shell member and a lower shell member, and wherein upper shell member is sealed to the lower shell member.

37. The multiport assembly of claim 36, wherein the upper shell member is sealed to the lower shell member via a seal positioned in a groove defined by the upper shell member and/or the lower shell member.

38. The multiport assembly of claim 24, wherein the shell defines a volume of 800 cubic centimeters or less.

* * * * *